(12) United States Patent
Havard

(10) Patent No.: US 10,042,520 B2
(45) Date of Patent: *Aug. 7, 2018

(54) INTERACTIVE ELECTRONIC BOOK

(71) Applicant: Amanda Meredith Havard, Nashville, TN (US)

(72) Inventor: Amanda Meredith Havard, Nashville, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/131,222

(22) Filed: Apr. 18, 2016

(65) Prior Publication Data

US 2016/0246464 A1    Aug. 25, 2016

Related U.S. Application Data

(63) Continuation of application No. 13/655,542, filed on Oct. 19, 2012, now Pat. No. 9,417,755.

(Continued)

(51) Int. Cl.
| | | |
|---|---|---|
| *G06F 15/00* | (2006.01) | |
| *G06F 13/00* | (2006.01) | |
| *G06F 3/0483* | (2013.01) | |
| *G06F 3/048* | (2013.01) | |
| *G06F 15/02* | (2006.01) | |
| *G06F 3/0481* | (2013.01) | |

(Continued)

(52) U.S. Cl.
CPC ............ *G06F 3/0483* (2013.01); *G06F 3/048* (2013.01); *G06F 3/04817* (2013.01); *G06F 15/0291* (2013.01); *G06F 17/2235* (2013.01); *G06Q 30/0641* (2013.01); *G06Q 50/01* (2013.01); *G09G 5/377* (2013.01); *H04L 67/10* (2013.01); *H04L 67/30* (2013.01)

(58) Field of Classification Search
CPC .............................. G06F 3/048; G06F 3/0483
USPC ................. 715/761–765, 851–853, 740, 783
See application file for complete search history.

(56) References Cited

U.S. PATENT DOCUMENTS

| | | |
|---|---|---|
| 5,957,697 A | 9/1999 | Iggulden |
| 7,545,951 B2 | 6/2009 | Davis |

(Continued)

OTHER PUBLICATIONS

Havard, Amanda Meredith, PCT/US2012/061011, International Search Report and the Written Opinion of the International Searching Authority, dated Jan. 2, 2013.

*Primary Examiner* — Kevin Nguyen
(74) *Attorney, Agent, or Firm* — Nyemaster Goode, PC

(57) ABSTRACT

A computer-storage media having computer executable instructions embodied thereon that, when executed on a computing device perform a method for providing an interactive electronic book, the method including providing a user interface for the interactive electronic book, the user interface including representations of pages to display on a display associated with the computing device, providing on one of the representations of the pages of the user interface a watermark icon of an interactive element to display on the display associated with the computing device, associating the watermark icon of interactive content with interactive content, the watermark icon being indicative of presence of the interactive content and a content type for the interactive content, and wherein the user interface further provides for accessing the interactive content by selecting the watermark icon of the interactive content and without navigating away from the pages on which the watermark icon is present.

8 Claims, 100 Drawing Sheets

Related U.S. Application Data

(60) Provisional application No. 61/550,239, filed on Oct. 21, 2011.

(51) Int. Cl.
  *G06F 17/22* (2006.01)
  *G06Q 30/06* (2012.01)
  *G06Q 50/00* (2012.01)
  *G09G 5/377* (2006.01)
  *H04L 29/08* (2006.01)

(56) References Cited

U.S. PATENT DOCUMENTS

| | | |
|---|---|---|
| 7,559,034 B1 | 7/2009 | Paperny |
| 8,698,765 B1 * | 4/2014 | Keller ................. G06F 17/2735 340/407.2 |
| 2003/0059758 A1 | 3/2003 | Cohen |
| 2004/0220935 A1 | 11/2004 | McGraw |
| 2010/0122092 A1 * | 5/2010 | Yaghmai ........... G06F 17/30274 713/176 |
| 2011/0167350 A1 | 7/2011 | Hoellwarth |
| 2011/0173534 A1 | 7/2011 | Huang |
| 2011/0261030 A1 | 10/2011 | Bullock |
| 2011/0291972 A1 * | 12/2011 | Berry .................... G06F 3/0488 345/173 |
| 2012/0204086 A1 | 8/2012 | Stoner |
| 2012/0209902 A1 | 8/2012 | Outerbridge |
| 2013/0014009 A1 * | 1/2013 | Kim ....................... G06F 17/21 715/255 |

* cited by examiner

TABLE of CONTENTS

- COVER
- PROLOGUE
- 2 | MATRIMONY
- 6 | PACIFIC
- 7 | ROAD TRIP
- 10 | PATIENCE
- 12 | BLANK SLATE
- ENHANCED
- CREDITS

THE SURVIVORS                                          16

Instead, I smoothed my skirt and tugged at my jacket sleeves to make sure they covered my arms, tucked my hair behind my ears, and went up the drive past the black Maserati and a glistening cypress green Bentley convertible, and up to the glass façade of the long house. My breathing was shallow, and I tried in vain to slow it. I wanted to present a calm front. As I broached the front steps, I looked down one last time. Deep breath. I raised my hand to the doorbell, but before I could press it, the door opened.
    Mark Winter stood before me in that same roughed-up motorcycle jacket—Burberry Prorsum, I now recognized—he wore in Nashville. I realized it was something of a signature. "You can't take a warning, can you?" he said with a sigh and with far less hostility than he'd shown before. There was a hint of sarcasm in his voice—he was talking like we were friends, almost joking. And, suddenly, I couldn't remember what I had been afraid of.
    But I quickly turned to the creature standing next to him, the driver of the Maserati I'd seen only minutes before. Up close, I could see he had golden-green eyes. They met mine and transfixed me. His arms were crossed on his chest—likely a deterring signal to me, but I ignored it. He cocked his head to the side to look at me and grinned deviously. I couldn't tell at all what he was feeling, but I didn't care. I just liked what I was feeling.
    My breathing sped up, and I'm sure he could tell. I never even blinked; I would not miss a moment of looking at this face. As several moments of silence passed, he raised one thick eyebrow at me, making his whole face crease endearingly. A few loose strands of hair fell forward into his eyes, and he slicked them back. I smiled at him, hypnotized.
    Mark sighed. "If we could get back to this," he said, waving his hand between the two of us, "at a later time, that would be excellent." I finally broke the gaze. Get back to what? I wondered.
    "Are you coming?" a female voice called from inside.
    "Yes," Mark answered, spinning on his heels. "By the way, Sadie, this is my brother, Everett. Everett, Sadie." Everett parted his thin, peony lips as if to speak but closed them and turned to walk inside.

Birth Year & Location

1912 - Alberta, CA

Actual & Appearing Ages

90 - 19

Physical Appearance

Height 6'
Hair Color Chocolate Brown
Eye Color Green

Known Powers

| | | |
|---|---|---|
| Elemental Control | Ability to control fire, water, earth, and wind in all its forms. | Unknown |
| Mobilization | Can control bodies of all living creatures from afar. | Unknown |
| Superhuman Abilities | Able to run at speeds up to 200 miles per hour (faster than any other known species), superhuman sight and hearing. | Inborn |

Anecdotal Info

Mark Winter is the first supernatural Sadie meets outside the city walls.

Style

A careful mix of effortless t-shirts and jeans and precise detail like Burberry Prorsum leather jackets. His look is understated, but don't let that fool you into thinking it's not purposeful or polished in its own way. Looks by Moschino, Nicholas K, Burberry Prorsum.

Signature

Burberry Prorsum leather motorcycle jacket

Vehicle

Black Audi R8

BLANK SLATE

Once I made my way out of Moscow, I darted between towns and suburbs before I got to land empty enough that I could flat out run. I was headed south toward the Ukrainian border, but somewhere near Voronezh I heard a distinct humming that sent me eastward. By then, it was morning. I had to slow down when I passed towns and was close enough to be seen.

390

For several days, I wandered, following the elusive humming. I passed through several towns big enough to have museums or tourist destinations dedicated to their own mythology. I stopped at each one, finding everything from monuments dedicated to witches burned at the stake to locals who believed in burying their loved ones face down so they wouldn't come back from the dead as vampires.

On the third day, I was walking through the countryside when the off-key humming picked up full force. The weird pitch had come and gone over the past few days, but it was always on my mental radar. Now it was loud and clear. I topped a hill and was not surprised to find a sleepy village tucked into the small valley below me. The sound amplified in my ears.

Surprisingly, there was no normal humming to balance out the rare sounds. Whoever lived inside this tiny village was entirely inhuman and entirely alone.

392

I went slowly down the hillside, flipping through the vampiric names I had heard in several towns over the last few days: purple-faced vampires who hunted only at night that some called the *mjertojec*, heretics reborn into haggard old women they'd named *erdica*, even the beautiful but lethal women they called the *vordulak*. More than one poor soul had looked at me nervously while explaining the vordulak, afraid that I was one of them.

BLANK SLATE

Once I made my way out of Moscow, I darted between towns and suburbs before I got to land empty enough that I could flat out run. I was headed south toward the Ukrainian border, but somewhere near Voronezh I heard a distinct humming that sent me eastward. By then, it was morning. I had to slow down when I passed towns and was close enough to be seen.

390

For several days, I wandered, following the elusive humming. I passed through several towns big enough to have museums or tourist destinations dedicated to their own mythology. I stopped at each one, finding everything from monuments dedicated to witches burned at the stake to locals who believed in burying their loved ones face down so they wouldn't come back from the dead as vampires.

On the third day, I was walking through the countryside when the off-key humming picked up full force. The weird pitch had come and gone over the past few days, but it was always on my mental radar. Now it was loud and

--- volkodlak (Russian and Slovenian, but while this is the legend for this word in Slovenian lore, in Russian lore, volkodlak is a shape-shifter)

Myth

Thought to be beautiful women with creamy white skin, harsh angular features, long black hair, and red lips, the *vorbdlak* are the *femme fatale* of Eastern European supernatural and vampire myths. They would probably have a physical look not unlike

--- prised to find a sleepy village tucked into amplified in my ears.

ial humming to balance out the rare tiny village was entirely inhuman and

392 flipping through the vampiric names I ast few days: purple-faced vampires who lled the *myrtolojec*, heretics reborn into ica, even the beautiful but lethal women e poor soul had looked at me nervously hat I was one of them.

BLANK SLATE

Once I made my way out of Moscow, I darted between towns and suburbs before I got to land empty enough that I could flat out run. I was headed south toward the Ukrainian border, but somewhere near Voronezh I heard a distinct humming that sent me eastward. By then, it was morning. I had to slow down when I passed towns and was close enough to be seen.

For several days, I wandered, following the elusive humming. I passed through several towns big enough to have museums or tourist destinations dedicated to their own mythology. I stopped at each one, finding everything from monuments dedicated to witches burned at the stake to locals who believed in burying their loved ones face down so they wouldn't come back from the dead as vampires.

On the third day, I was walking through the countryside when the off-key humming picked up full force. The weird pitch had come and gone over the past few days, but it was always [loud and] clear. I topped a hill and was n[...] [looked into] the small valley below me. The [...]

Surprisingly, there was no [...] the rare sounds. Whoever lived inside [...] man and entirely alone.

I went slowly down the hi[ll...] names I had heard in several towns ove[r...] [vampi]res who hunted only at night that so[metimes turn] into haggard old women they'd nam[ed...] women they called the *vordulak*. More t[han one spoke] nervously while explaining the vordulak, a[...]

MYERTOVJEC

Origin

Russia

Myth

The *myertovjec* are often described as swollen and purple-faced vampires. They are very often thought to be...

BLANK SLATE

Once I made my way out of Moscow, I darted between towns and suburbs before I got to land empty enough that I could flat out run. I was headed south toward the Ukrainian border, but somewhere near Voronezh I heard a distinct humming that sent me eastward. By then, it was morning. I had to slow down when I passed towns and was close enough to be seen.

*390*

For several days, I wandered, following the elusive humming. I passed through several towns big enough to have museums or tourist destinations dedicated to their own mythology. I stopped at each one, finding everything from monuments dedicated to witches burned at the stake to locals who believed in burying their loved ones face down so they wouldn't come back from the dead as vampires.

On the third day, I was walking through the countryside when the off-key humming picked up full force. The weird pitch had come and gone over the past few days, but it was alwa[...]oud and clear. I topped a hill and was n[...]ked into the small valley below me. The[...]

Surprisingly, there was no[...] the rare sounds. Whoever lived inside[...] nan and entirely alone.

I went slowly down the hi[...] names I had heard in several towns ove[...] res who hunted only at night that so[...] rn into haggard old women they'd nan[...] women they called the *vordulak*. More t[...] ervously while explaining the vordulak, a[...]

*396*

Myth

The *myertovjec* are often described as swollen and purple-faced vampires. They are very often thought to be undead in a decaying sense, giving them a look closer to a zombie than a pop culture image of a vampire. Like many classic literary and pop-culture vampire legends, the myertovjec are supposedly thought to be able to hunt only at night.

INTERACTIVE ELECTRONIC BOOK

CROSS-REFERENCE TO RELATED APPLICATIONS

This application is a continuation of U.S. patent application Ser. No. 13/655,542 filed Oct. 19, 2012 which claims priority under 35 U.S.C. § 119 to provisional application Ser. No. 61/550,239 filed Oct. 21, 2011, herein incorporated by reference in its entirety.

FIELD OF THE INVENTION

The present invention relates to transmedia, more particularly, but not exclusively, the present invention relates to interactive electronic books.

BACKGROUND OF THE INVENTION

The electronic book is of increasing interest to publishers, online book sellers, and others for a variety of reasons not the least of which is increased interest by consumers in electronic versions of books of various types.

It is generally recognized that it is possible to add functionality to electronic books which is not present in traditional books and various attempts have been made to do so. For example, U.S. Pat. No. 7,516,073 to Kodama describes an electronic book which includes a feature for reading the book aloud and further describes an electronic bookmark feature.

U.S. Pat. No. 7,849,393 to Hendricks et al. describes an electronic book which includes links to other content such as streaming video data, audio data and text to enrich the reading experience.

U.S. Patent Publication No. 2002/0188532 to Rothstein describes enhancing an electronic book by adding advertising to the electronic book. Similarly, U.S. Patent Publication No. 2011/0184811 to Patwa et al. describes enhancing an electronic book by adding contextual advertising to the electronic book in which advertising is matched to the content on relevant pages of the electronic book.

U.S. Patent Publication No. 2011/0047495 to Hendricks describes enhancing an electronic book by providing features to manipulate text and also provides a picture-in-picture feature.

Yet, problems remain with adding functionality to electronic books which is not present in traditional print books.

One of the problems with the electronic book relates to how to provide an electronic book with additional functionality yet at the same time provide an electronic book in a form which is acceptable to readers who are accustomed to and may prefer the traditional print form.

Another problem is to identify the additional functionality which is possible to implement in an interactive electronic book which would assist in enhancing the experience of readers.

A still further problem is to provide for advertising or marketing in a book in a manner which is unobtrusive to readers.

Various attempts have been made to address these and other problems. Nevertheless, the problems remain.

SUMMARY OF THE INVENTION

Therefore, it is a primary object, feature, or advantage of the present invention to improve over the state of the art.

It is a further object, feature, or advantage of the present invention to provide an interactive electronic book which assists in enhancing the experience for readers.

It is a still further object, feature, or advantage of the present invention to provide a method of presenting an electronic book to a reader which conveys the availability of interactive content in an unobtrusive manner.

Another object, feature, or advantage of the present invention is to provide a method of presenting an electronic book to a reader which identifies available interactive content in a way which identifies or describes the content in a manner which allows users to make informed decisions as to whether they want to interact with the interactive content or not.

A still further object, feature, or advantage of the present invention is to morph elements of fact or history with fiction writings to enrich the experience of readers.

A still further object, feature, or advantage of the present invention to use social media to allow readers to communicate directly with the characters in the book and without leaving the book such as by asking questions of fictional characters in the book.

Yet another object, feature, or advantage of the present invention is to provide progressive character profiles so that the extent of the information within a character profile is dependent upon where in the book a reader is when they access the character profile.

Another object, feature, or advantage of the present invention is to provide for progressive interactive elements such as character profiles, maps, or timelines which have content dependent upon where in the book the content is accessed.

Yet another object, feature, or advantage of the present invention is to provide for using social media as a means to enhance the interactivity and use experience of an electronic book.

A still further object, feature, or advantage of the present invention is the use of a touch screen display interface in a manner that enhances the user's experience of an interactive electronic book.

A still further object, feature, or advantage of the present invention is providing an interactive electronic book app for a tablet device.

Another object, feature, or advantage of the present invention is to provide an interactive electronic book which includes marketing and tie-ins to real world products and services in a manner which is unobtrusive and not objectionable to readers.

These and/or other objects, features, or advantages of the present invention will become apparent from the specification and claims that follow. No single embodiment need exhibit each and every one of these objects, features, or advantages. Instead, it is to be understood that different embodiments may exhibit different objects, features, or advantages. The present invention is not to be limited to or by the objects, features, or advantages stated herein.

According to one aspect of the present invention, a computer-storage media having computer executable instructions embodied thereon is provided. The instructions, when executed on a computing device perform a method for providing an interactive electronic book. The method includes providing a user interface for the interactive electronic book, the user interface including representations of pages to display on a display associated with the computing device, providing on one of the representations of the pages of the user interface a watermark icon of an interactive element to display on the display associated with the computing device, associating the watermark icon of interactive content with interactive content, the watermark icon being indicative of presence of the interactive content and a content type for the interactive content, and wherein the user interface further provides for accessing the interactive content by selecting the watermark icon of the interactive content and without navigating away from the one of the representations of the pages on which the watermark icon is present.

According to another aspect of the present invention, a method of providing an electronic book for use on a computing device is disclosed. The method includes associating an interactive element with text within the electronic book and providing a user interface to a reader of the electronic book to use to access the interactive element. The content of the interactive element is dependent upon a position of the text within the electronic book. The content may be a character profile, a timeline, a map, or other information which is gradually revealed to the reader as they progress through the book.

According to another aspect of the present invention, a method of providing an electronic book for use on a computing device is provided. The method includes providing a user interface for the electronic book to integrate use of social media functions without leaving the electronic book wherein the social media functions allow for a reader of the electronic book to communicate with a fictional character of the electronic book. The social media functions may allow a reader to ask questions of the fictional character and/or to receive answers from the fictional character.

According to another aspect of the present invention, a method of providing an electronic book on a computer device is provided. The method includes associating an interactive element with text within the electronic book. The method further includes providing a user interface to a reader of the electronic book using the computing device, wherein the user interface provides for accessing the interactive element and wherein content of the interactive element is dependent upon a position of the text within the electronic book. The user interface further provides for integrating the use of social media functions without leaving the electronic book. The social media functions allow the reader to communicate with a fictional character of the book through use of a social media platform.

DETAILED DESCRIPTION OF THE PREFERRED EMBODIMENT

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

All patents and publications referenced herein are hereby incorporated by reference in their entirety.

Figure 1:
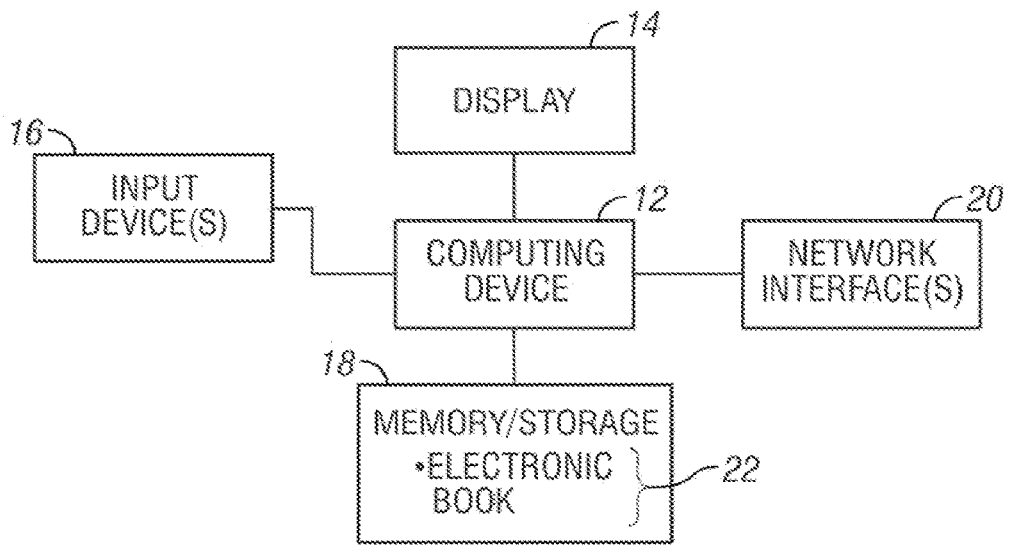
FIG. 1 is a block diagram illustrating one example of a system of the present invention.

FIG. 1 illustrates one example of a system which may be used with an electronic book. As shown in FIG. 1, the system 10 includes a computing device 12. A display 14 is operatively connected to or otherwise associated with the computing device 12. One or more input devices 16 are operatively connected to or otherwise associated with the computing device 12. A memory 18 is also operatively connected to the computing device 12. A network interface 20 may also be operatively connected to the computing device 12.

The system 10 as shown may take a variety of different forms. For example, the system 10 may take the form of a tablet device. Where the system 10 is a tablet device, the input device(s) 16 may be integrated with the display 14 such that the display 14 is a touch screen display. The memory/storage 18 may take the form of random access memory, or storage or both or other type of memory or storage device which contain at least a portion of an electronic book 22. The network interface 20 may be a wireless network interface such as the wireless network interface associated with WI-FI or BLUETOOTH. Alternatively, the network interface 20 may be a wired network interface. Of course, the system 10 need not be a tablet device, but could be found within a phone, a notebook computer, a desktop computer, an entertainment device, an ebook reader, or any other type of computing system. For example, the interactive electronic book may be provided as an application or "app" for use on an Apple iPad device, an app for use on an Android device, or an app for use on other types of devices. Similarly, the electronic book may be provided as one or more data files used by an application.

Figure 2:
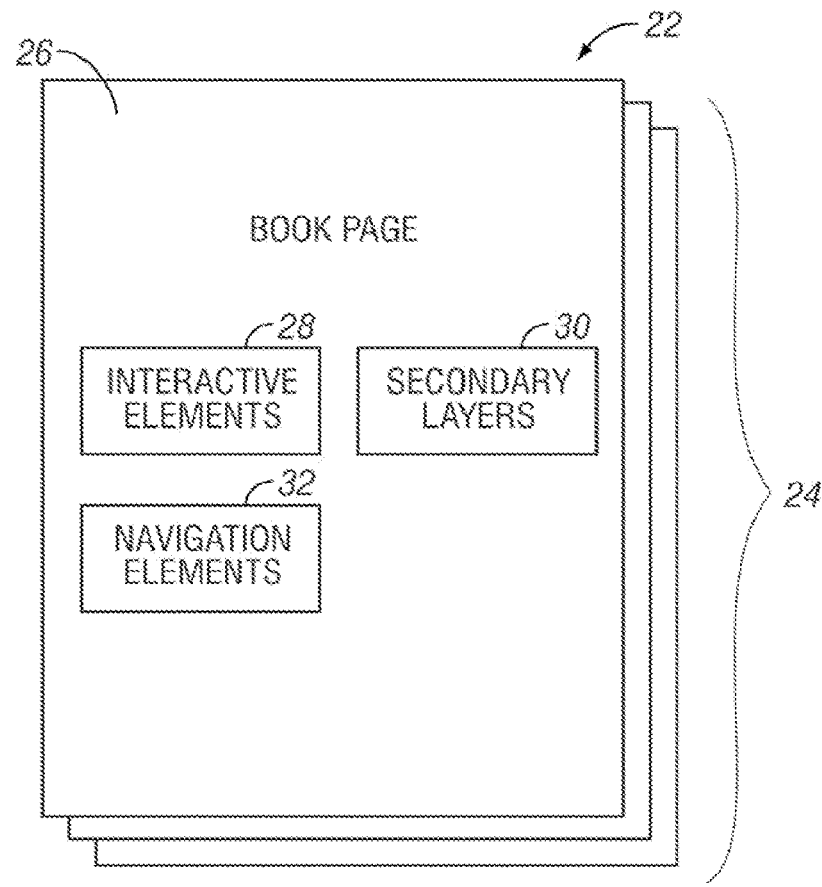
FIG. 2 illustrates an interactive electronic book.

FIG. 2 illustrates an interactive electronic book 22 which includes a plurality of pages 24. A book page 26 is shown. Associated with the book page 26 is a plurality of interactive elements 28. Also on the book page 26 are navigation elements 32. The navigation elements may be used to navigate through the interactive electronic book 22. The user interface as shown simulates the appearance of a traditional print book but also provides for interactive content to be included.

Figure 3:
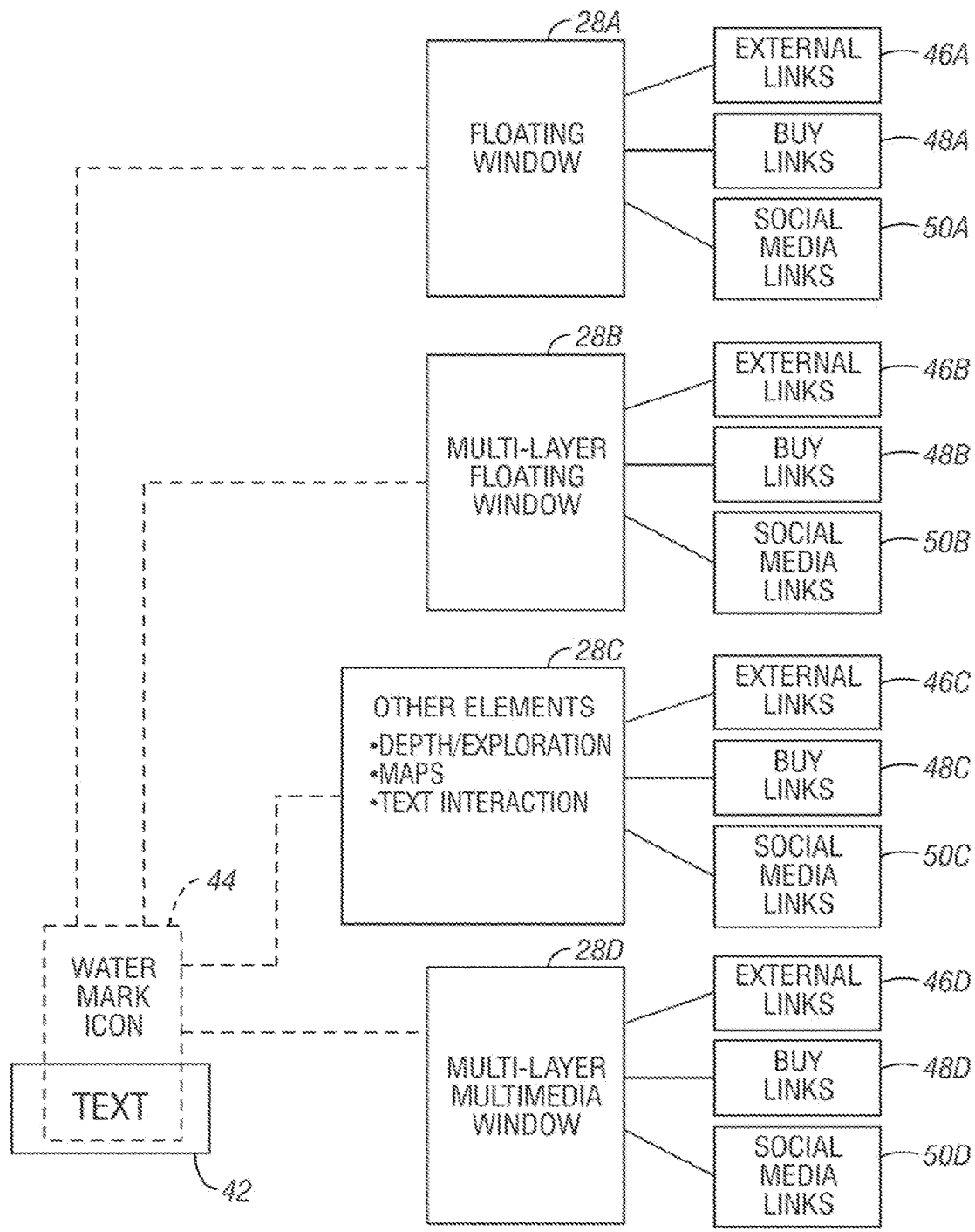
FIG. 3 illustrates one example of associations between text, watermark icon, interactive content, and secondary layers of interactive content.

FIG. 3 illustrates one aspect of the present invention. As shown in FIG. 3 there is text 42 which is a part of the interactive electronic book and is shown on a display. A watermark icon 44 containing an icon or symbol may be present behind the text 42 to indicate the present of additional content which has some relationship to the text 42. The watermark icon 44 may be used to communicate the type of additional content available. The watermark icon 44 may then be selected or activated by a user (such as by touching the corresponding portion of a touchscreen display) to access the additional content. The additional content may be displayed in various ways such as in a floating window 28A, a multi-layer floating window 28B, a multi-layer multimedia window 28D or through other elements 28C of the user interface. Other elements of the user interface may include depth/exploration elements, maps, text interaction elements or other types of elements.

Additional content may also be available. For example, for the floating window 28A, additional content such as external links 46A, buy or purchase links 48A, and social media links 50A may be available. Similarly, for the multi-layer floating window 28B, additional content such as external links 46B, buy or purchase links 48B, and social media links 50B may be available. Similarly for the multi-layer multimedia window 28D, additional or secondary content such as external links 46D, buy or purchase links 48D, and social media links 50D may be available. Similarly for the other elements 28CC, additional or secondary content such as external links 46C, buy or purchase links 48C, and social media links 50C may be available.

Figure 4:
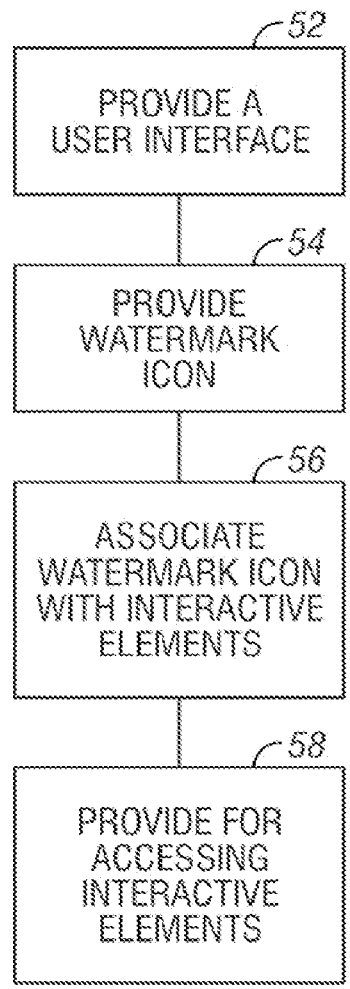
FIG. 4 illustrates one example of a methodology of the present invention.

FIG. 4 illustrates one example of a method of the present invention. In step 52 a user interface is provided. The user interface may be the user interface associated with an application running on a tablet computer such as an APPLE IPAD2. In step 54 a watermark icon is provided. The watermark icon may be presented behind text in the electronic book. In step 56 the watermark icon is associated with interactive elements. In step 58, the method provides for allowing a user to access the interactive elements associated with the watermark icon.

Figure 5:
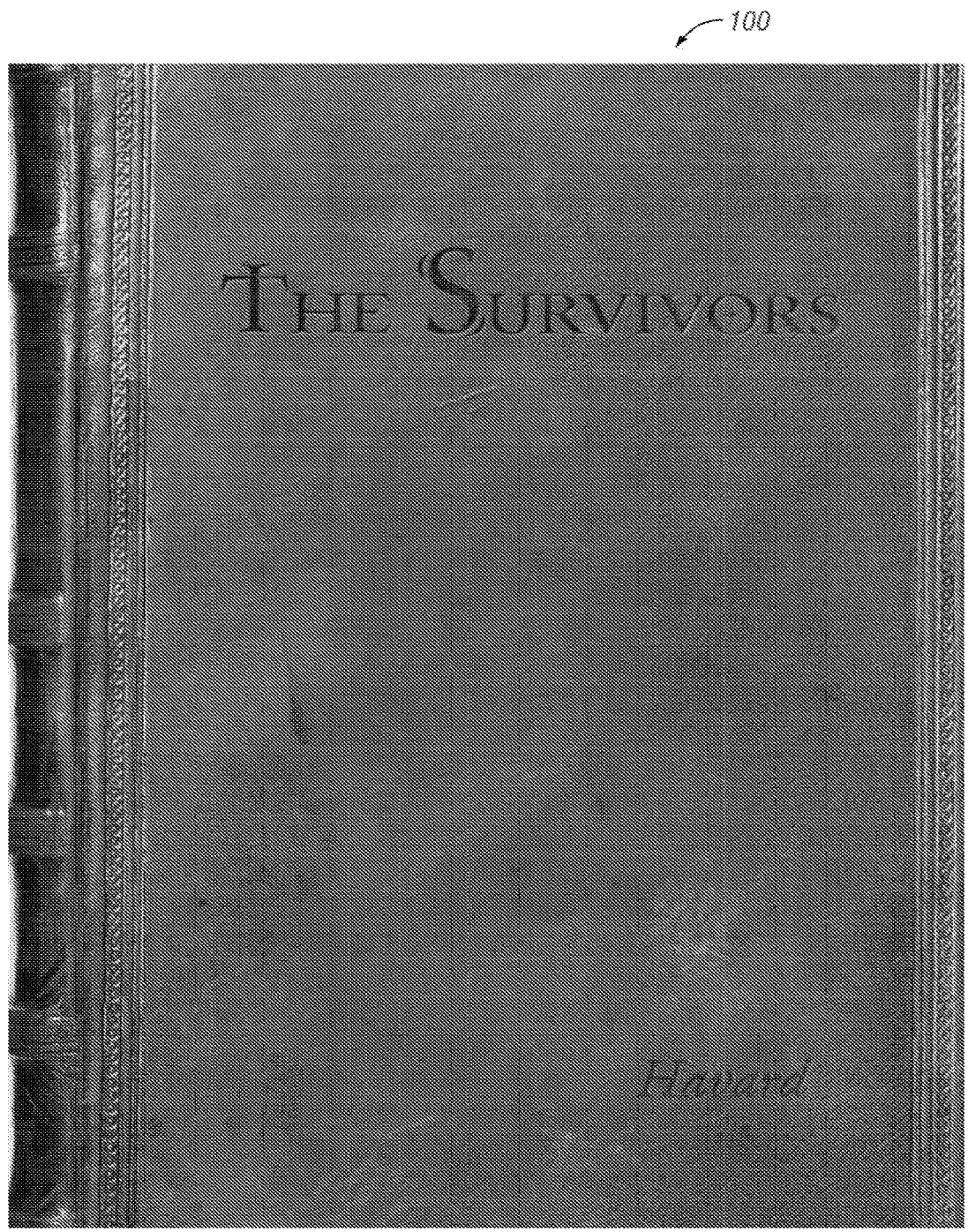
FIG. 5 through FIG. 101 are photographic representations of screen displays from an example of an interactive book, The Survivors, by Amanda Havard.

FIG. 5 illustrates a screen display showing a cover image 100 of an interactive electronic book. Note that the cover image shown simulates the appearance of a traditional print book.

Figure 6:
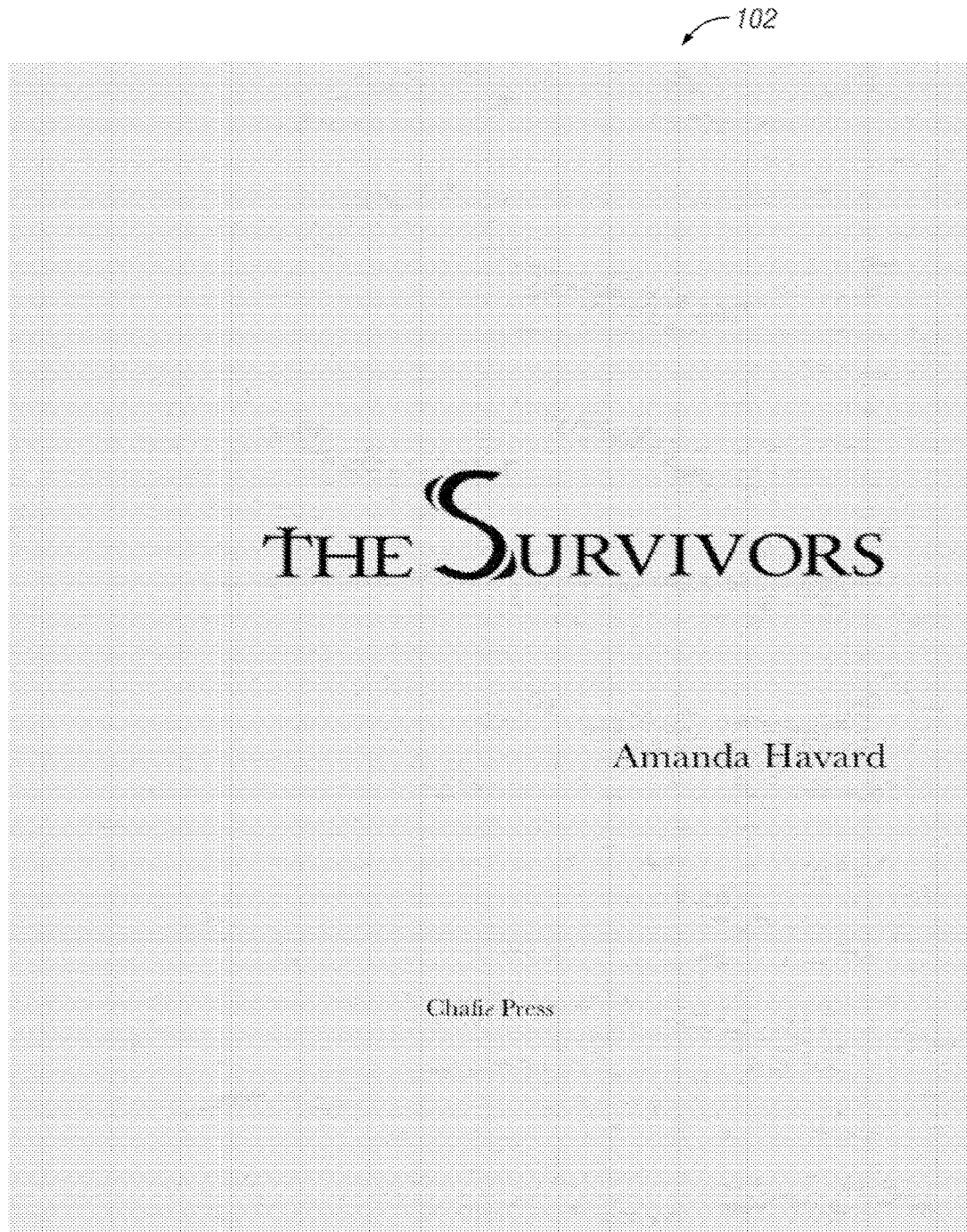

FIG. 6 illustrates a title page 102 for an interactive electronic book.

FIG. 7 illustrates a table of contents 104 for an interactive electronic book. Note that the table of contents 104 need not have page numbers as found in a traditional print book.

Figure 8:
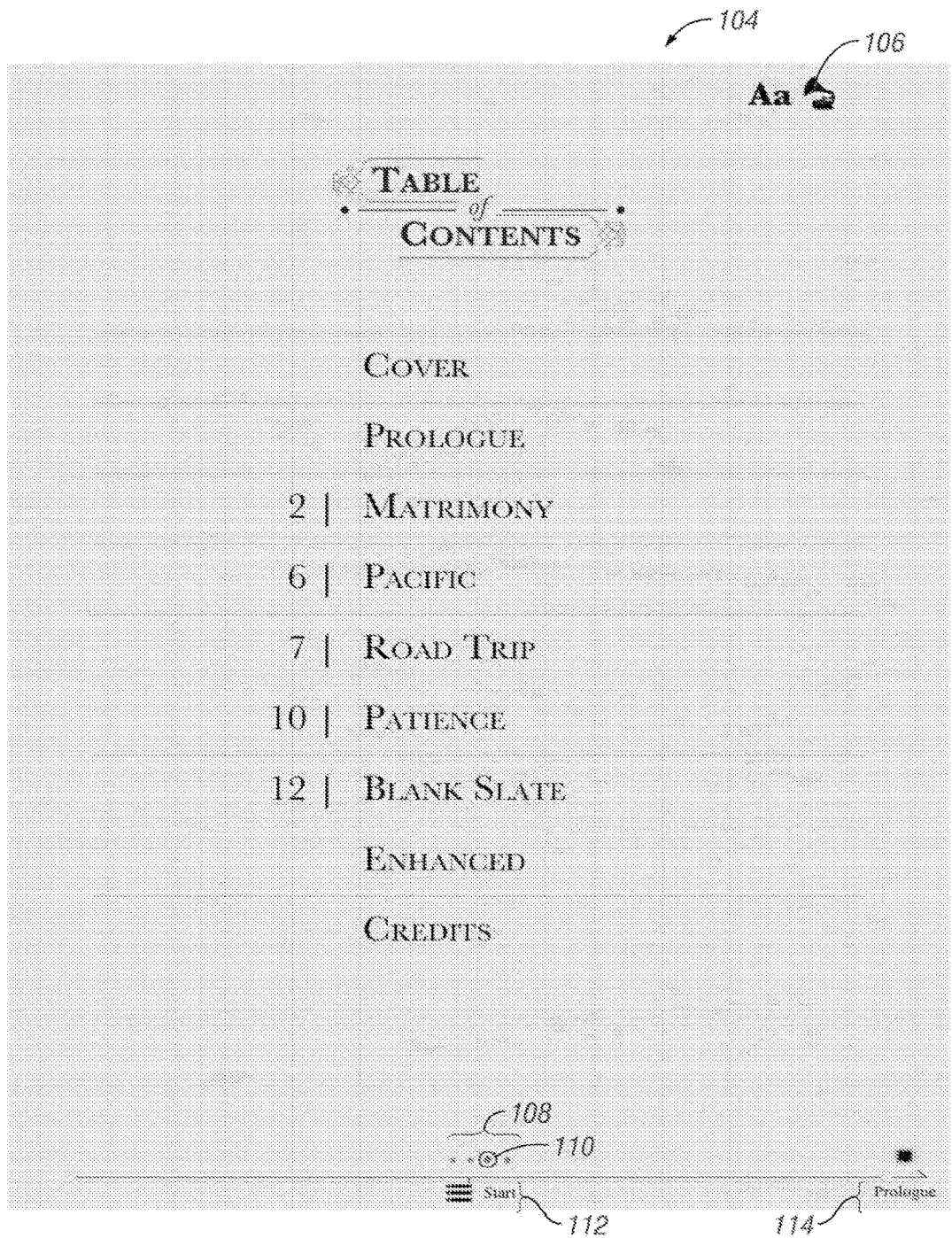

FIG. 8 illustrates the table of contents 104 as shown in FIG. 7 but with additional functionality. At the top of the table of contents 104 is an image of a phonograph 106. The presence of the phonograph 106 indicates the presence of audio content. Also on the bottom of the table of contents 104 additional navigation elements are provided. A number of elements 108 are shown to indicate the distinct pages within a chapter or section of the interactive book. One of these elements 110 designates the current page being viewed. Thus, in this fashion one can determine their progress within a particular chapter or section of the interactive book. Also as shown in FIG. 8, the next chapter or section 114 is illustrated at the bottom right and the current chapter or section 112 is designated at the bottom middle of the page.

Figure 9:
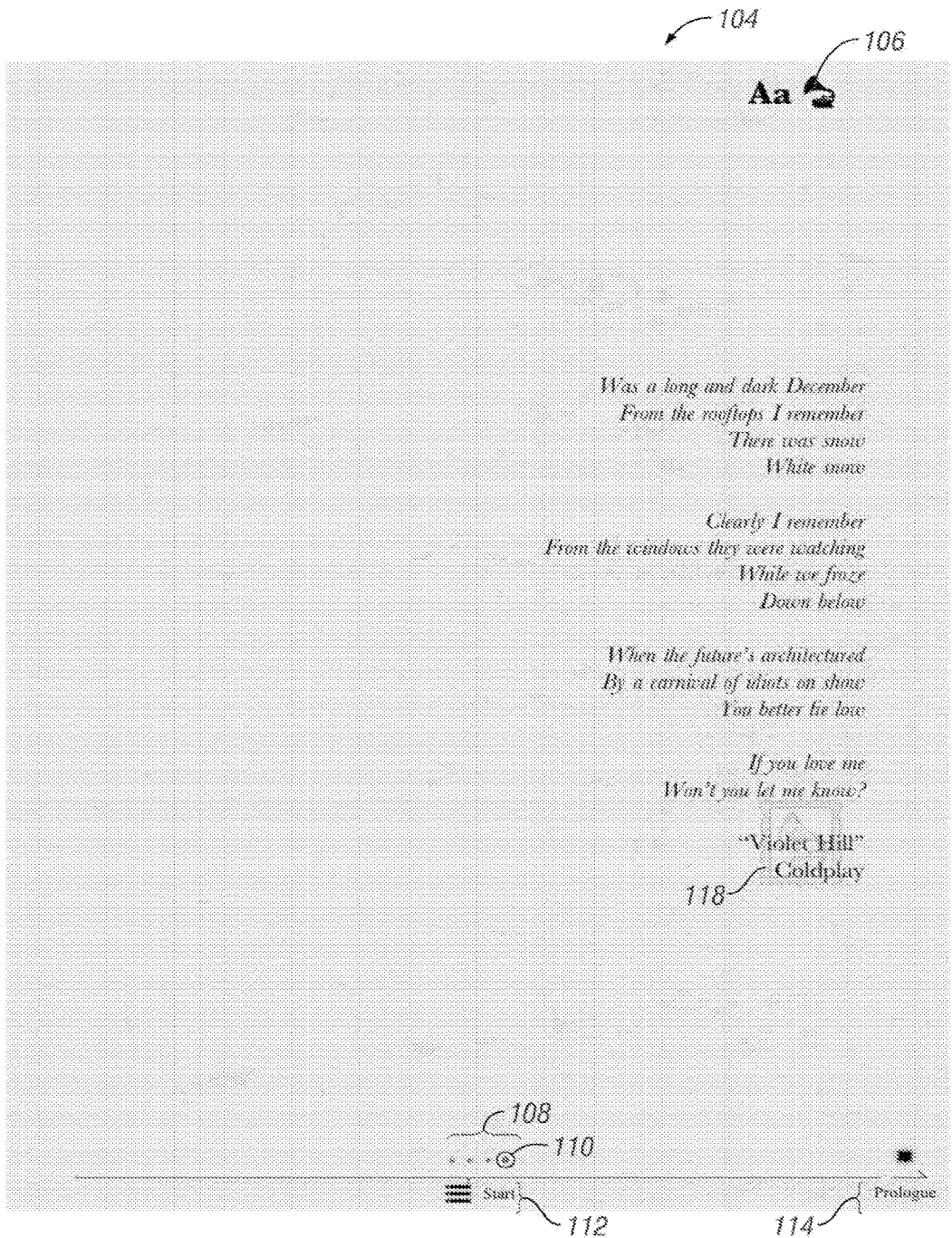

FIG. 9 illustrates another page 116 which includes elements similar to those on the previous pages. In addition, as shown in FIG. 9, a water mark element 118 is shown which pictures a phonograph. The watermark element 118 is a watermark icon of an interactive content. The use of the phonograph is indicative of the type of content, namely audio content. The use of the watermark element is unobtrusive to the reader, making the reader aware of the presence of interactive content and aware of the type of interactive content (audio) and what the interactive content is, such as a song, in this instance "Violet Hill" by Coldplay.

Where audio content is provided, the present invention contemplates that audio content is selected which adds to the story being communicated. Thus, for example, playing a song during a particular passage assists in setting a mood or eliciting an emotional response from a reader/listener. Thus, providing audio content enriches the reading experience by providing another way in which an author can communicate their story to the reader.

Figure 10:

FIG. 10 illustrates the same page 116 shown in FIG. 9. FIG. 9 illustrates that should the reader want to learn more about the interactive content associated with the watermark 118 (from FIG. 9), the user can select the watermark 118 (from FIG. 9) and a floating window 120 appears. The floating window 120 provides additional information about the interactive content, in this case audio, and in particular a song. For example, the floating window 120 may include an album cover 122, audio controls 124 (such as a play/pause button), and additional information about the content such as the artist, song, and album. In addition, a buy button 126 may be present. The buy button 126 allows the reader to purchase the song through the interactive book.

Figure 11:

FIG. 11 illustrates the same page 116 with the floating window 120 floating unobtrusively at the top of the page 116 so as not to interfere with reading of the page 116. Note that as the reader reads the text on the page 116, the reader can choose to stop the audio associated with the floating window 120 at any time.

Figure 12:
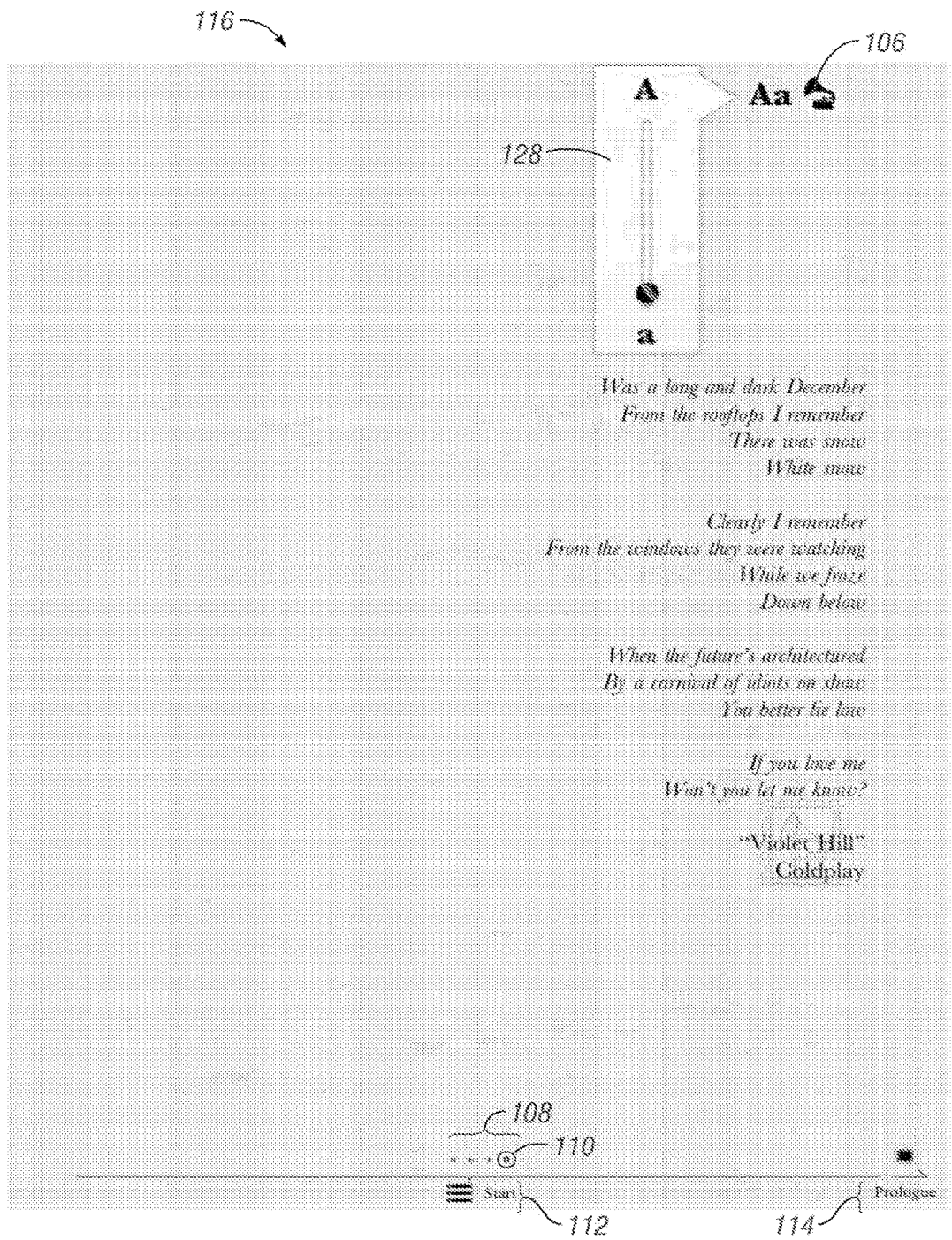

FIG. 12 illustrates that a reader may select the image of the phonograph 106 (which indicates that audio content is available) so that a volume control 128 associated with the audio content is made available.

Figure 13:
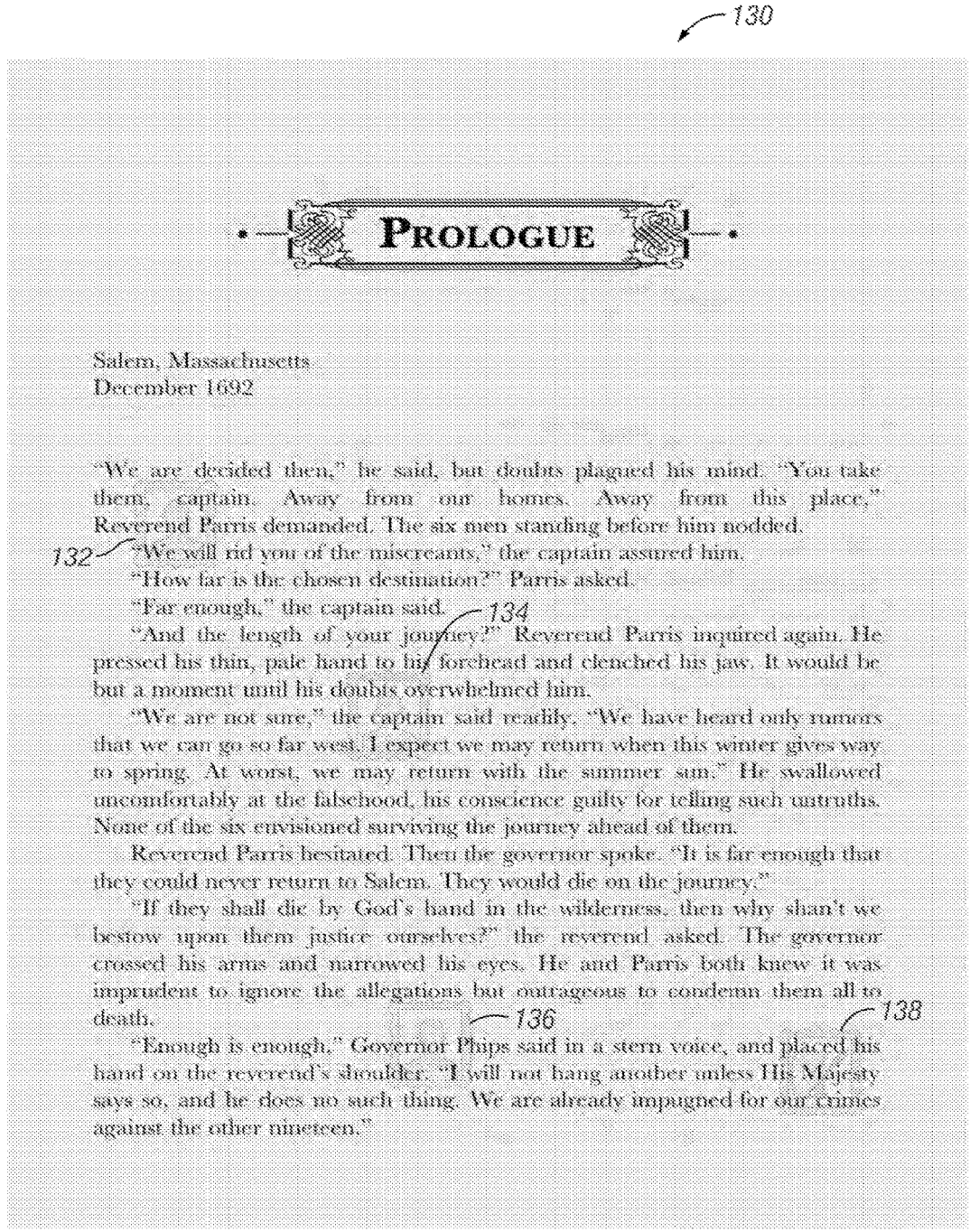
Figure 14:
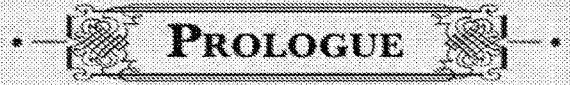

FIG. 13 and FIG. 14 illustrate a page 130 from the prologue of the interactive electronic book. There is a plurality of watermark icons of interactive elements 132, 134, 136, 138.

Figure 15:
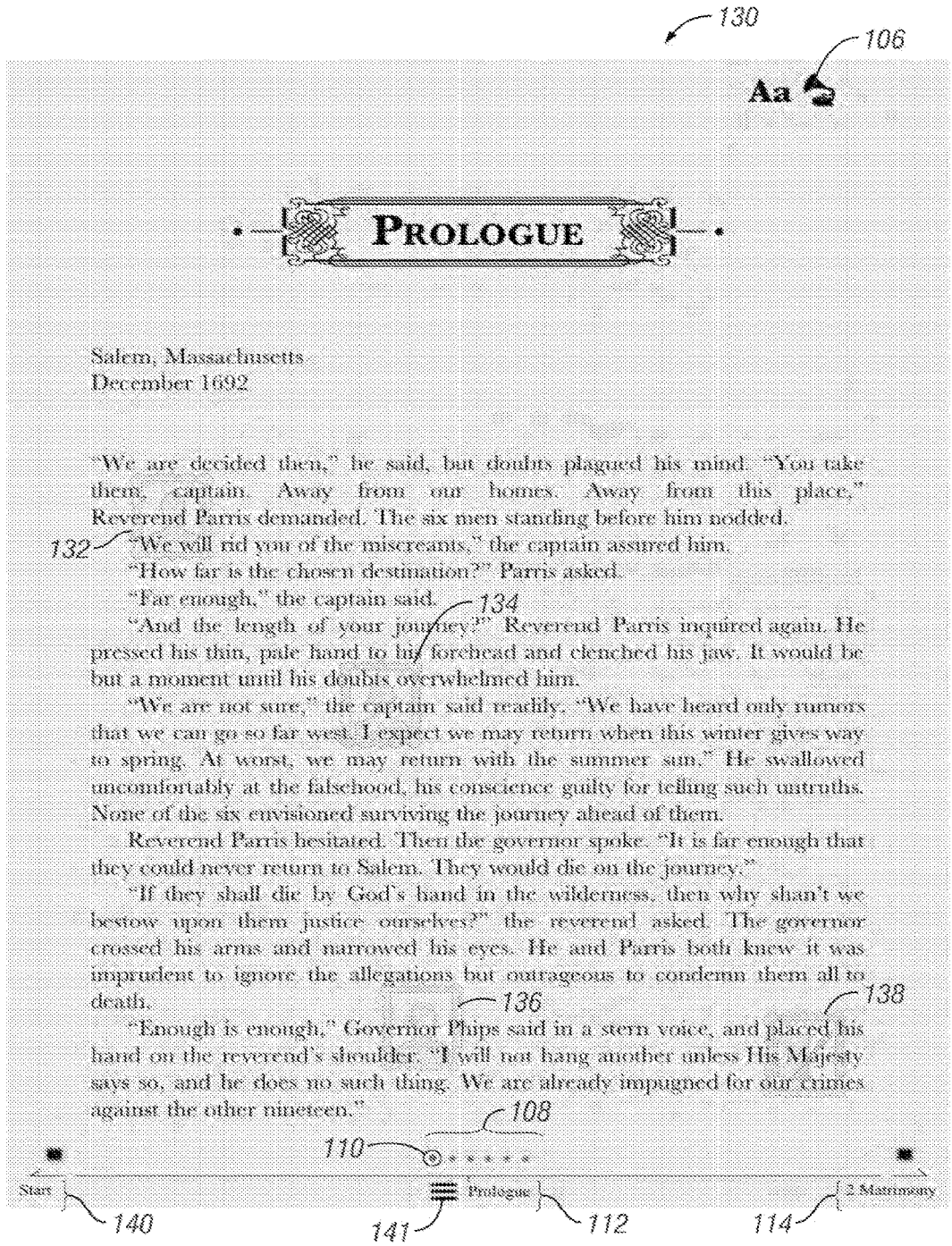

FIG. 15 illustrates the page 130 with watermark icon of interactive elements 132, 134, 136, 138. Note that the page 130 is a part of the prologue thus the current chapter or section 112 at the bottom middle of the page indicates the prologue. The next chapter or section 114 now indicates that Matrimony is next. Also a previous chapter or section 140 indicates Start. Similarly, a number of elements 108 are used to show location within the prologue chapter. A table of contents symbol 141 is also provided which may be selected by a user to see the table of contents.

Figure 16:
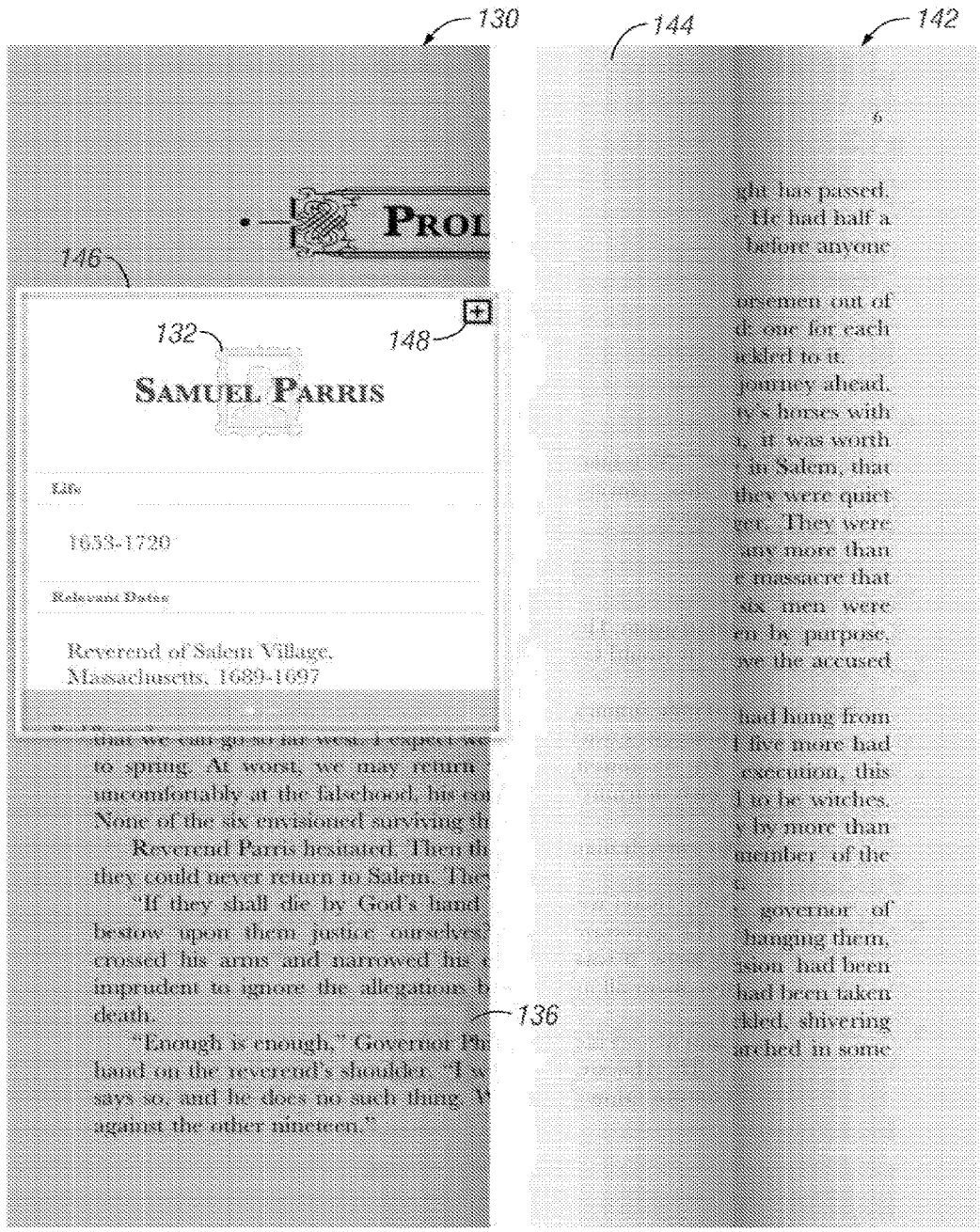

FIG. 16 illustrates the page 130 of the interactive electronic book in the process of being "turned" to the next page 142. The interactive electronic book simulates the page turning of a traditional print media book. During the transition from page 130 to page 142, a simulated back 144 of page 130 is shown. Note that the simulated back 144 is slightly translucent so that one can see text associated with page 130, the same text as would be expected if page 130 was paper.

Also shown in FIG. 16 is a floating window 146 about a character in the interactive electronic book. The floating window 146 is associated with the watermark icon of interactive elements 132 (as shown in FIG. 13 through FIG. 15) and also shown in the floating window 146. Here, the interactive content includes additional information about the character Samuel Parris. In this particular instance the interactive electronic book is historical fiction and thus the information about the character may include historical information and/or fictional information. A control 148 is also shown within the floating window 146 in order to maximize the display.

Figure 17:
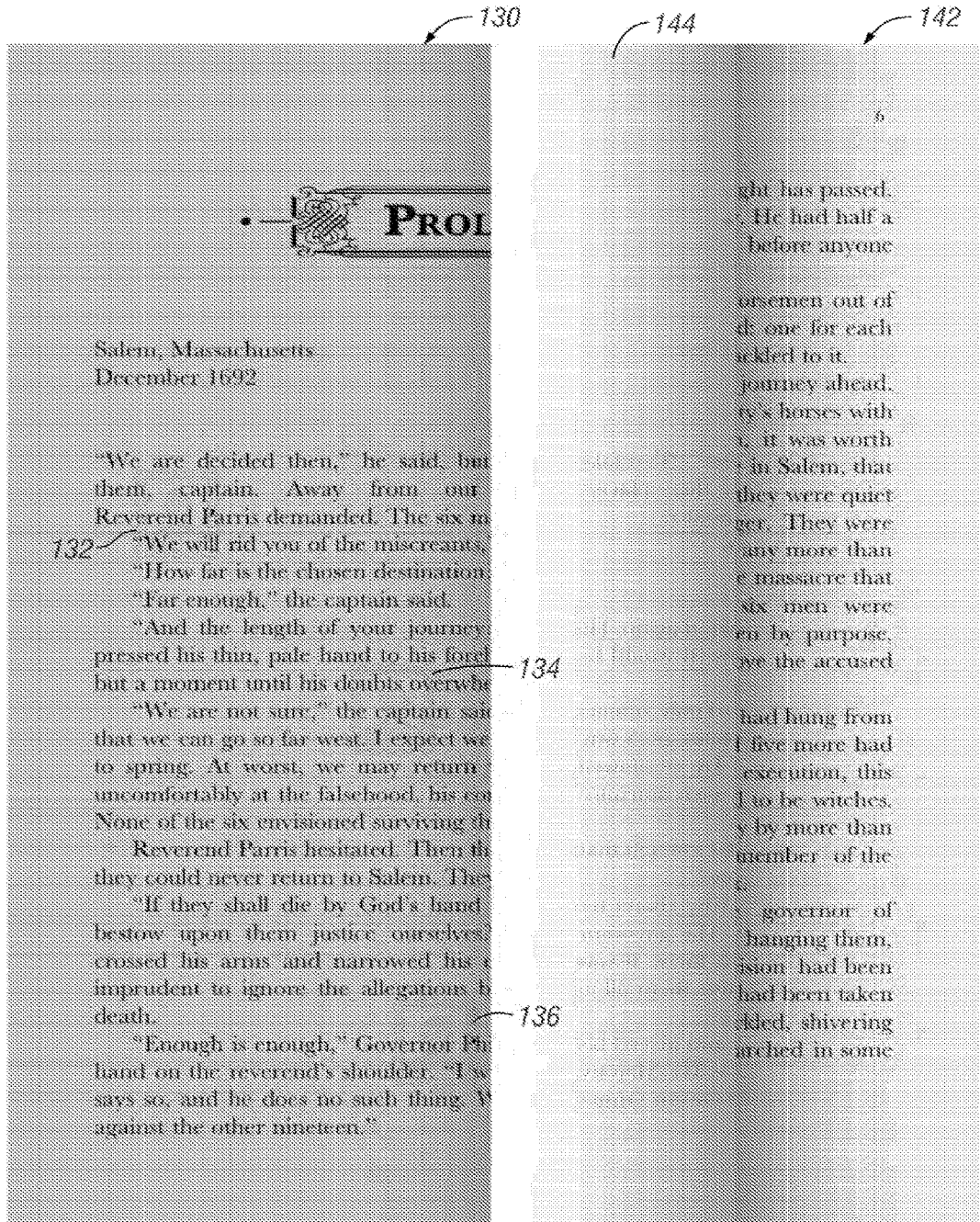
Figure 18:
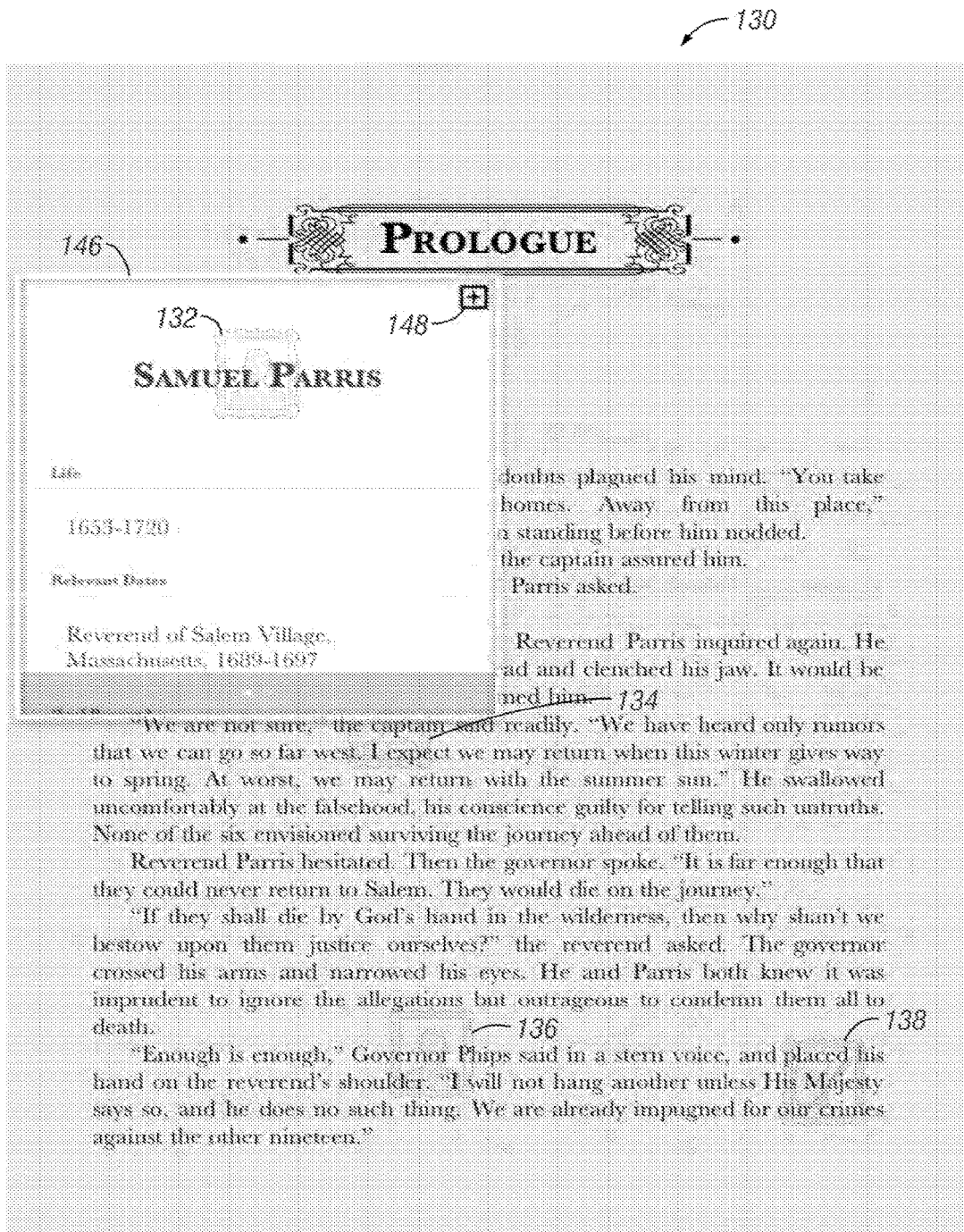
Figure 19:
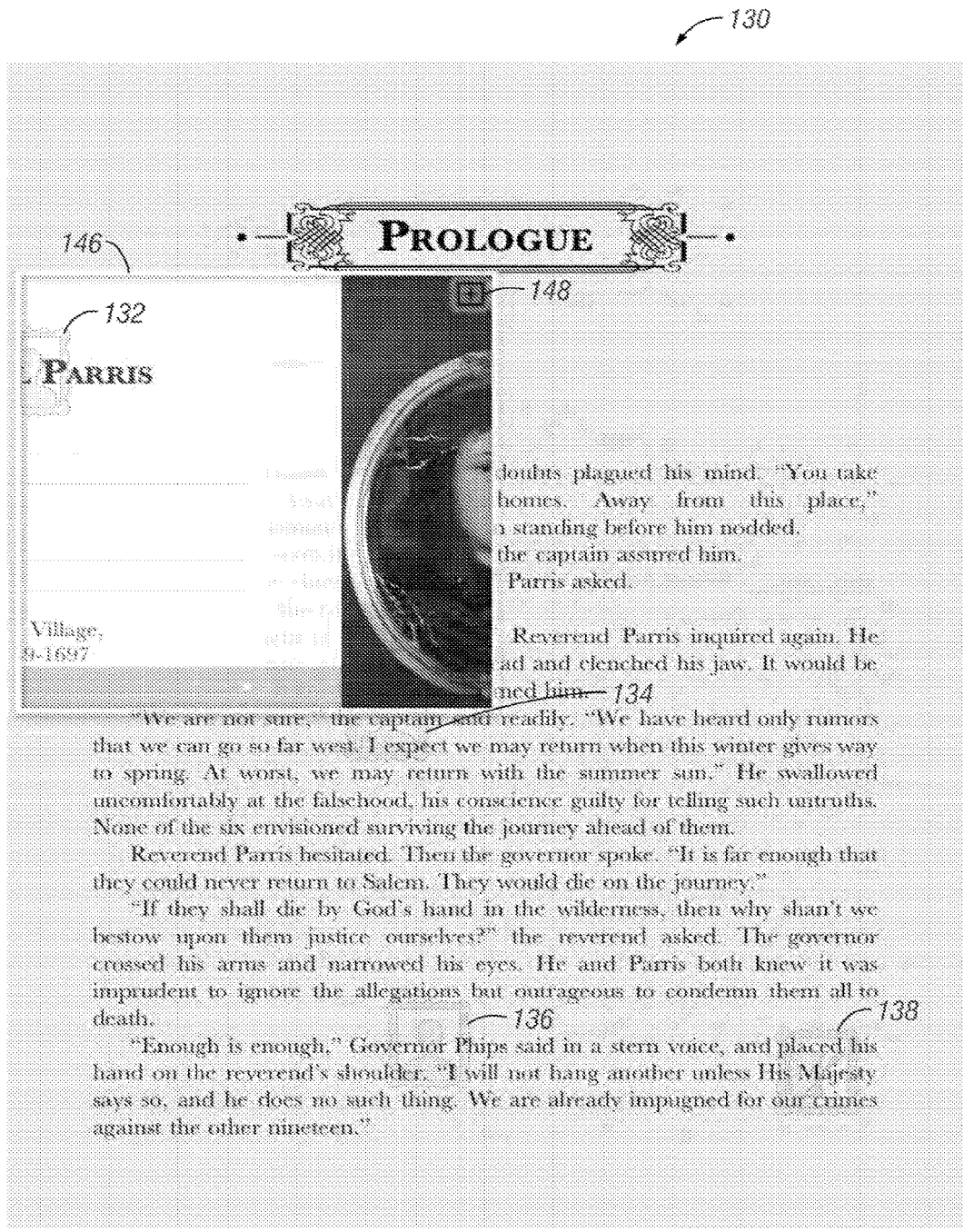
Figure 20:
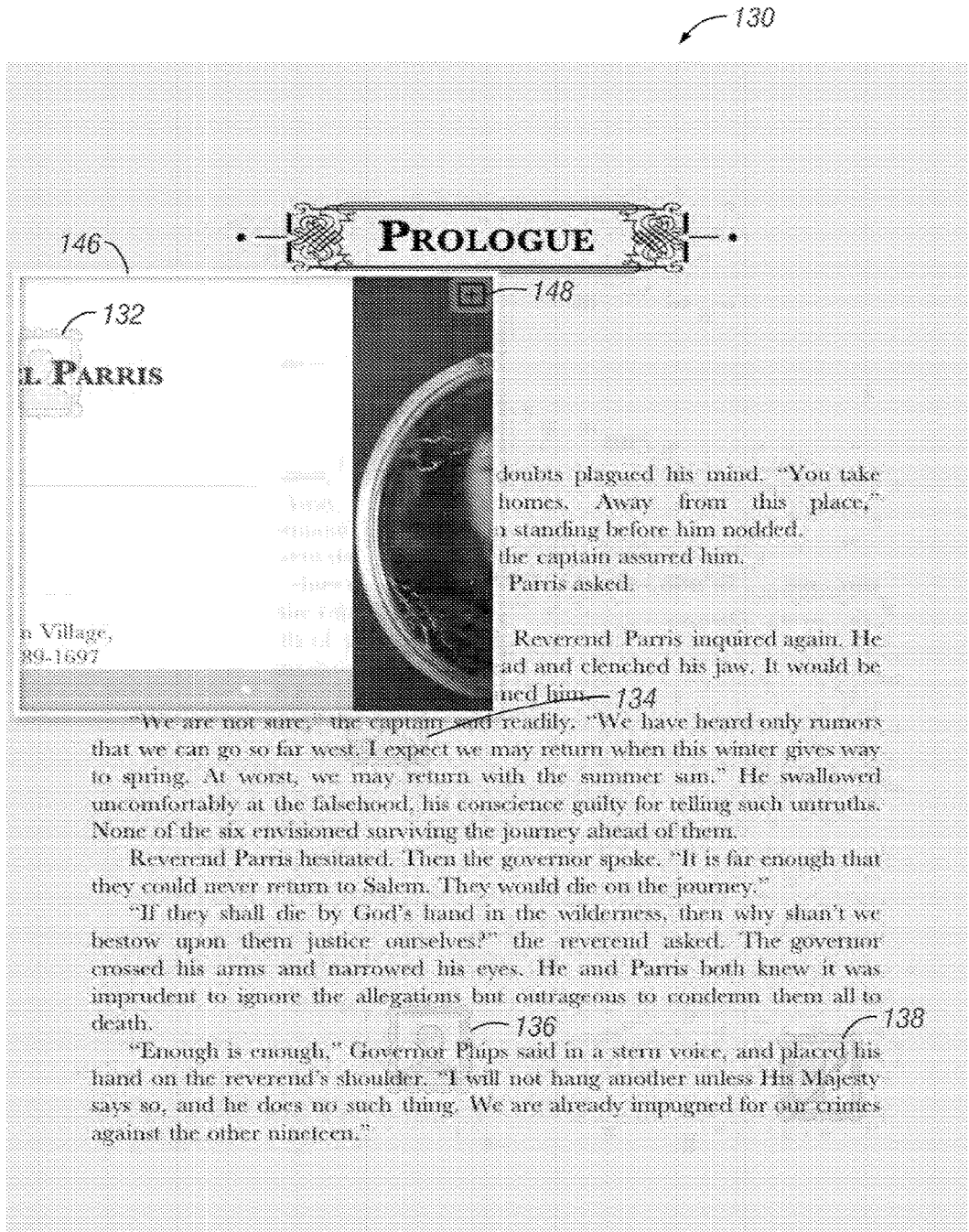
Figure 21:
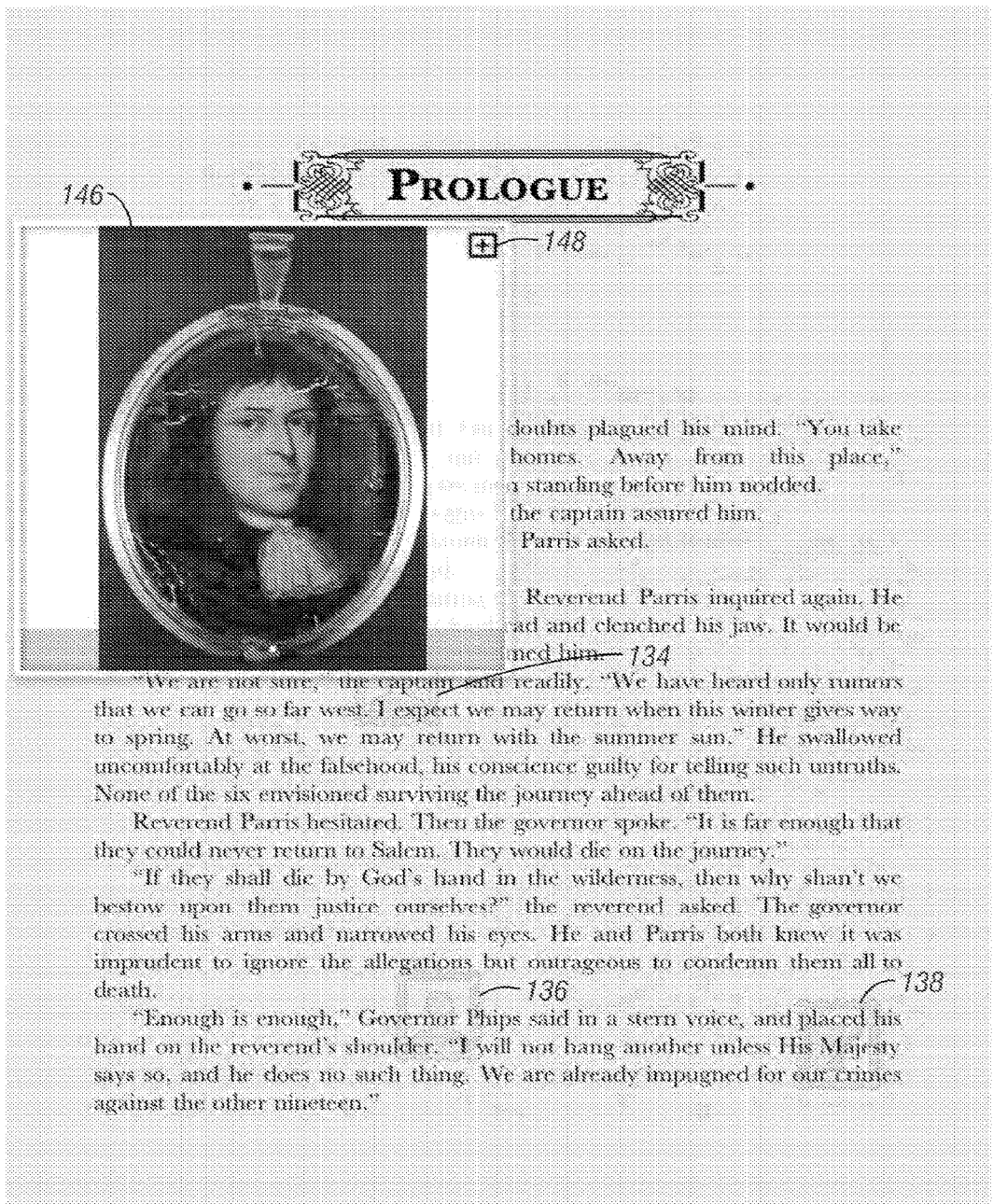

FIG. 17 illustrates the turning of the page from page 130 to the next page 142 but without any floating windows present.

FIG. 18 through FIG. 21 illustrate page 130 where a floating window 146 is present to provide information associated with a character such as a character profile. Note that the floating windows allow a reader to see what additional content is available while the page 130 of the book remains in view. Where a character profile is presented the present invention contemplates that the character profile may be a progressive character profile. According to this aspect of the present invention, the content of the character profile is dependent upon where the reader's progress within the book. Thus, at the beginning of the book when a reader accesses the character profile they will only access a subset of a full and complete character profile. At the end of the book, when a reader accesses the character profile they will be access the full and complete character profile. Thus, the progressive character profile allows for gradual revelation of a character and avoids the character profile from revealing information that would give away or "spoil" the story for the reader.

Figure 22:
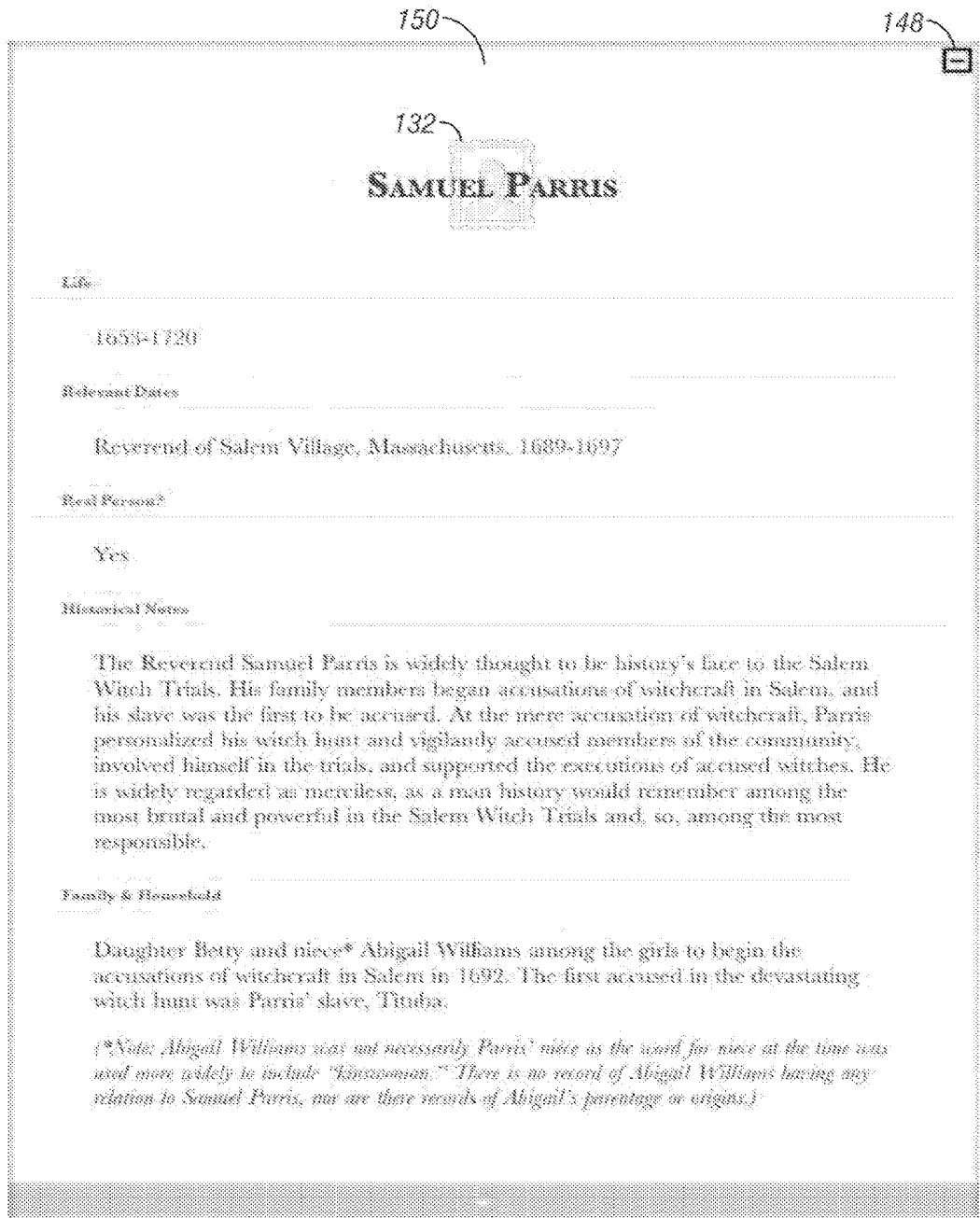
Figure 23:
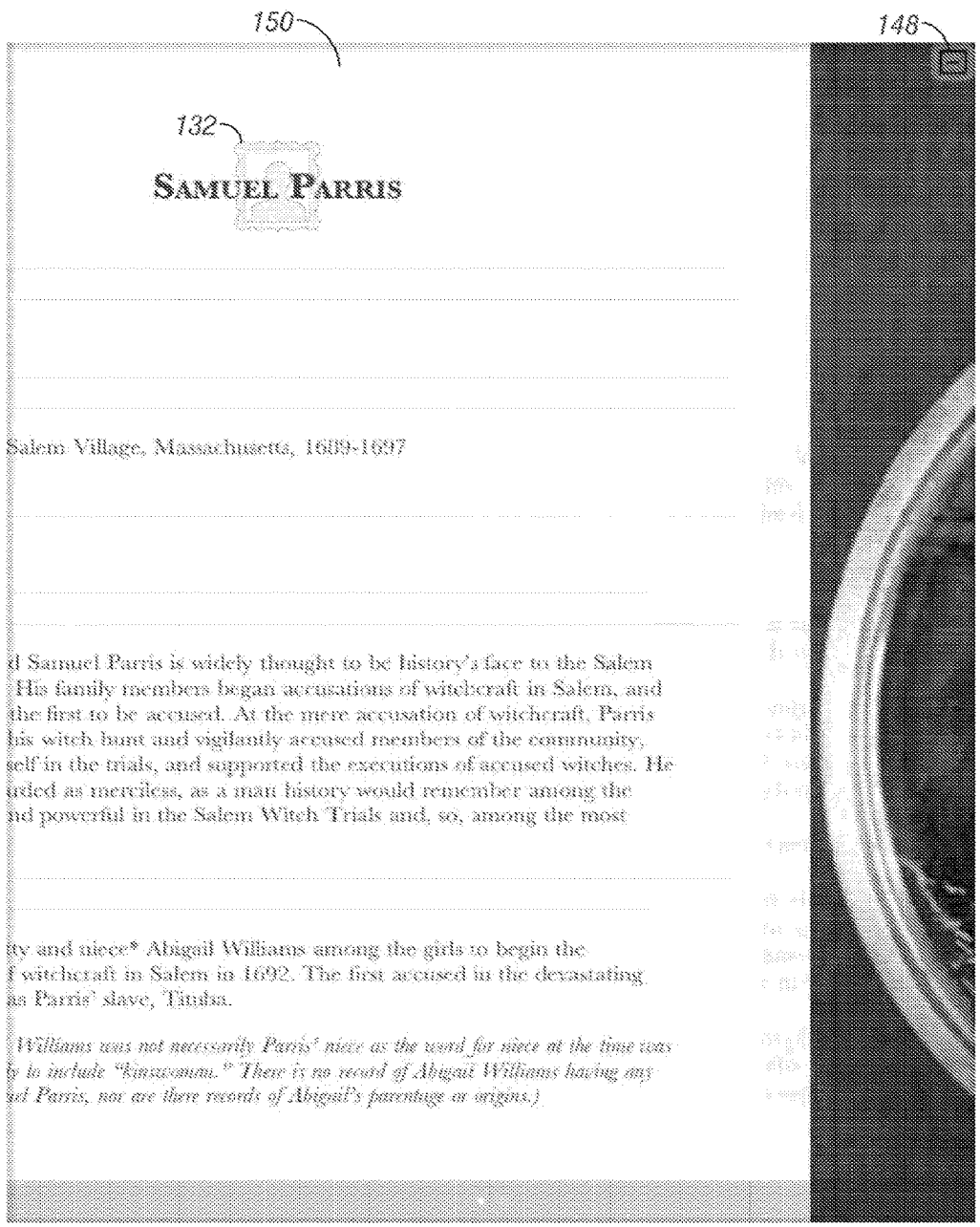

FIG. 22 and FIG. 23 illustrate views when the floating window 146 of FIGS. 18-21 has been maximized with control 148 to show window 150. Note that the content made available in maximized window 150 was previewed through the floating window. Thus, in order for the maximized window 150 to be displayed, the reader must make a conscious choice to navigate away from page 130. This choice is an informed choice because the reader has the benefit of the floating window 146.

Figure 24:
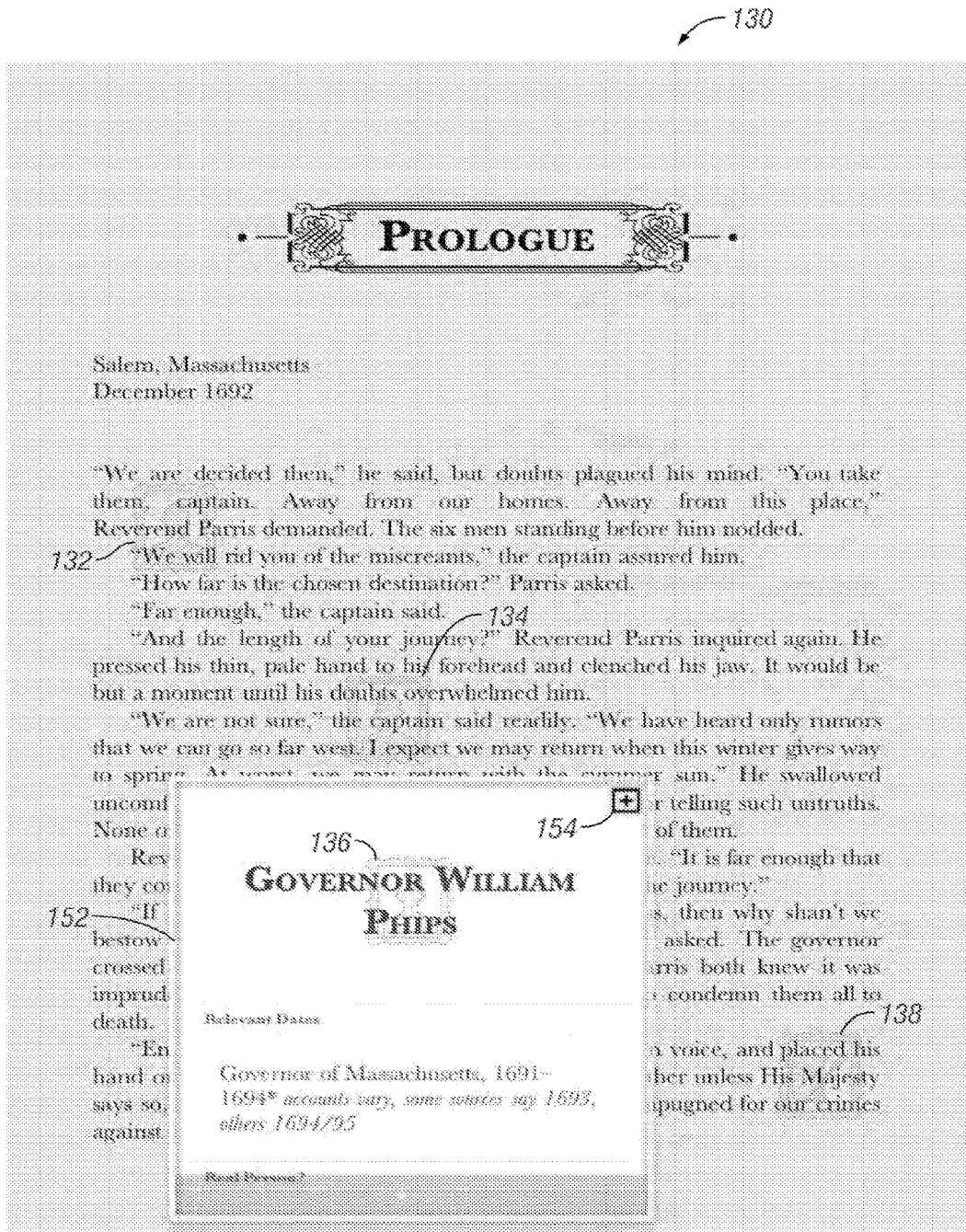

FIG. 24 is another view of page 130, this time showing a floating window 152 associated with the watermark icon 136. The floating window 152 has a maximize/minimize control 154 as shown.

Figure 25:
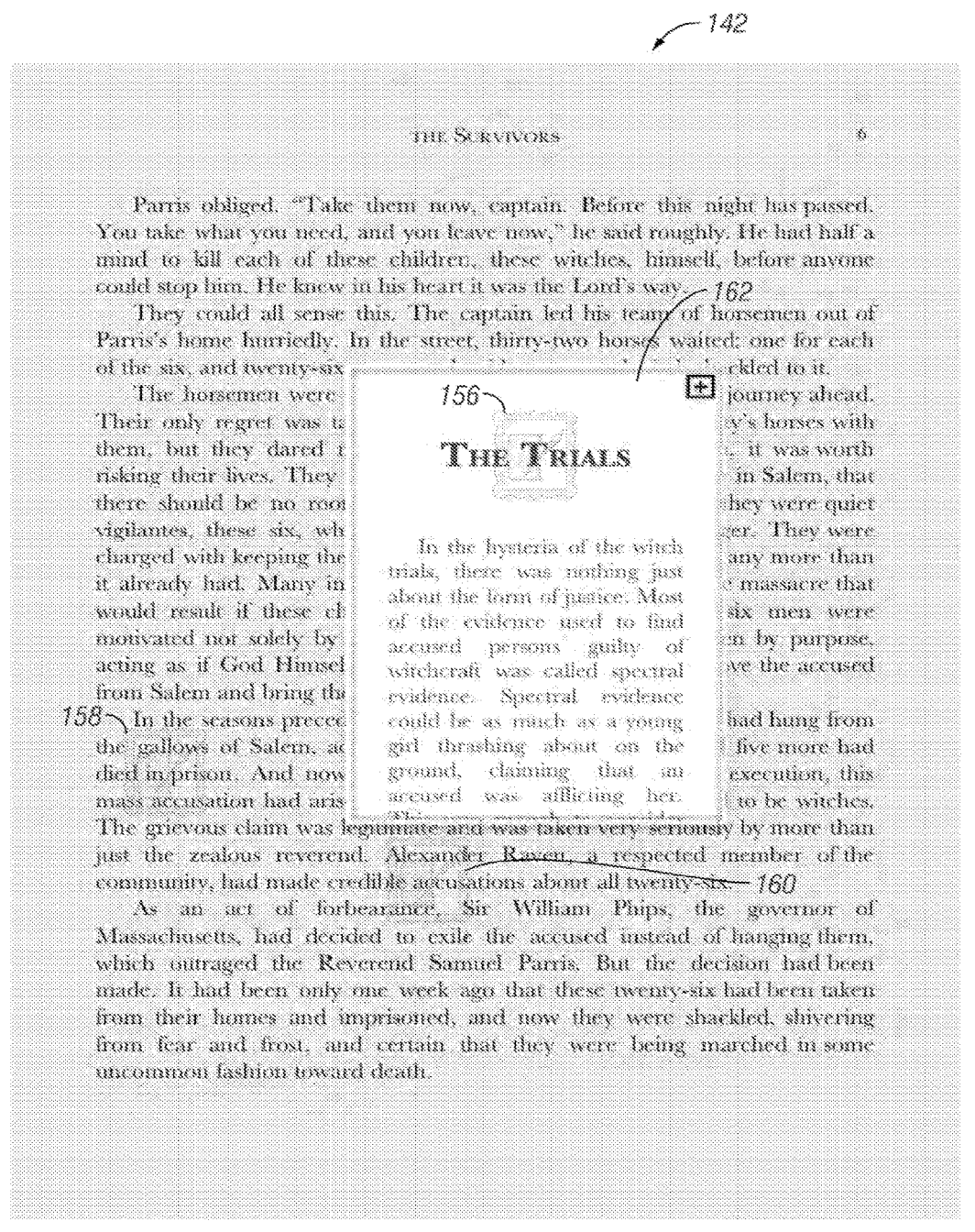

FIG. 25 illustrates a view of a page 142 with interactive elements indicated with watermark icon 156, 158, 160. In addition, a floating window 162 is shown associated with the watermark icon 156.

Figure 26:
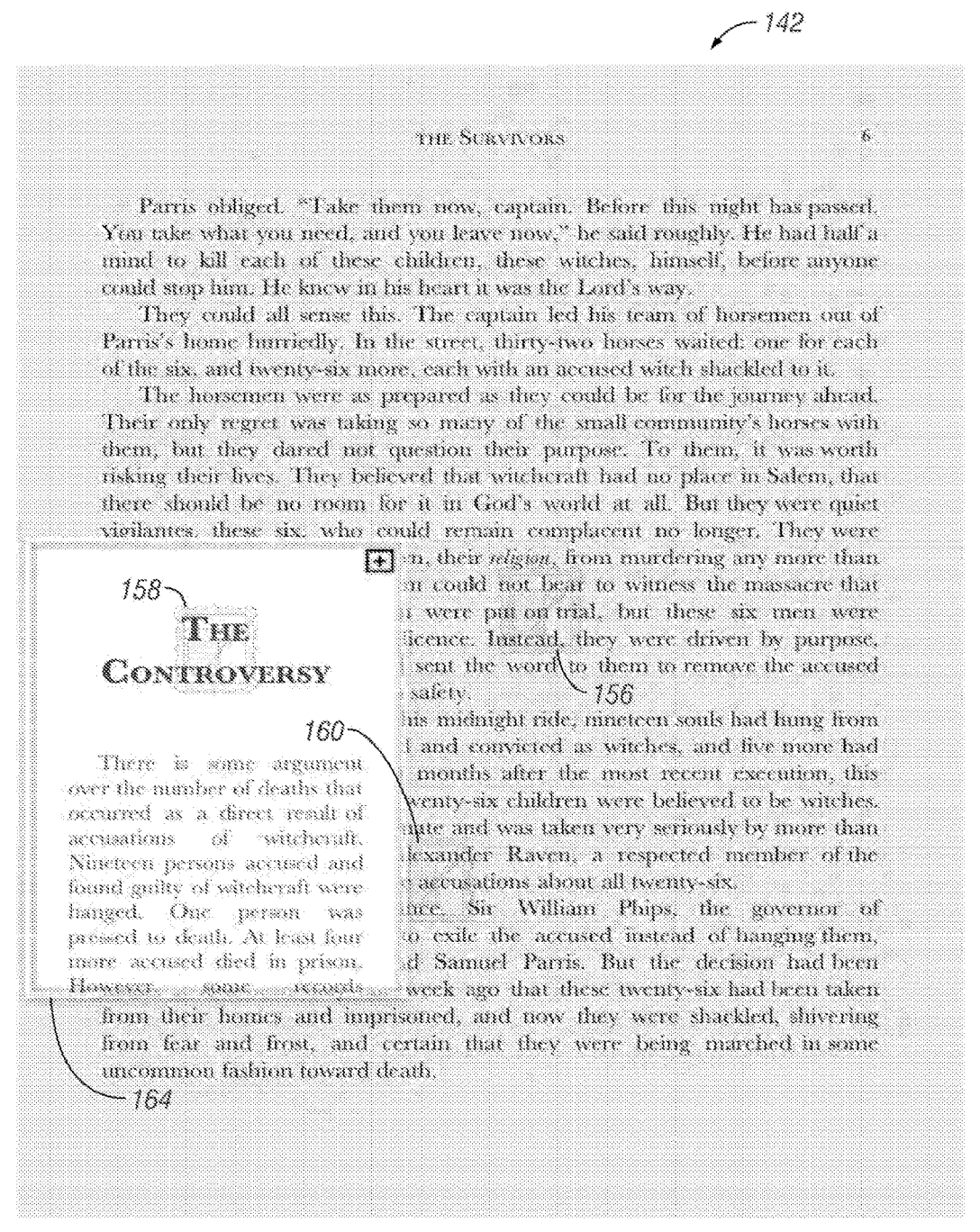

FIG. 26 illustrates another view of the page 142 with interactive elements indicated with watermark icon 156, 158, 160. In addition, a floating window 164 is shown which is associated with the watermark icon 158.

FIG. 27 illustrates another view of the page 142 with interactive elements indicated with watermark icon 156, 158, 160. In addition, a floating window 166 is shown which is associated with the watermark icon 160.

Note that the watermark icon 156, 158, 160 are indicative of historical data which in historical fiction can provide valuable information to readers who may not already be familiar with the information. The watermark icon 156, 158, 160 include an icon associated with the type of content present.

The present invention contemplates that any content type may be used in the interactive electronic book and appropriate watermark icon may be used to convey the content type to the reader.

Figure 28:
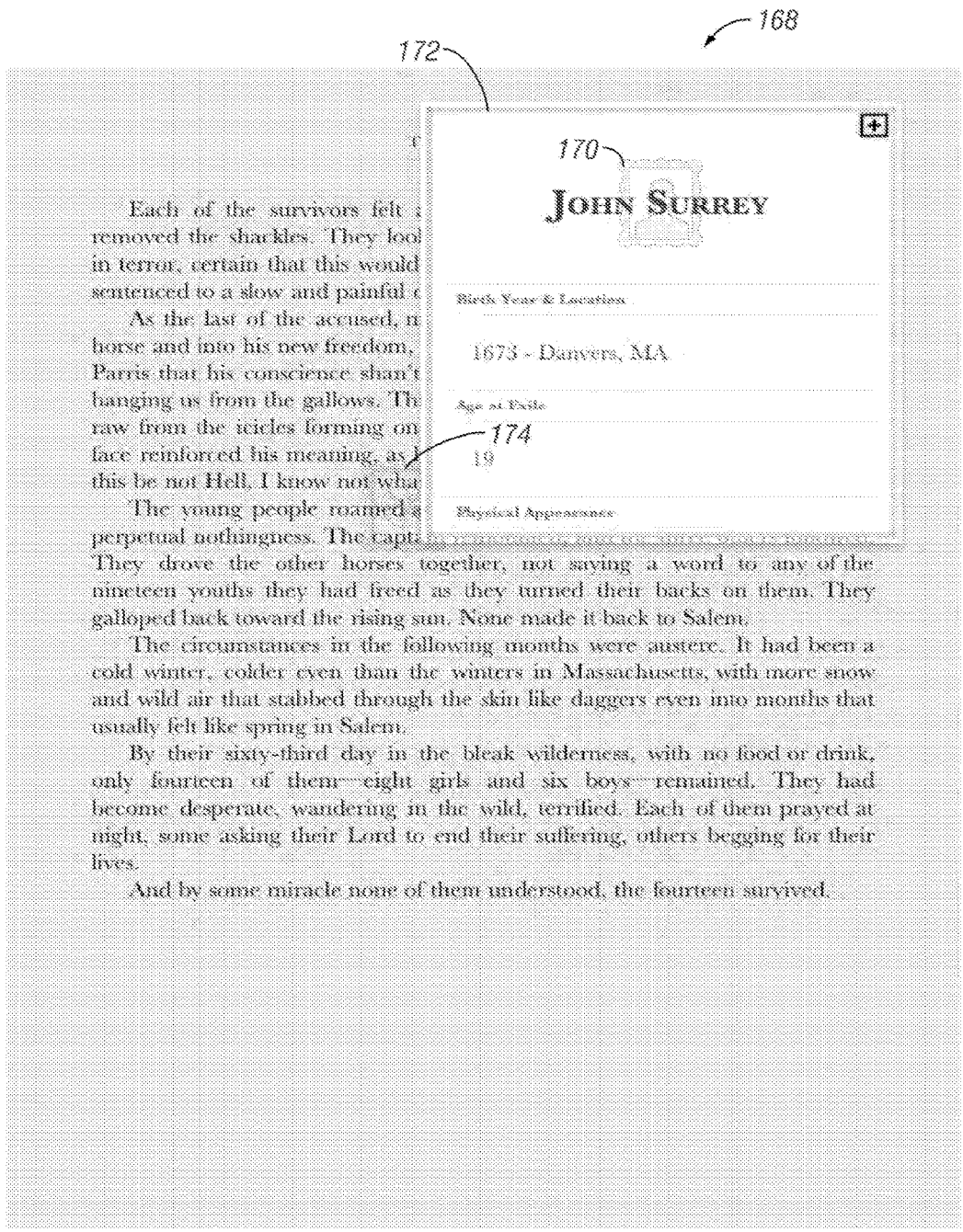
Figure 29:
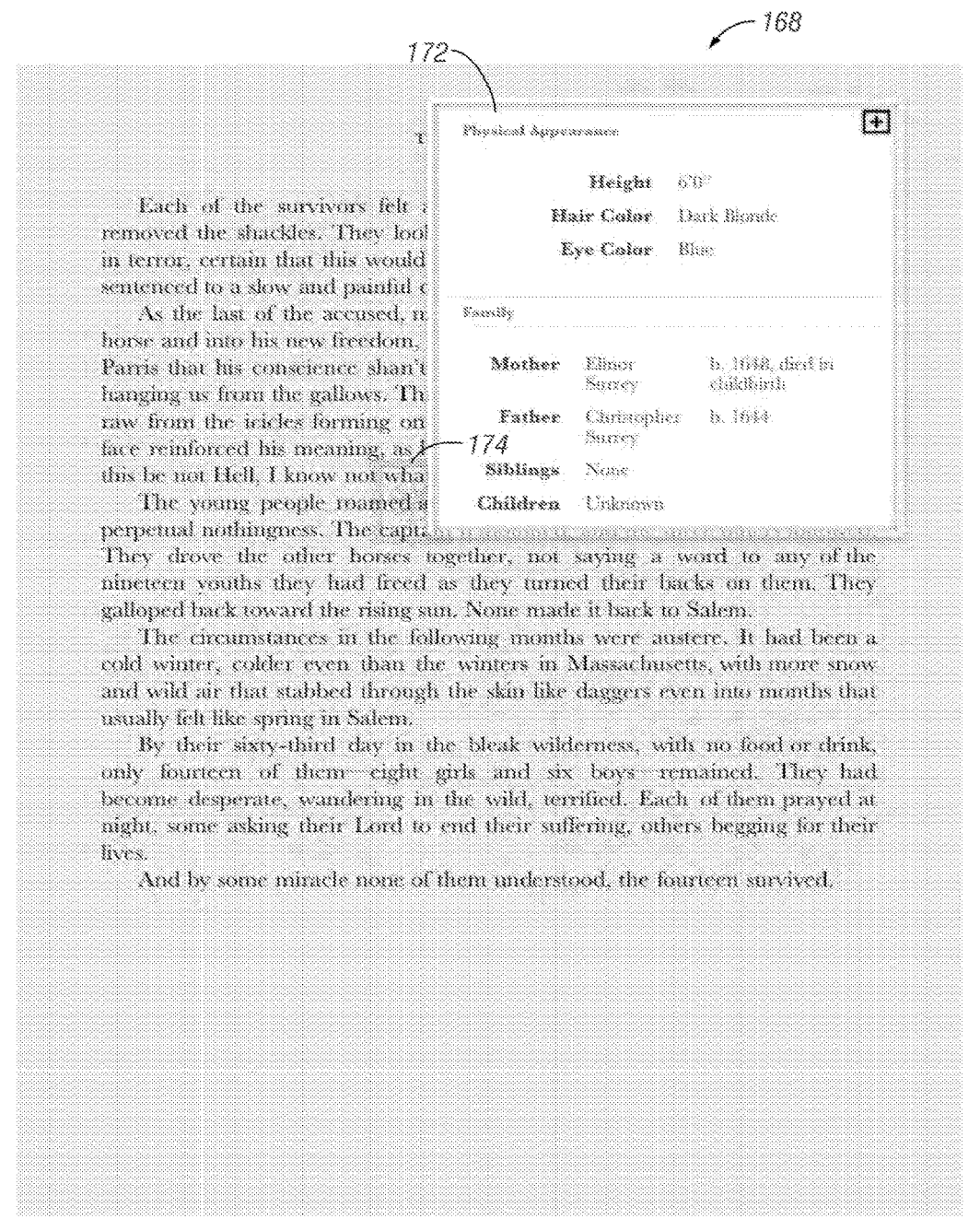

FIG. 28 illustrates a page 168 which includes watermark icon 170 (indicative of a character) and watermark icon 174 (indicative of a map). A floating window 172 is shown to provide additional information about the interactive content available without requiring the reader to leave page 168. FIG. 29 shows additional character information in the floating window 172. The present invention contemplates that where character information is provided, the character information may include age information, physical characteristics, relationships with other people, and other information relevant to the story.

Figure 30:
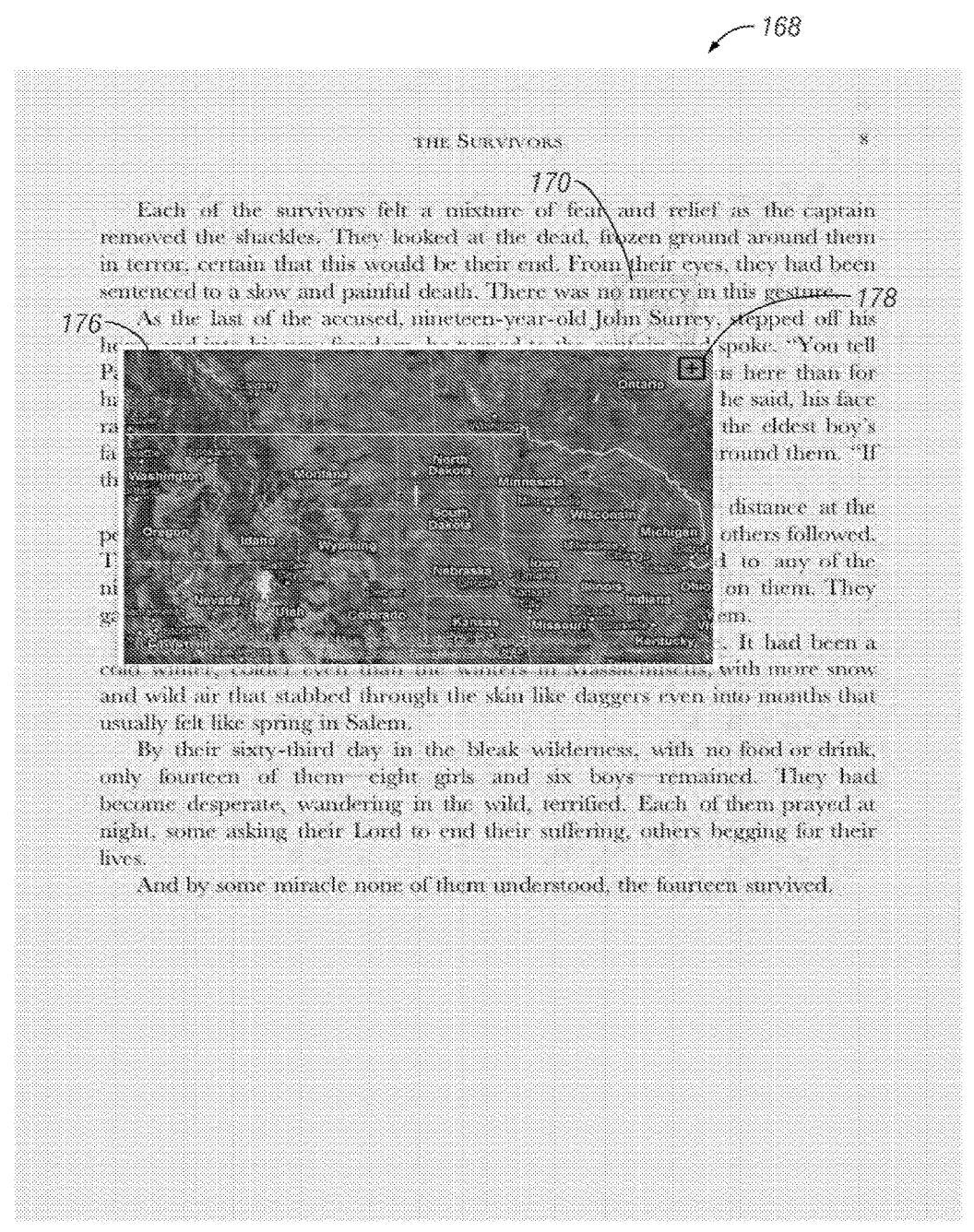
Figure 31:

FIG. 30 illustrates another view of page 168 with a floating window 176 which provides a map relevant to the story. The floating window 176 may be maximized through use of the control 178. FIG. 31 illustrates a maximized window 180 with the map.

Figure 32:
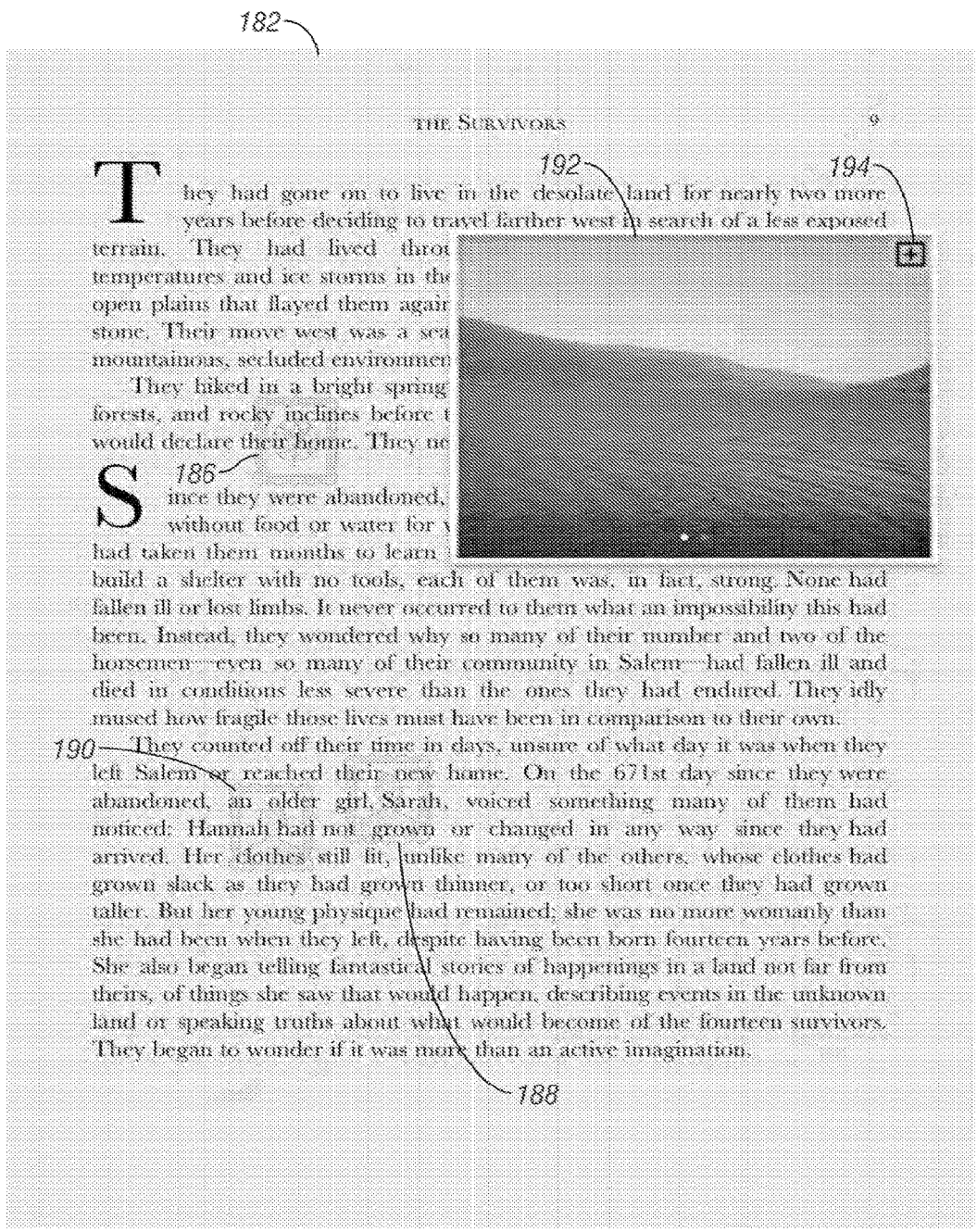
Figure 33:
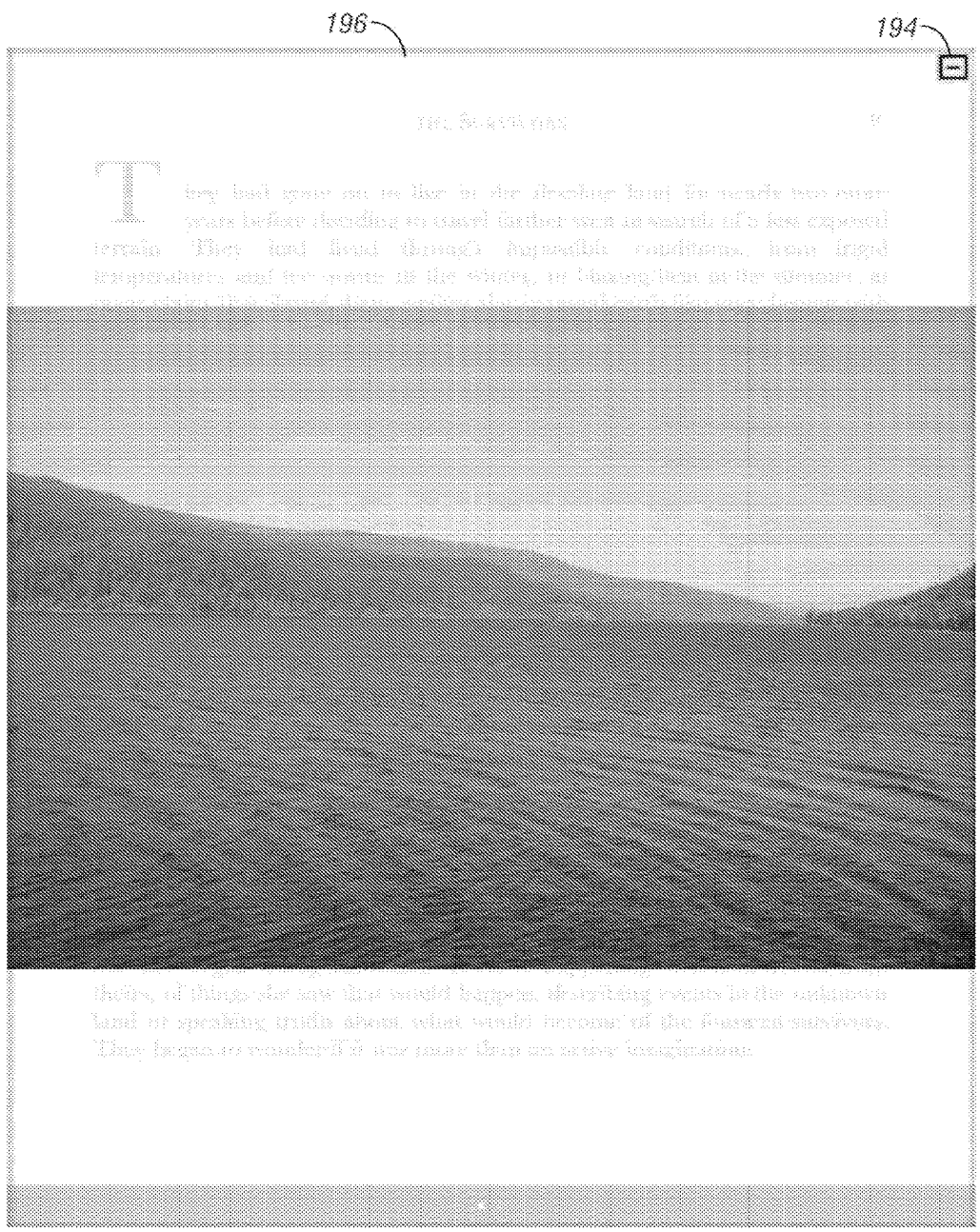
Figure 34:
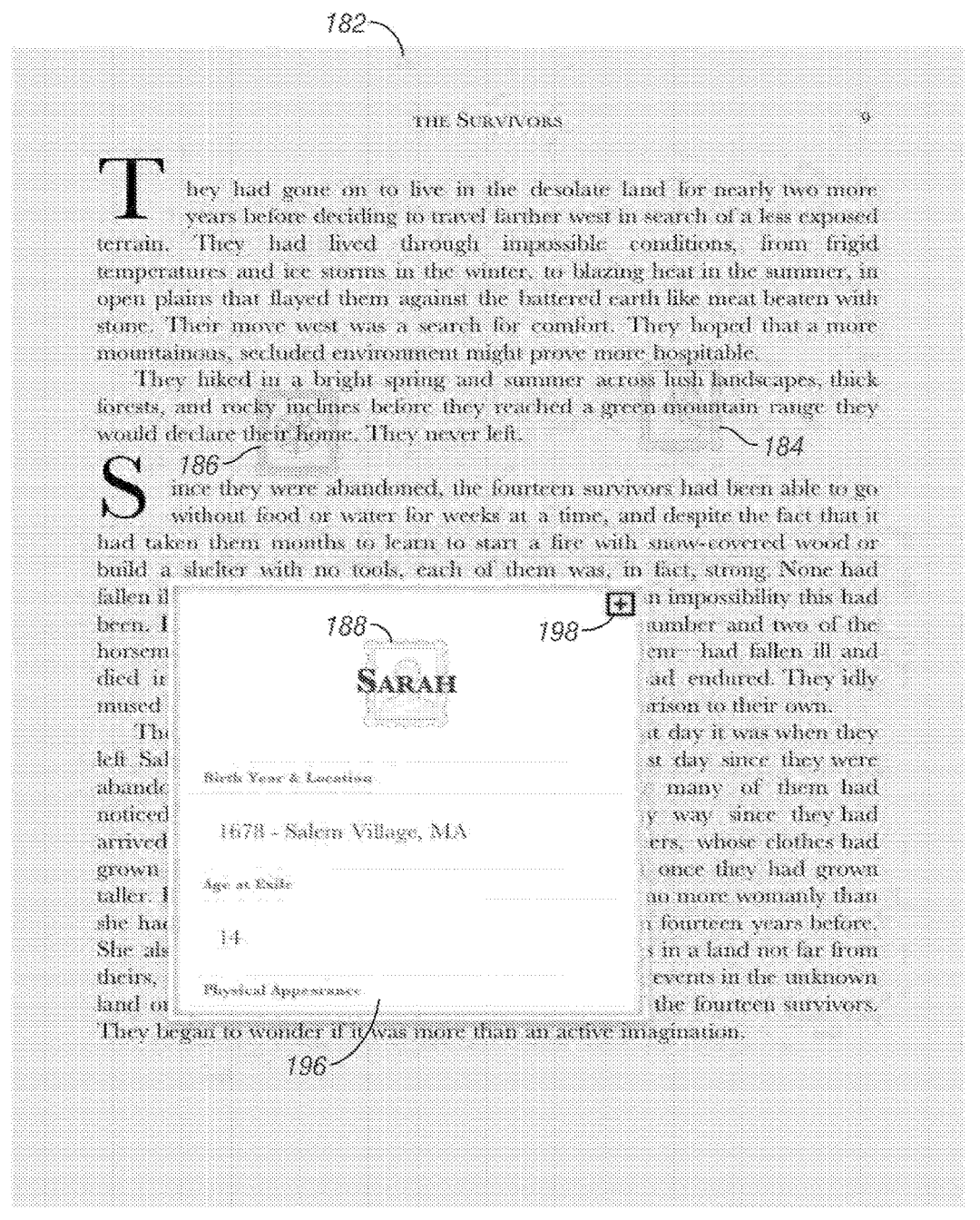

FIG. 32 through FIG. 34 illustrate another page 182 with interactive content. As shown in FIG. 32, a floating window 192 is shown with a control 194 for maximizing. The floating window 192 is associated with a watermark icon 184 (see FIG. 34). Other watermark icon on page 182 include water mark indicia 186 associated with a map, water mark indicia 188 associated with a character (Sarah) and water mark indicia 190 associated with a character (Hannah). FIG. 33 illustrates a maximized window 196 with a landscape photo. FIG. 34 illustrates a floating window 196 associated with the water mark indicia 188 to provide information on a character (Sarah). The floating window 196 includes a maximize control 198.

Figure 35:
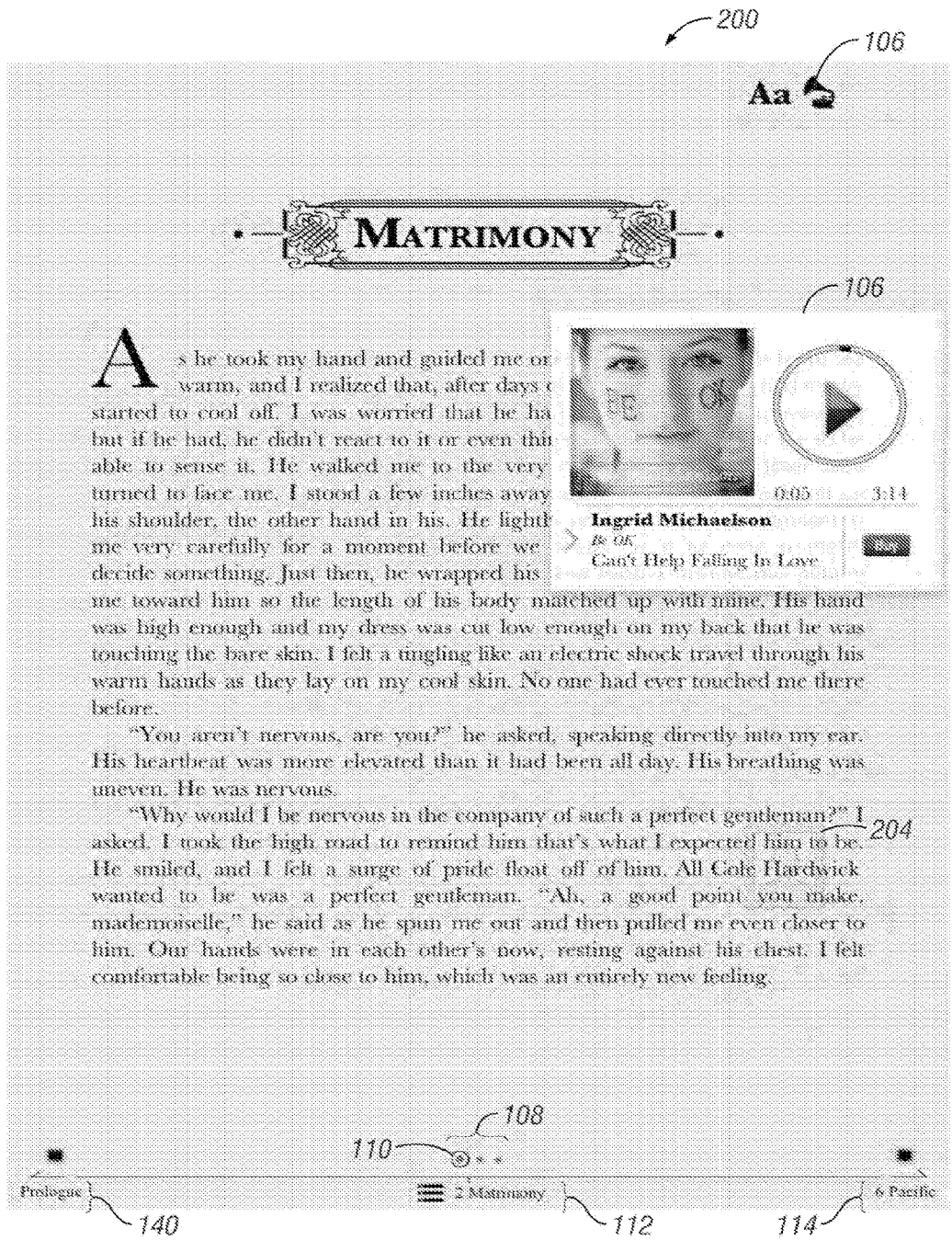
Figure 36:
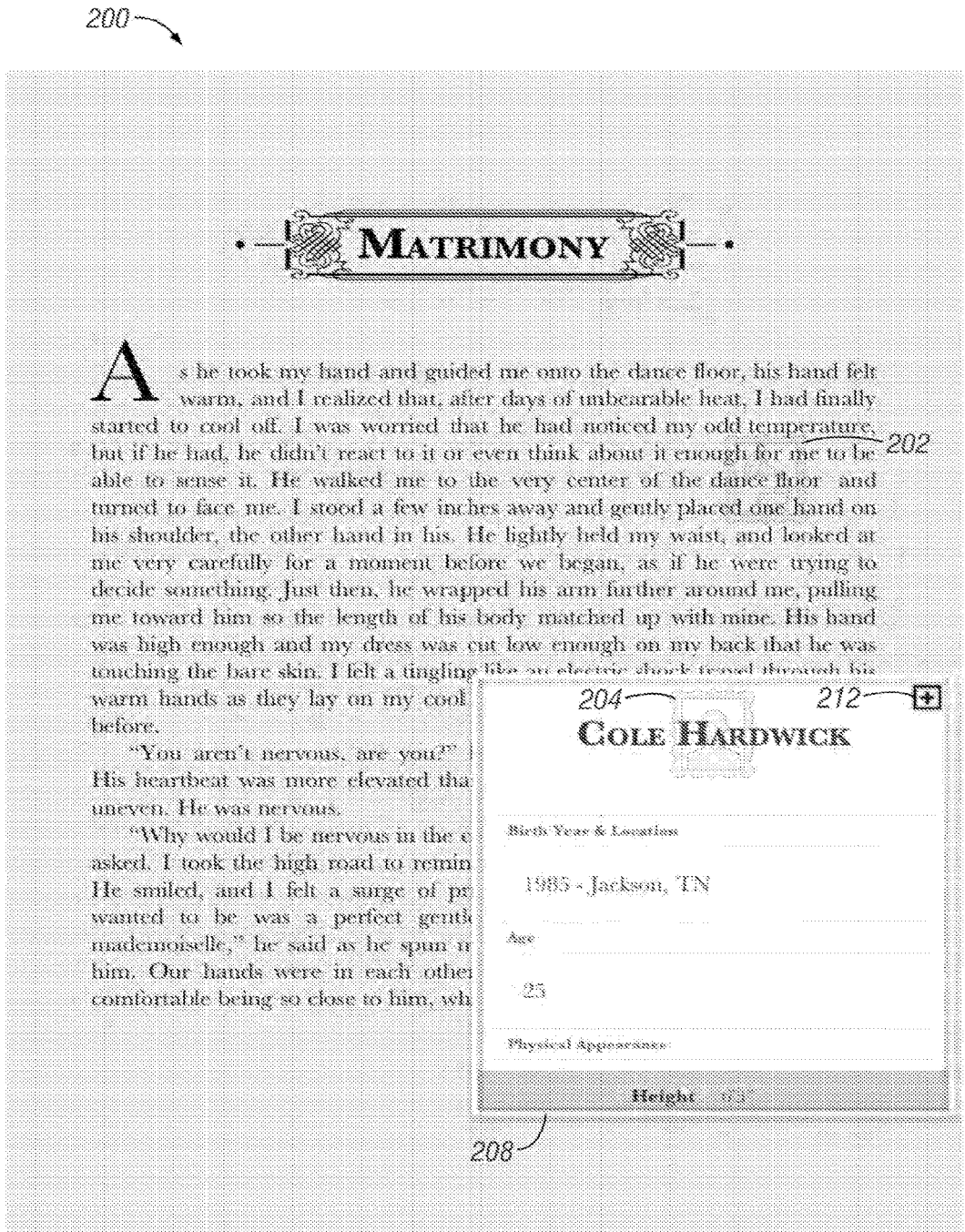

FIG. 35 and FIG. 36 illustrate page 200 of the interactive electronic book which is a first page of a chapter entitled "Matrimony." On page 200 there is a first watermark icon 202 and a second watermark icon 204. As shown in FIG. 35, there is a floating window 206 which is associated with watermark icon 202 (see FIG. 36). The floating window 206 provides controls for playing a song or buying the song or an album containing the song. Because there is audio playing, a phonograph 106 is shown in the top right of page 200 which when selected by the reader allows the reader to control the sound.

As shown in FIG. 35, at the bottom of page 200 there are navigation elements which allow a reader to determine their location (elements 108) within a chapter 112 as well as show the previous chapter 140 and next chapter 114.

As shown in FIG. 36, a floating window 208 is associated with watermark icon 203. The floating window 208 includes character information about a character named Cole Hardwick. The floating window 208 includes a maximize button 212. If the maximize button 212 is selected then a maximized window is shown.

Figure 37:
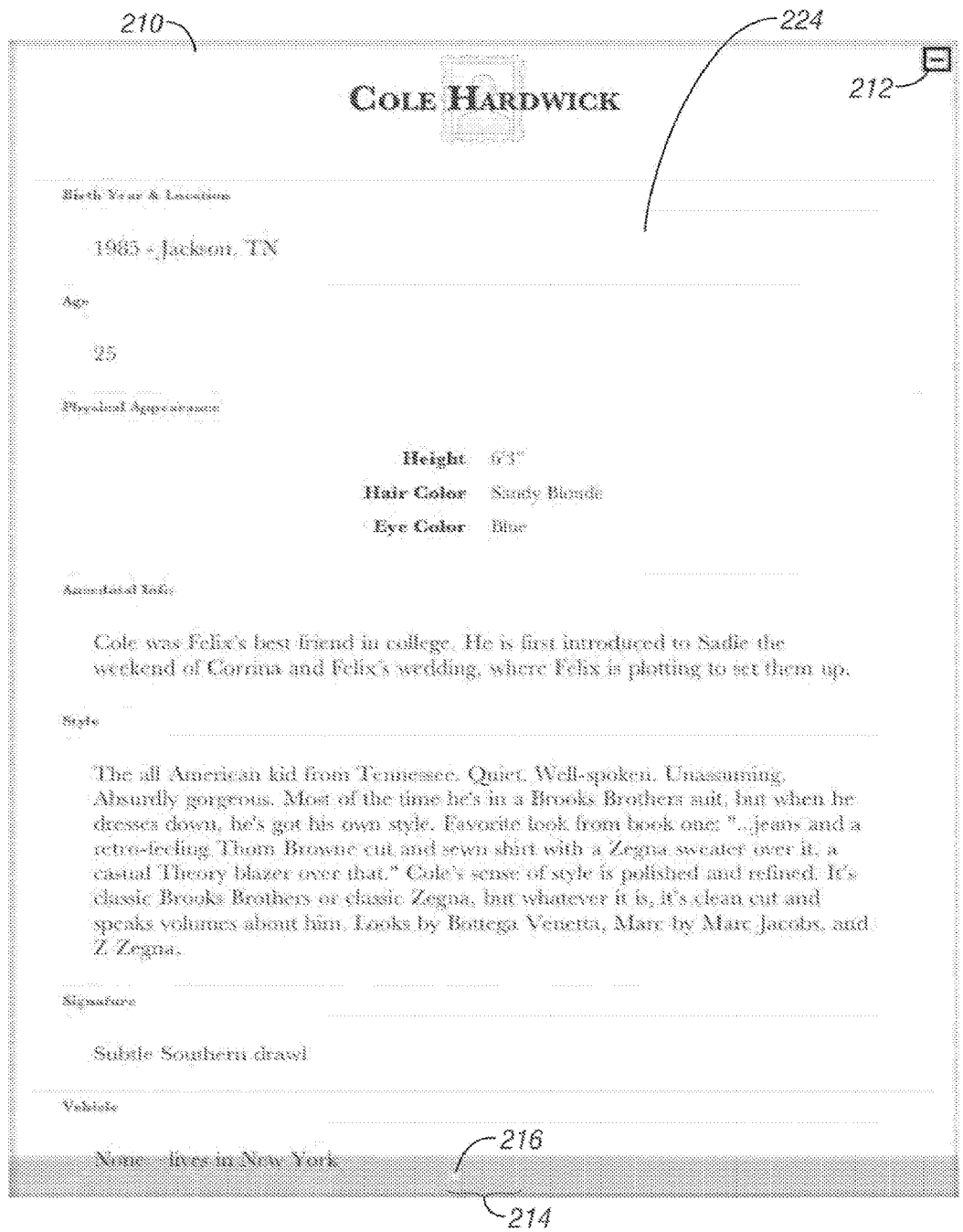

FIG. 37 illustrates this maximized window 210. Information about the character Cole Hardwick is displayed. This information can include a birth year and location, an age, a physical appearance (height, hair color, eye color), anecdotal information, style information, a signature characteristic, type of vehicle, or other information. This character information provides an alternative way to convey information about a character to readers in order to bring the character to life in new and exciting ways.

Note also in FIG. 37 that a plurality of elements 214 may be used to represent the different pages available which are associated with the maximized window 210. As shown in FIG. 37, the element 216 is the first of four elements and is emphasized to indicate there are four pages available and the page shown is the first of the four pages. FIG. 37 illustrates a first page 224 within the maximized window 210.

Figure 38:
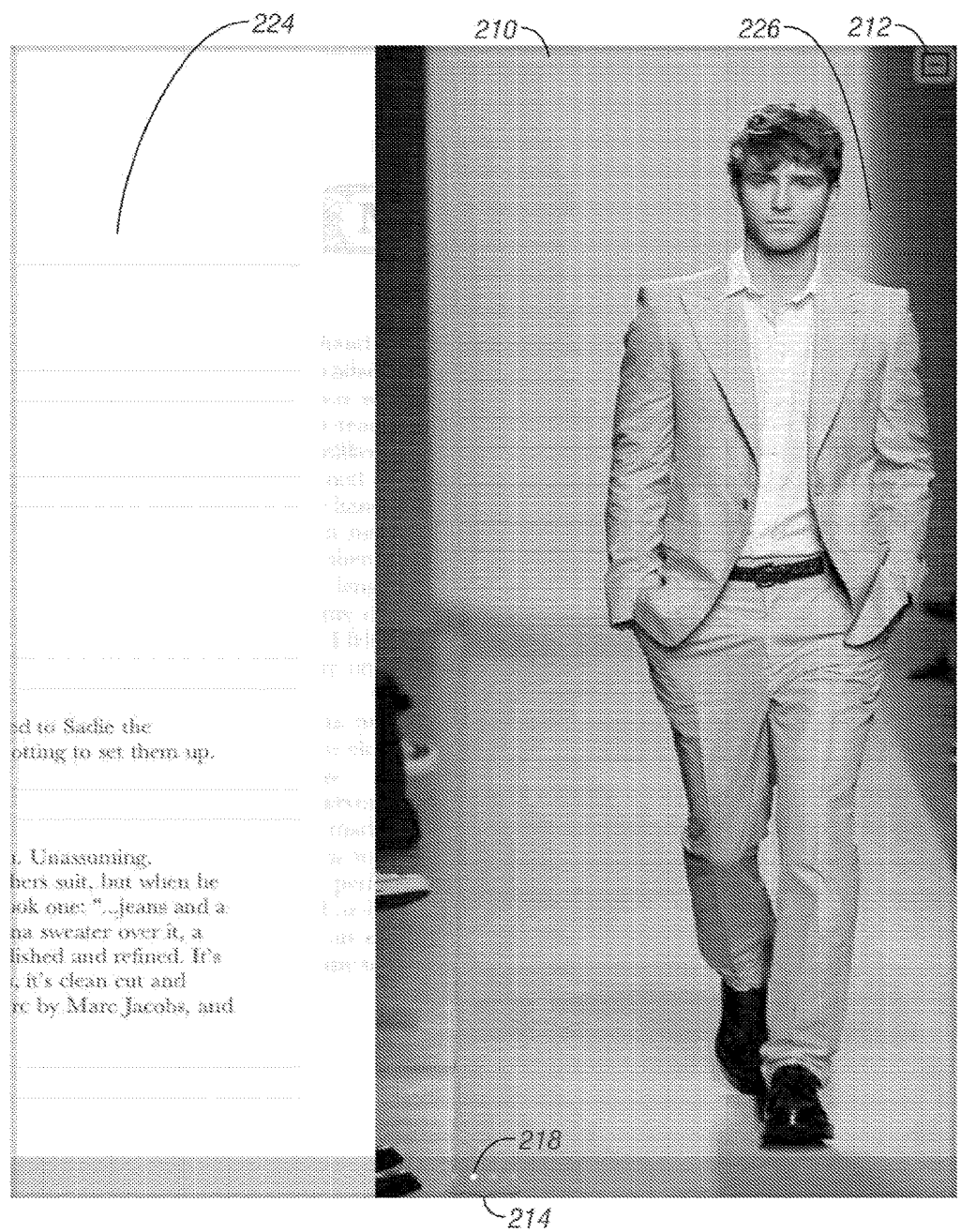

FIG. 38 illustrates the process of turning from the first page 224 to a second page 226 within the maximized window 210. At the bottom center, the second element 218 within the plurality of elements 224 is emphasized to indicate it is the second page within the maximized window 210. The second page 226 includes a photograph illustrating the type of style associated with the Cole Hardwick character.

Figure 39:
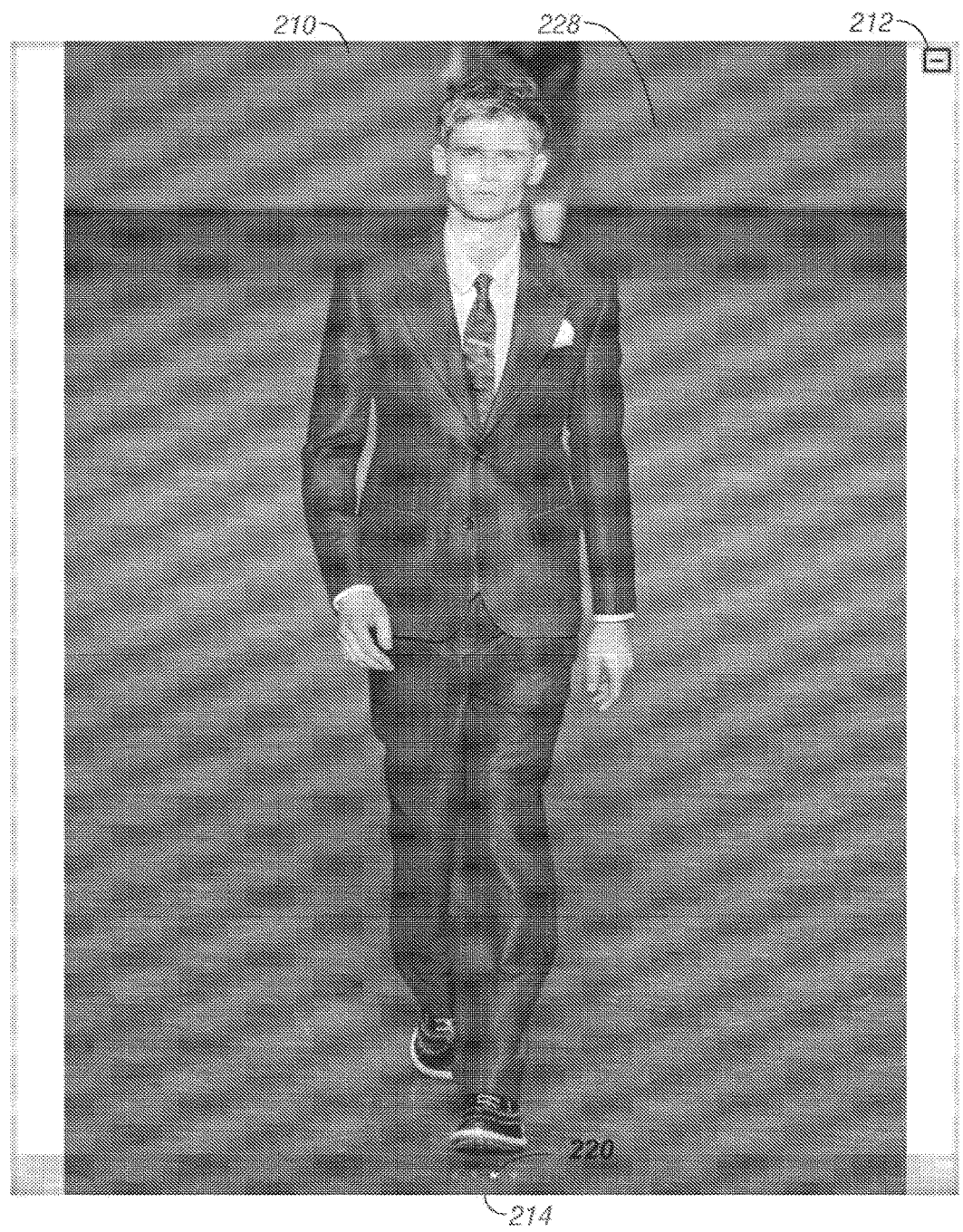
Figure 40:
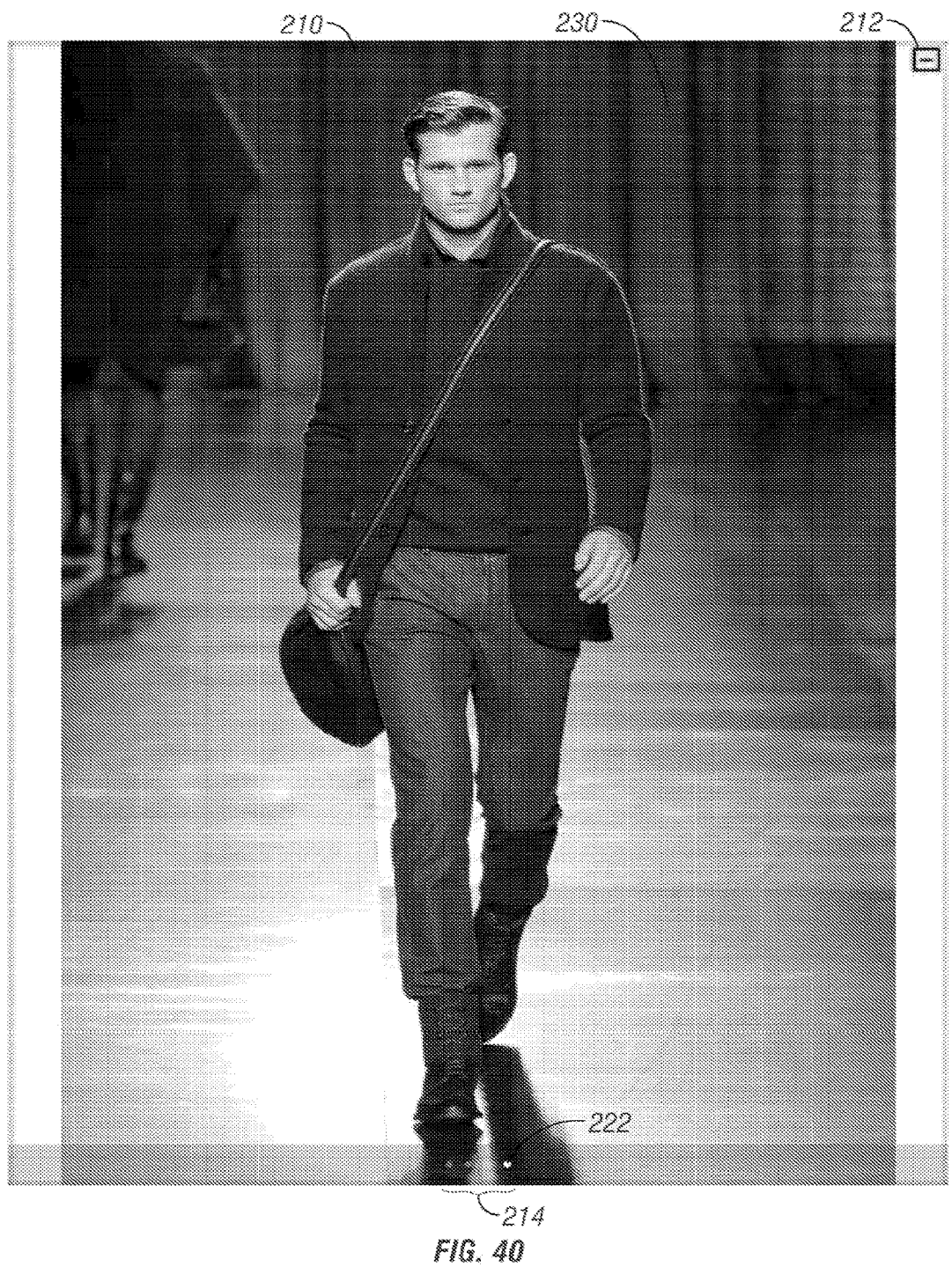

FIG. 39 illustrates a third page 228 within the maximized window 210. At the bottom center, the third element 220 within the plurality of elements 214 is shown in a manner to indicate it is the third page within the maximized window 210. Similarly, FIG. 40 illustrates a fourth page 230 within the maximized window 210. At the bottom center, the fourth element 220 within the plurality of elements 214 is shown in a manner to indicate it is the fourth page within the maximized window 210.

Figure 41:
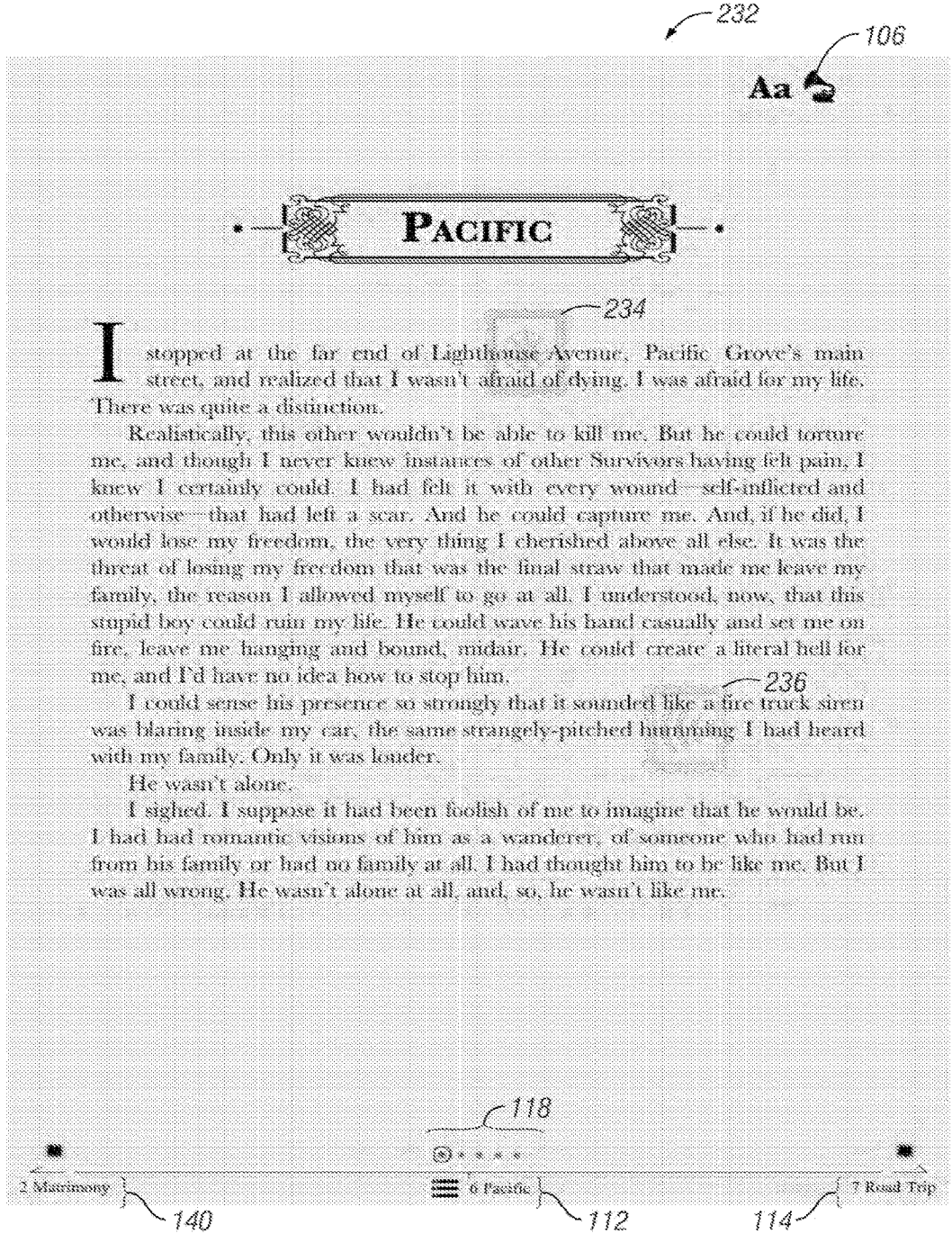
Figure 42:
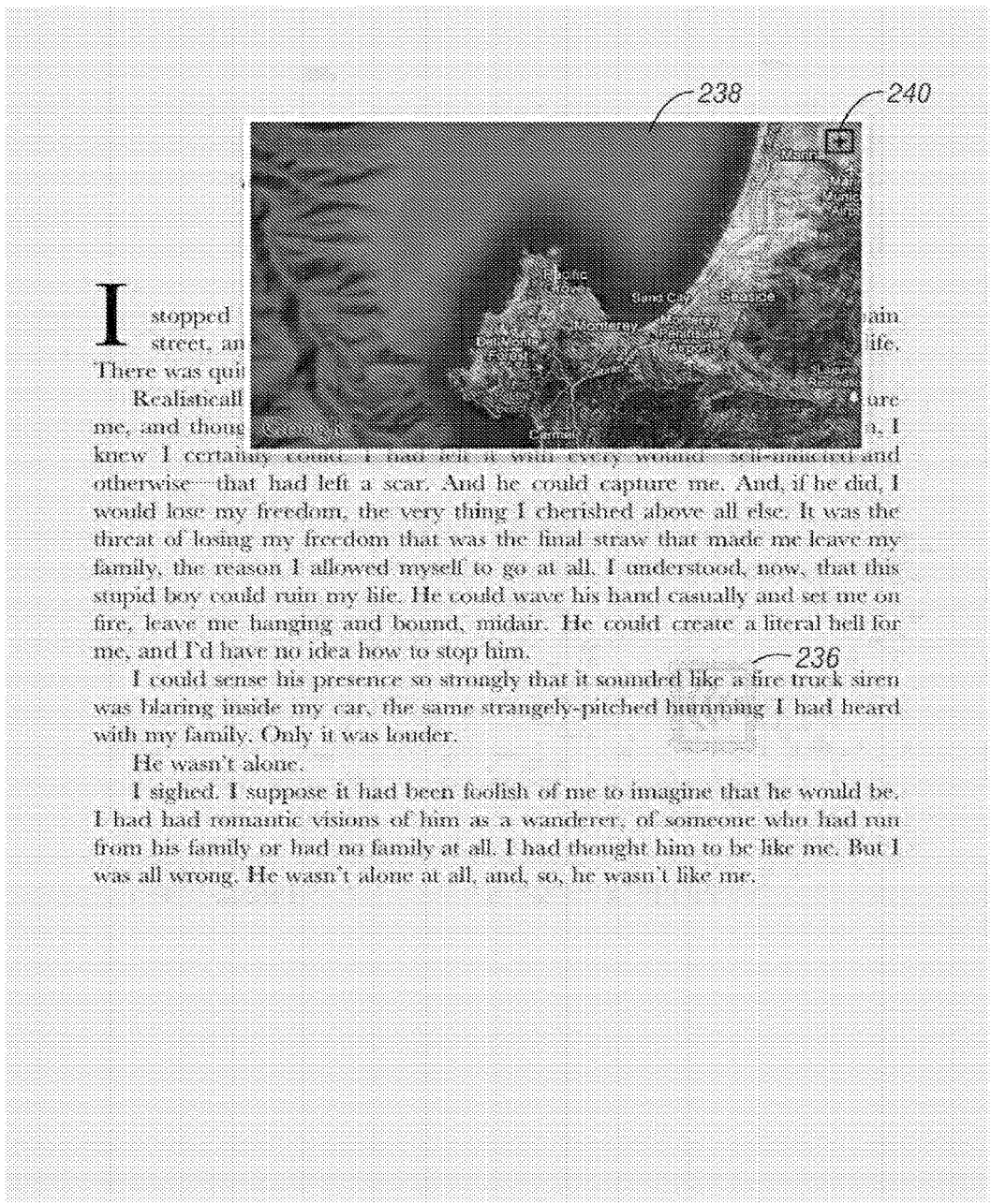
Figure 43:
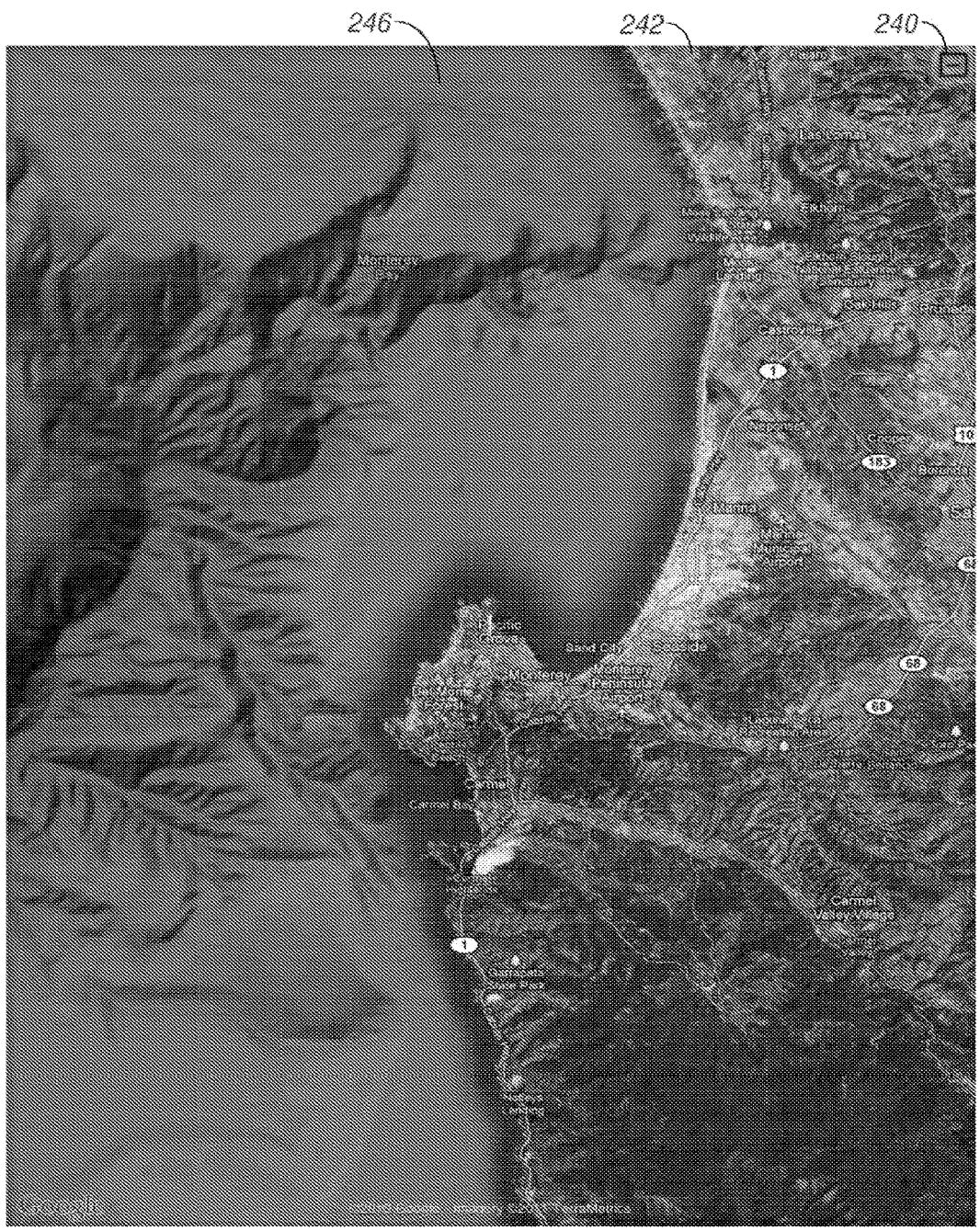
Figure 44:
Figure 45:

FIG. 41 illustrates a page 232 within the interactive electronic book which is the first page of the chapter entitled "PACIFIC." As can be seen from the navigation elements at the bottom of the page, this chapter is between the Matrimony chapter and the Road Trip chapter and the page 232 is the first of five pages in the chapter. At the top right of page 232 is a phonograph 106 with associated audio controls. There are also watermark icon 234 and 236 present. Watermark icon 234 is associated with a map. FIG. 42 illustrates a floating window 238 with a maximize control 240. The floating window 238 is associated with the water mark indicia 234 from FIG. 41. The maximize control 240 may be used to provide a maximized window 242 as shown in FIG. 43. Within the maximized window 242 is a first map view 246. FIG. 44 illustrates a second map view 248 which is a zoomed view. FIG. 45 illustrates a third map view 250 which is a zoomed view.

Figure 46:
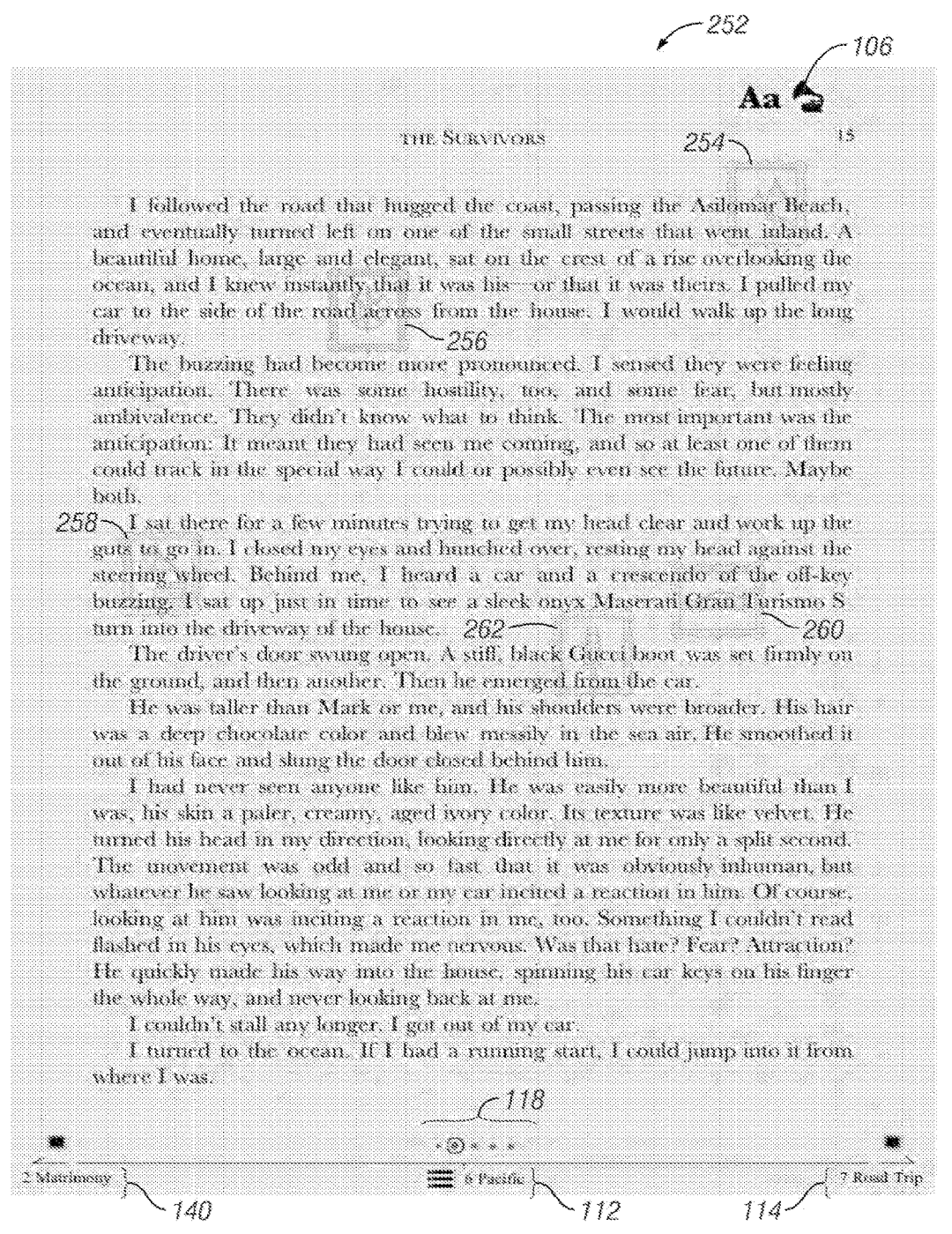
Figure 47:
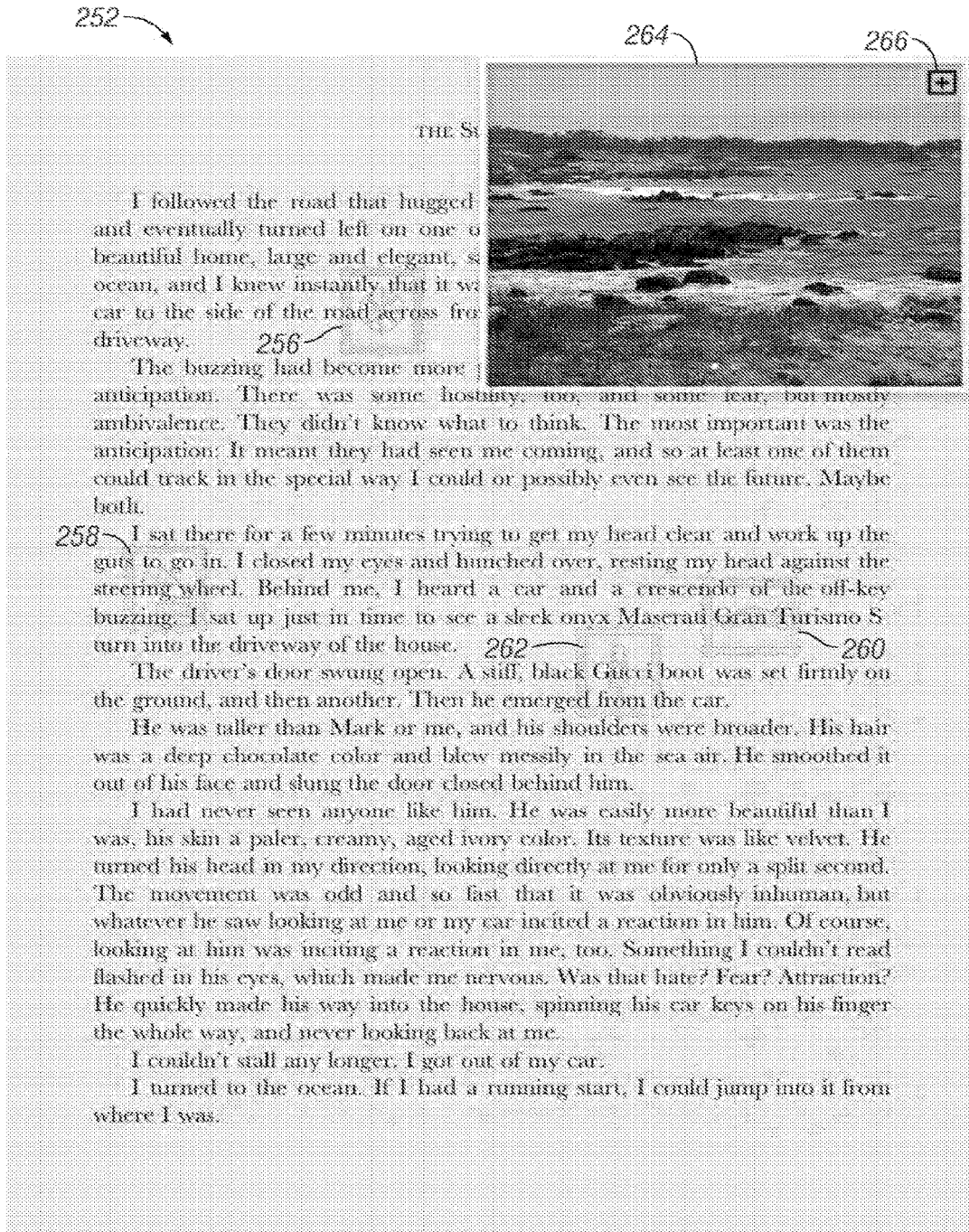
Figure 48:
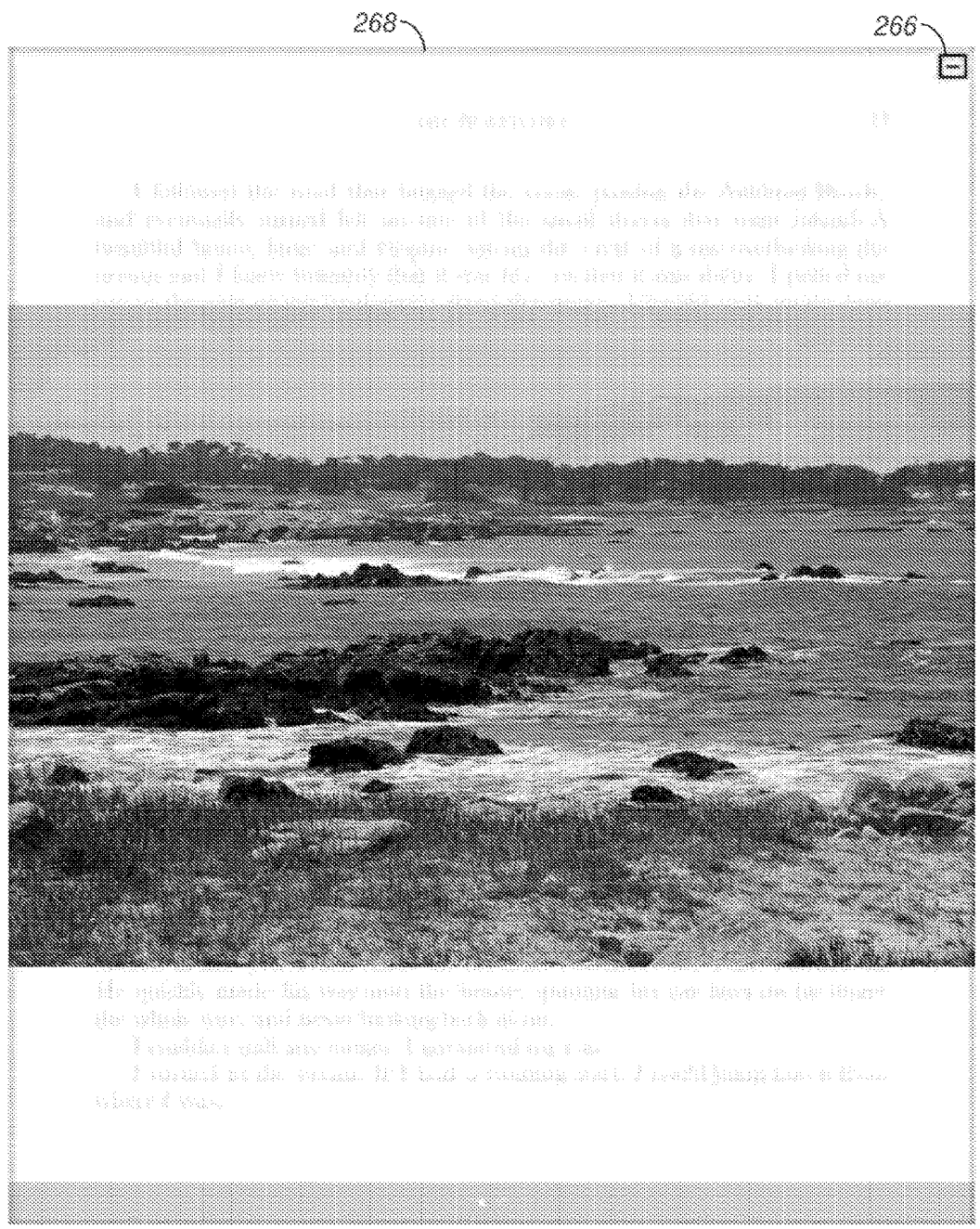

FIG. 46 illustrates another page 252 which includes watermark icon 254, 256, 258, 260, 262. FIG. 47 shows page 252 with a floating window 264 associated with watermark icon 254. Within the floating window 264 is a photo of a landscape. The floating window 264 has a control 266 for maximizing the window. FIG. 48 illustrates a maximized window 268 showing the photo of the landscape.

Figure 49:

FIG. 49 illustrates a floating window 270 associated with a watermark icon 256. Within the floating window 270 is a map. The floating window 270 has a control 272 for maximizing the window.

Figure 50:

FIG. 50 illustrates a floating window 274 associated with a watermark icon 258. Within the floating window 274 is a control for playing a song from an album. In addition, there is a button which can be used to buy the song or the album.

Figure 51:
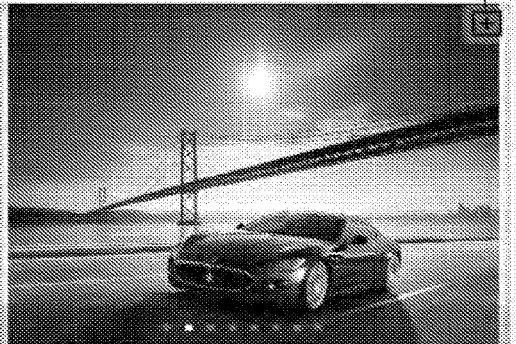
Figure 52:
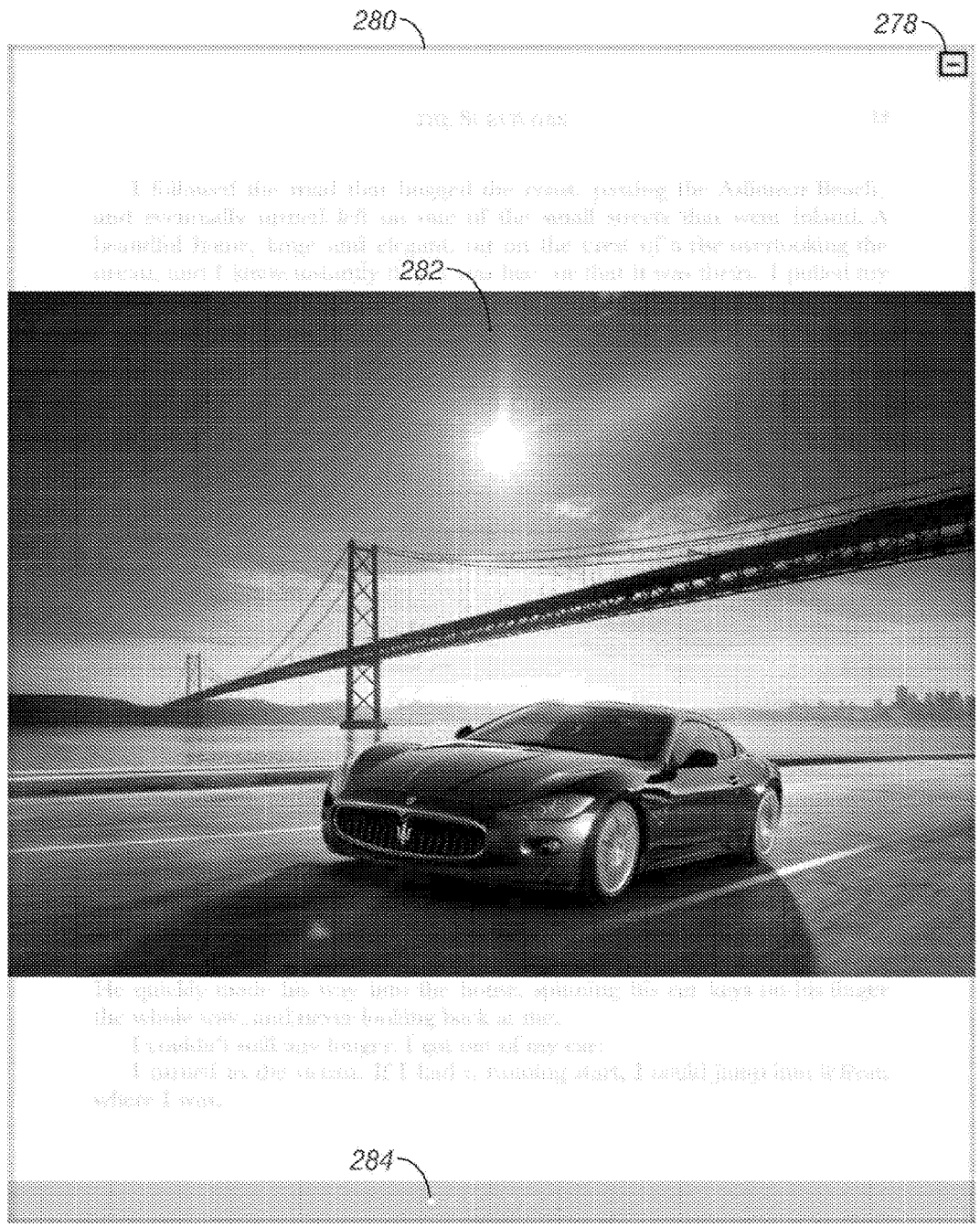
Figure 53:
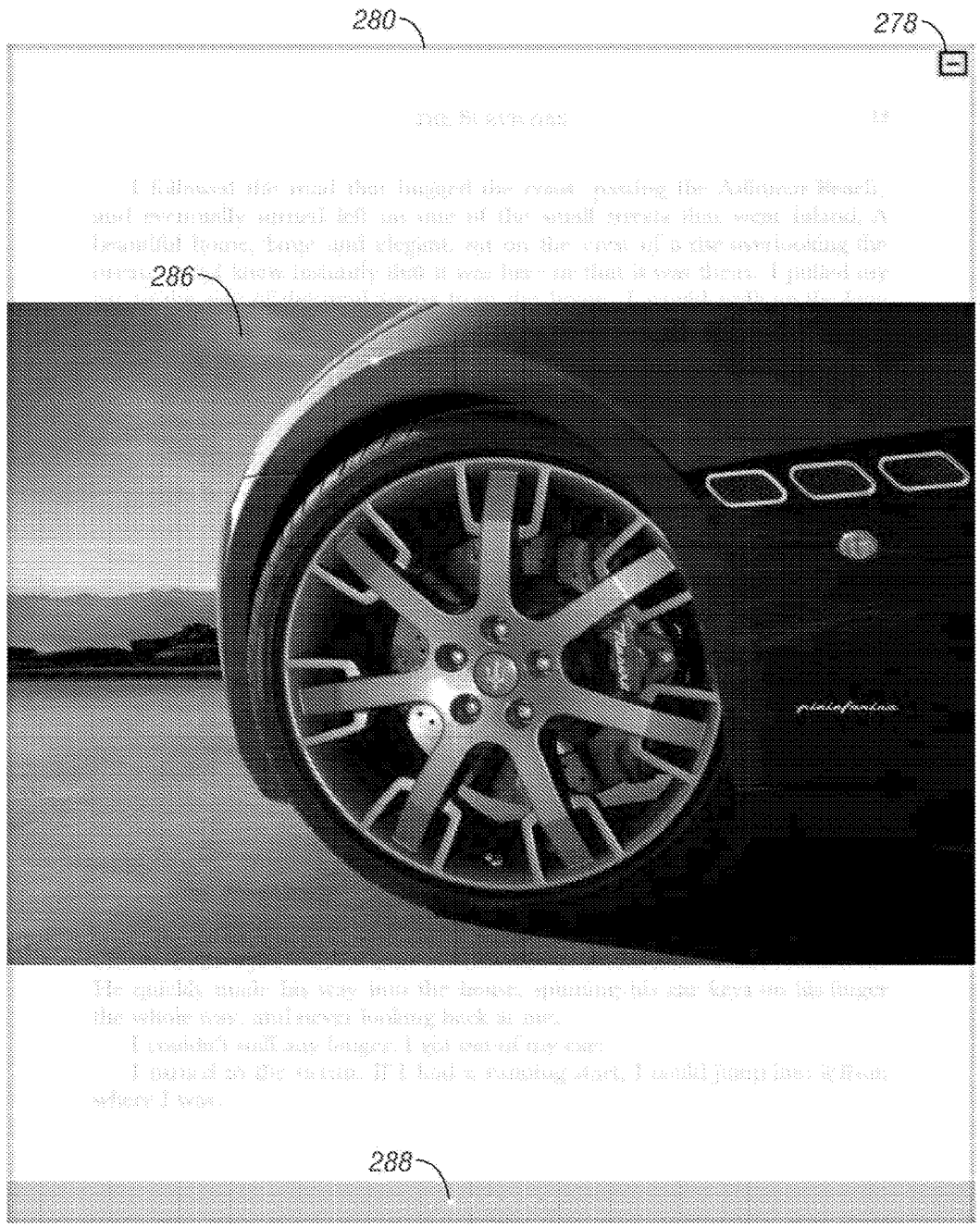
Figure 54:
Figure 55:
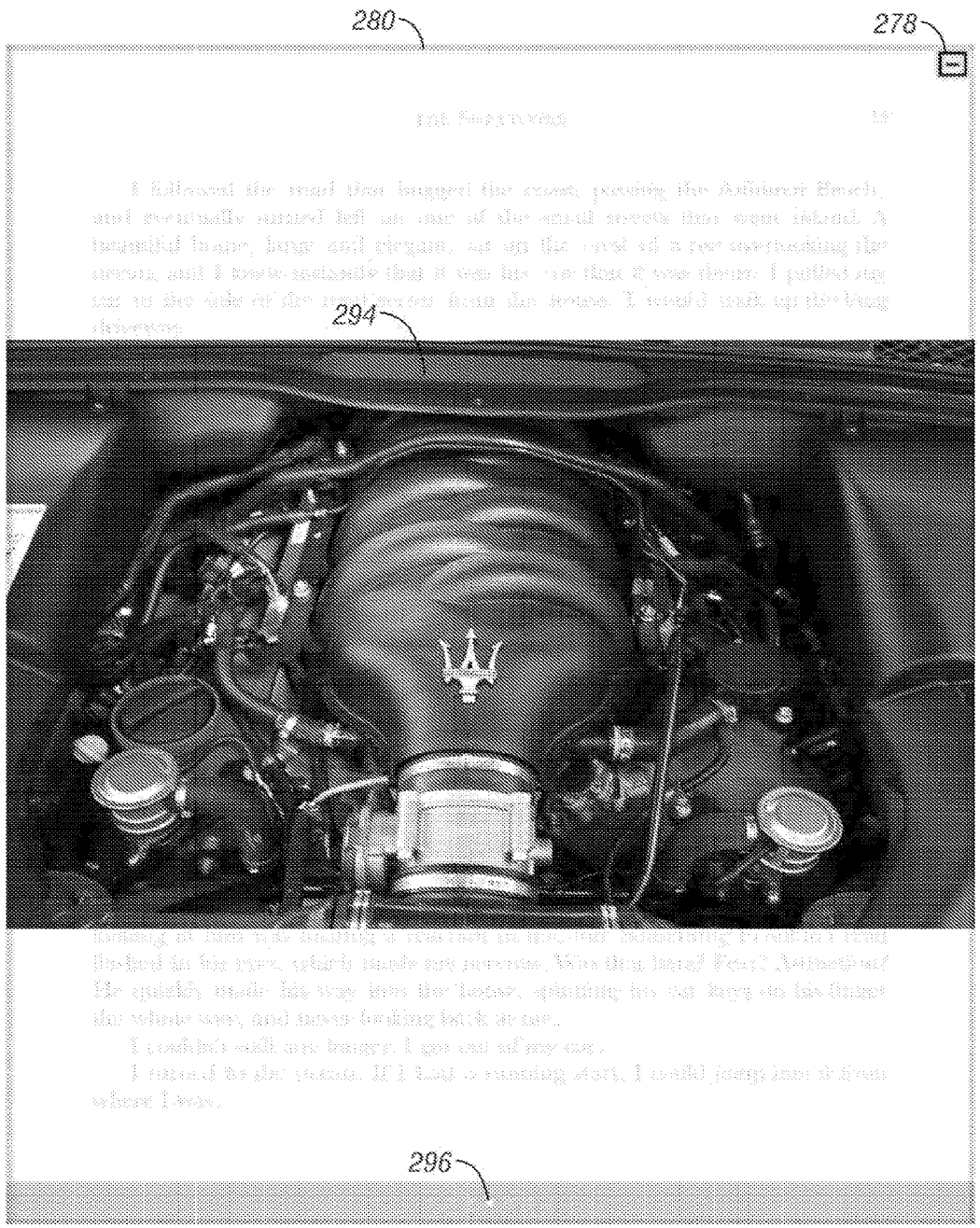
Figure 56:
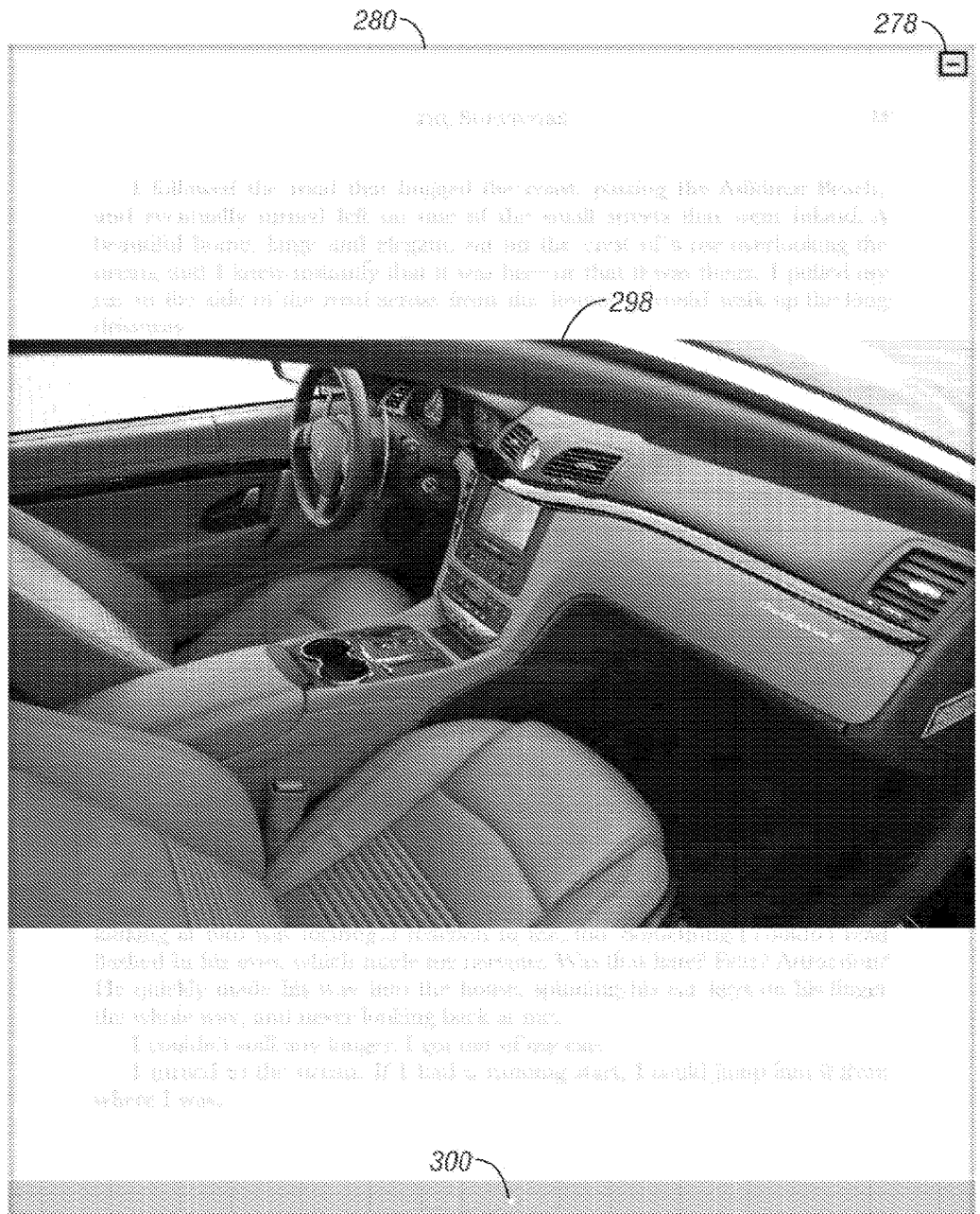
Figure 57:
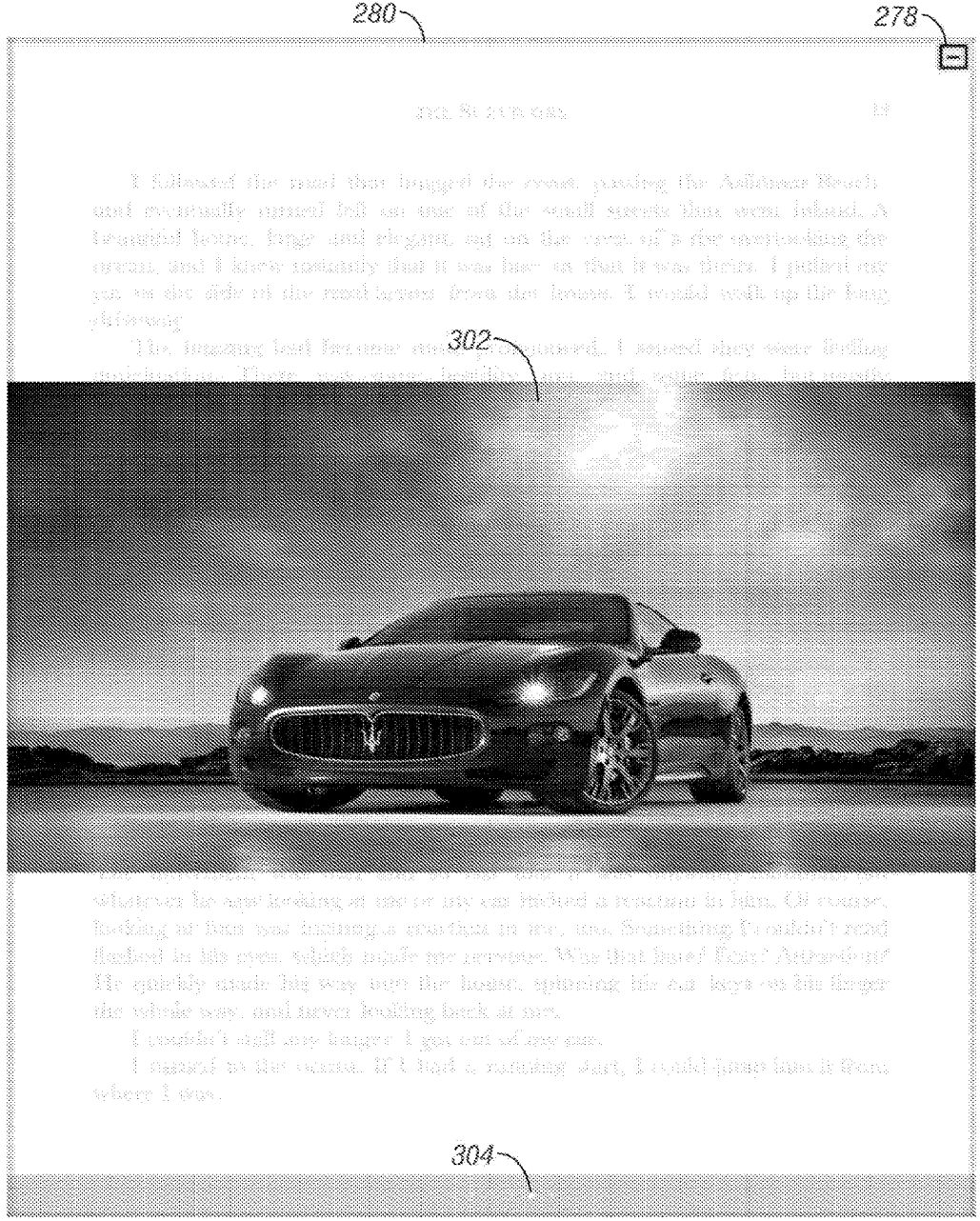
Figure 58:
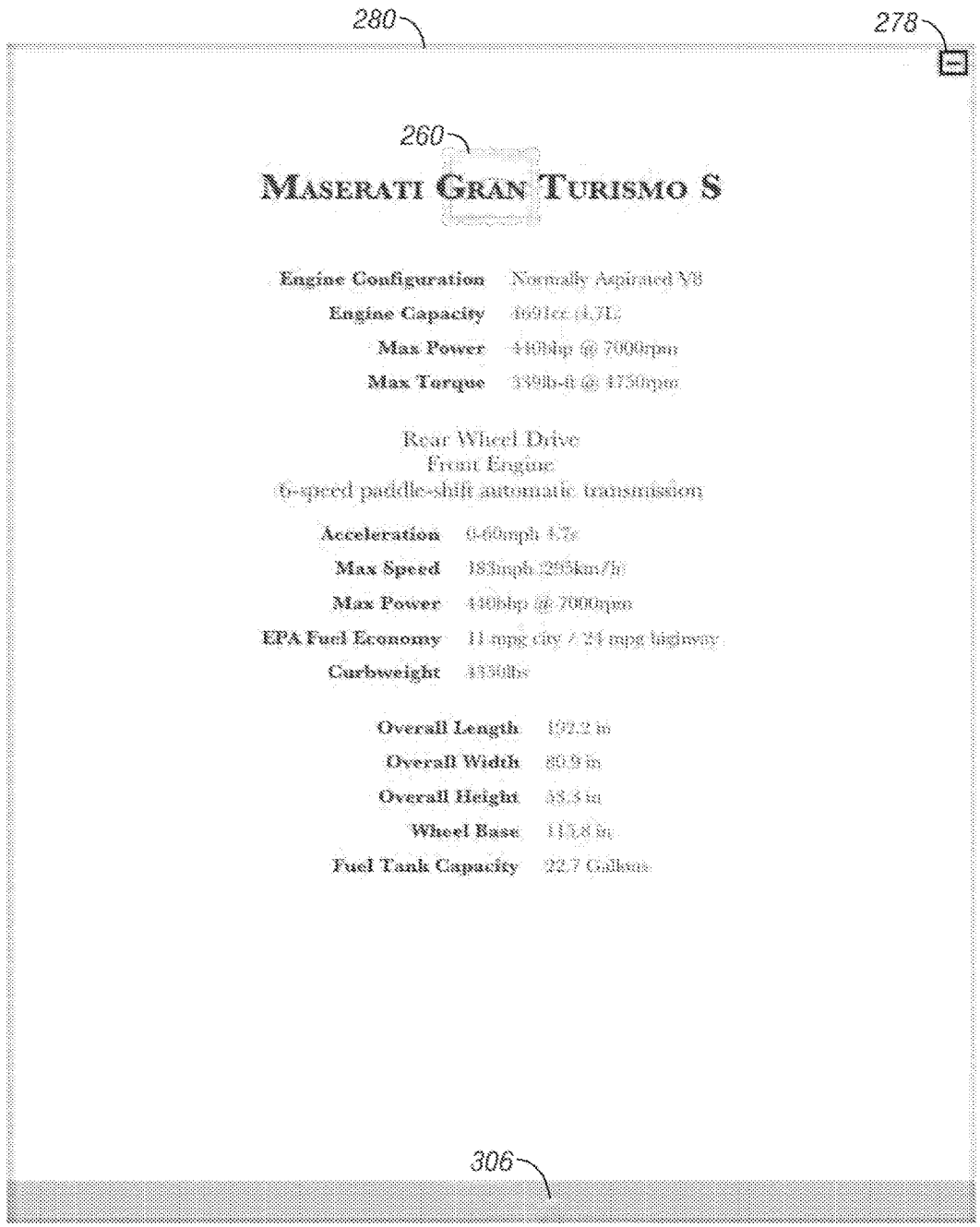

FIG. 51 illustrates a floating window 276 associated with a watermark icon 260. Within the floating window 276 are photos of a car. The floating window 276 has a control 278 for maximizing the window. FIG. 52 through FIG. 58 show different pages within the maximized window 280. FIG. 52 includes photo 282 which is of a car. At the bottom of window 280, element 284 is emphasized to indicate that this is the first of seven pages in the maximized window 280. Note that behind the maximized window 280, the text of page 252 is shown with a watermark effect. FIG. 53 illustrates the maximized window 280 with a second photo 286 shown. At the bottom of window 280, element 288 is emphasized to indicate that this is the second of seven pages. FIG. 54 illustrates the maximized window 280 with a third photo 290 shown. At the bottom of window 280, element 292 is emphasized to indicate that this is the third of seven pages. FIG. 55 illustrates the maximized window 280 with a fourth photo 294 shown. At the bottom of window 280, element 296 is emphasized to indicate that this is the fourth of seven pages. FIG. 56 illustrates the maximized window 280 with a fifth photo 298 shown. At the bottom of window 280, element 300 is emphasized to indicate that this is the fifth of seven pages. FIG. 57 illustrates the maximized window 280 with a sixth photo 302 shown. At the bottom of window 280, element 304 is emphasized to indicate that this is the sixth of seven pages. FIG. 58 illustrates the maximized window 280 associated with watermark icon 260 and information about the car. At the bottom of window 280, element 306 is emphasized to indicate that this is the seventh of seven pages.

Figure 59:
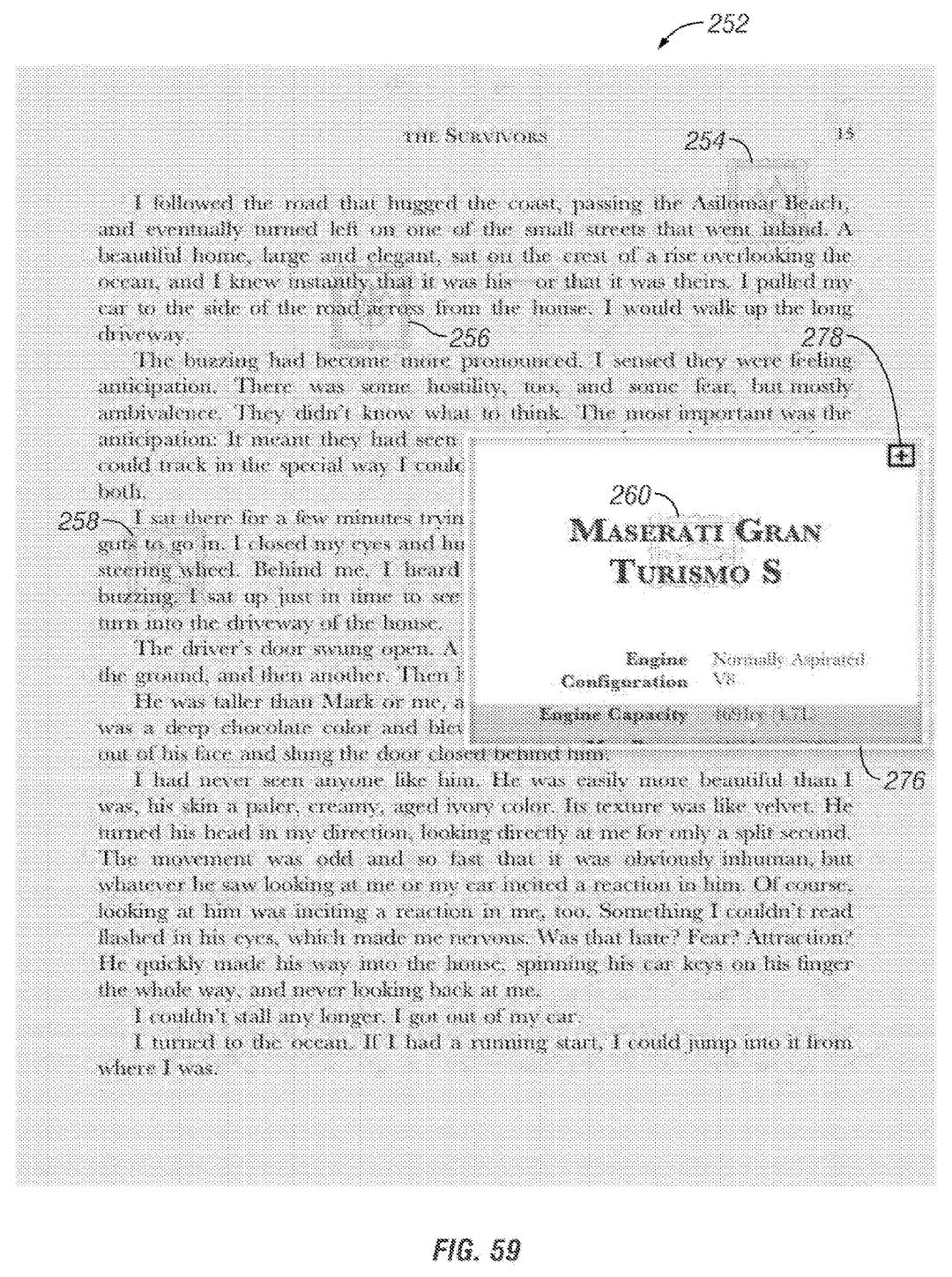

FIG. 59 illustrates the floating window 276 associated with the watermark icon 260 in which the information regarding the car (the seventh of the seven pages of this interactive content) is shown.

Figure 60:
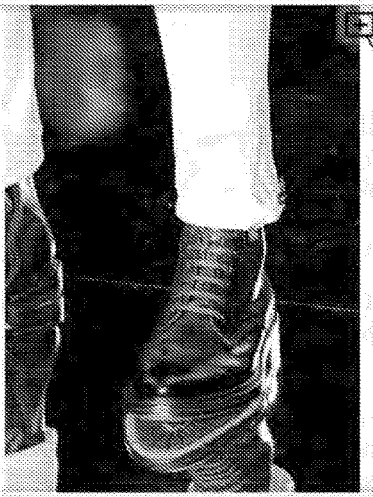

FIG. 60 illustrates the page 252 with a floating window 308 associated with watermark icon 262 (see FIG. 46). The floating window 308 has a maximize control 310. Within the floating window is a photo of a boot.

In the preceding examples, it is to be understood that products such as fashion products and cars can be associated with characters or otherwise associated with the story of the interactive electronic book. This serves several purposes. For example, it enhances the experience for the user in that they can better understand and relate to the characters or the story in the way the author intended. Yet at the same time, it does not preclude the reader's imagination with respect to the character. Showing products that a character uses or products of the type or style used by a character is different than showing a picture of a character using the product. The reader is still free to imagine what the character looks like. This feature of the electronic interactive book is especially useful for well-written fictional works where characters are well-defined. Moreover, it augments the fictional work by providing a way to further develop characters for the reader.

Another purpose of showing products relates to providing opportunities for product placement in an interactive electronic book. It is believed that product placement in interactive electronic books is an effective form of marketing for a number of reasons. For example, it is not obtrusive to the reader such as advertising would be. The reader need not ever see any product information should they choose not to. Moreover, when they do see the product information it is framed in a manner that assists in their enjoyment of the book. In addition, the product information is tied to the characters or other elements of the story. Where readers develop an emotional connection with a character in a story they may also develop an interest in the types of products used by the character.

Figure 62:
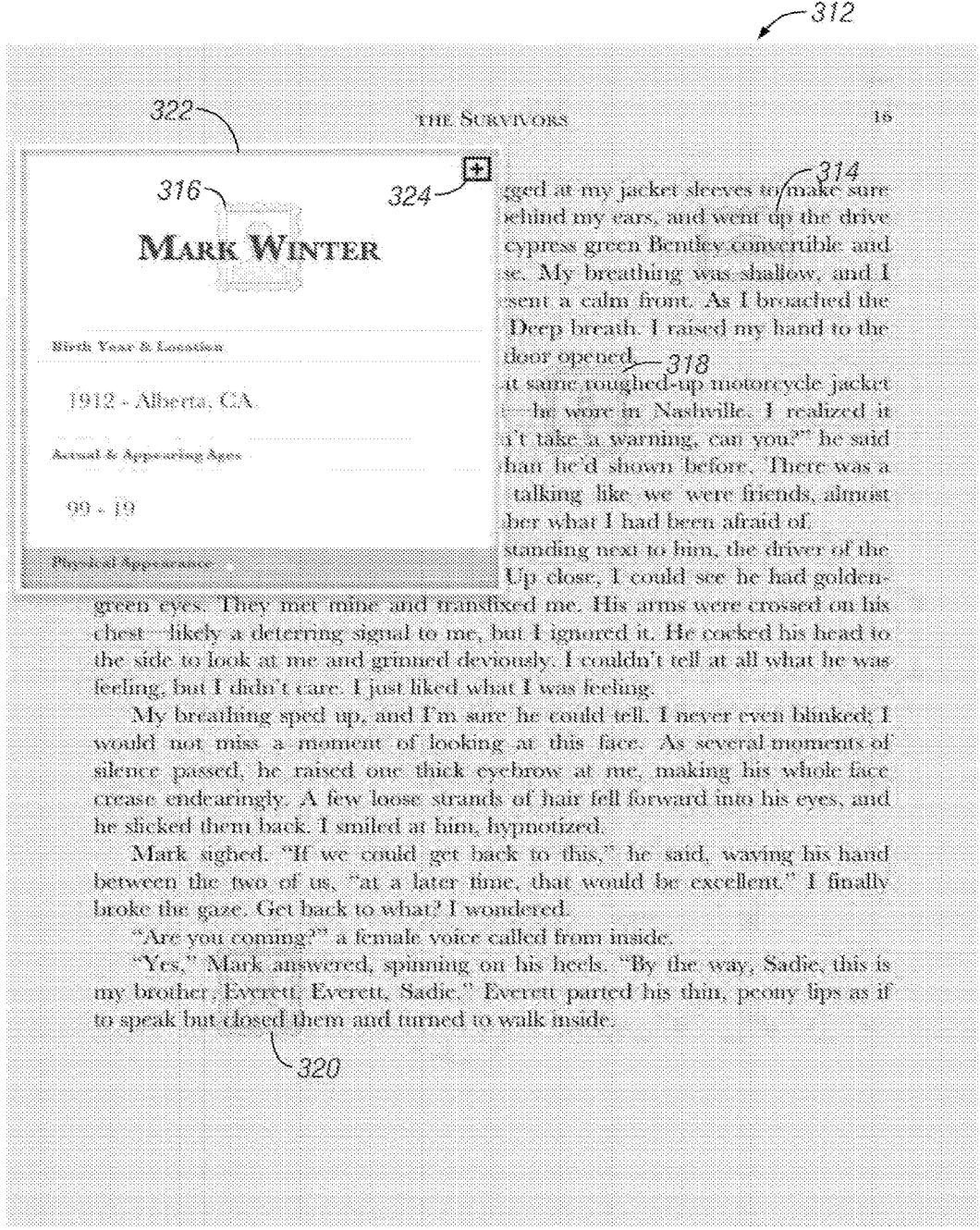

FIG. 61 illustrates another page 312 of the interactive electronic book. As shown in FIG. 16, watermark icon 314, 316, 318, 320 are present. As shown in FIG. 62, a floating window 322 with maximize control 324 is associated with water mark indicia. The floating window 322 displays additional information about a character, Mark Winter. If the control 324 is selected then a maximized window 326 is shown as illustrated in FIG. 63. Additional information about the character is displayed. This may include the birth year and location, the actual and appear ages, the physical appearance (such as height, hair color, eye color), the known powers (such as elemental control, mobilization, and superhuman abilities), anecdotal information, style, a signature item, and a vehicle. One of a plurality of elements 328 may be emphasized to designate which of a plurality of pages is being displayed within the maximized window 326.

Figure 64:
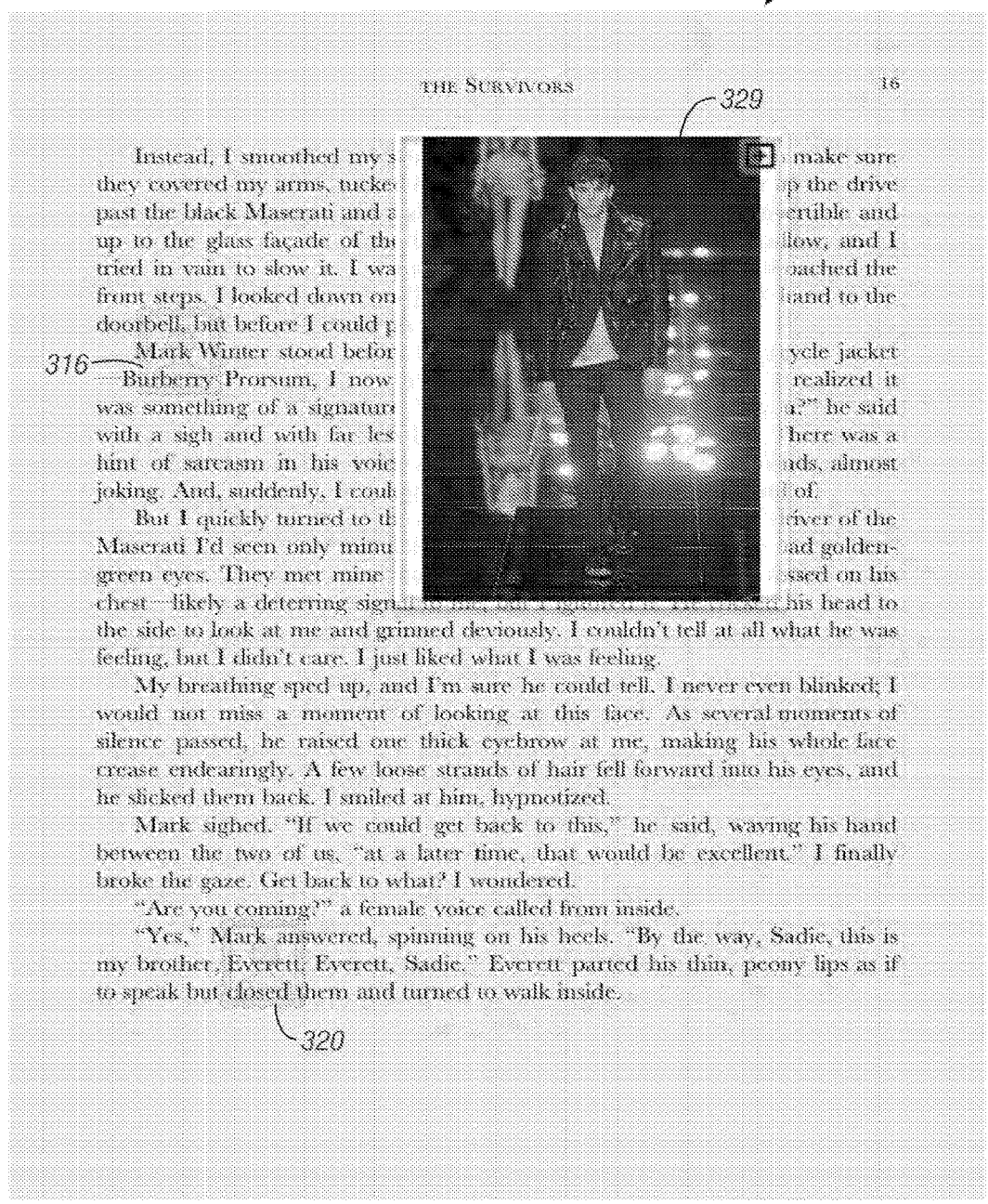

FIG. 64 illustrates page 312 with a floating window 329 associated with watermark icon 318 present. Here, the text above the watermark icon 318 references a particular jacket worn by a character and the interactive content includes a photo of that jacket within the floating window 329.

Figure 65:
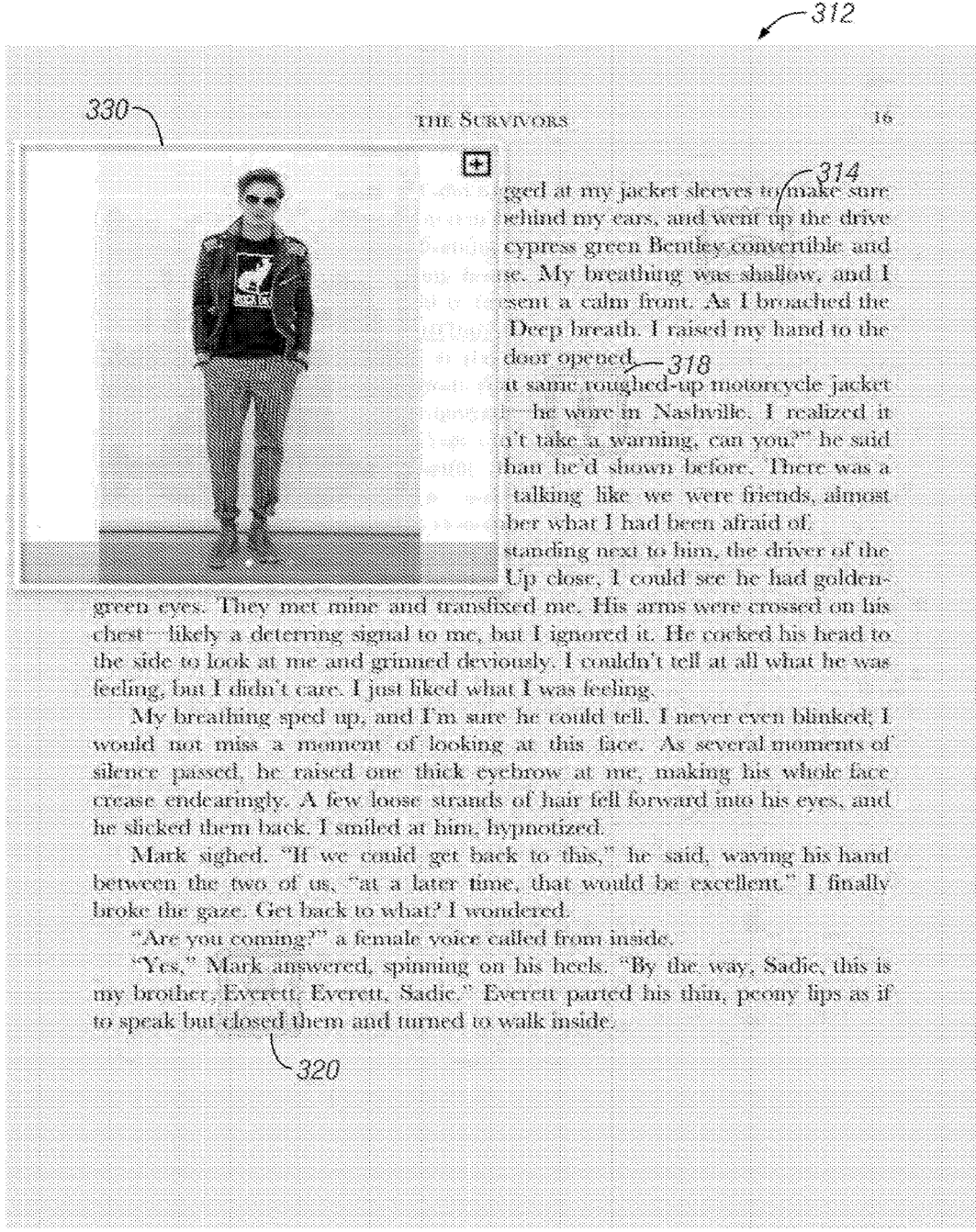
Figure 66:
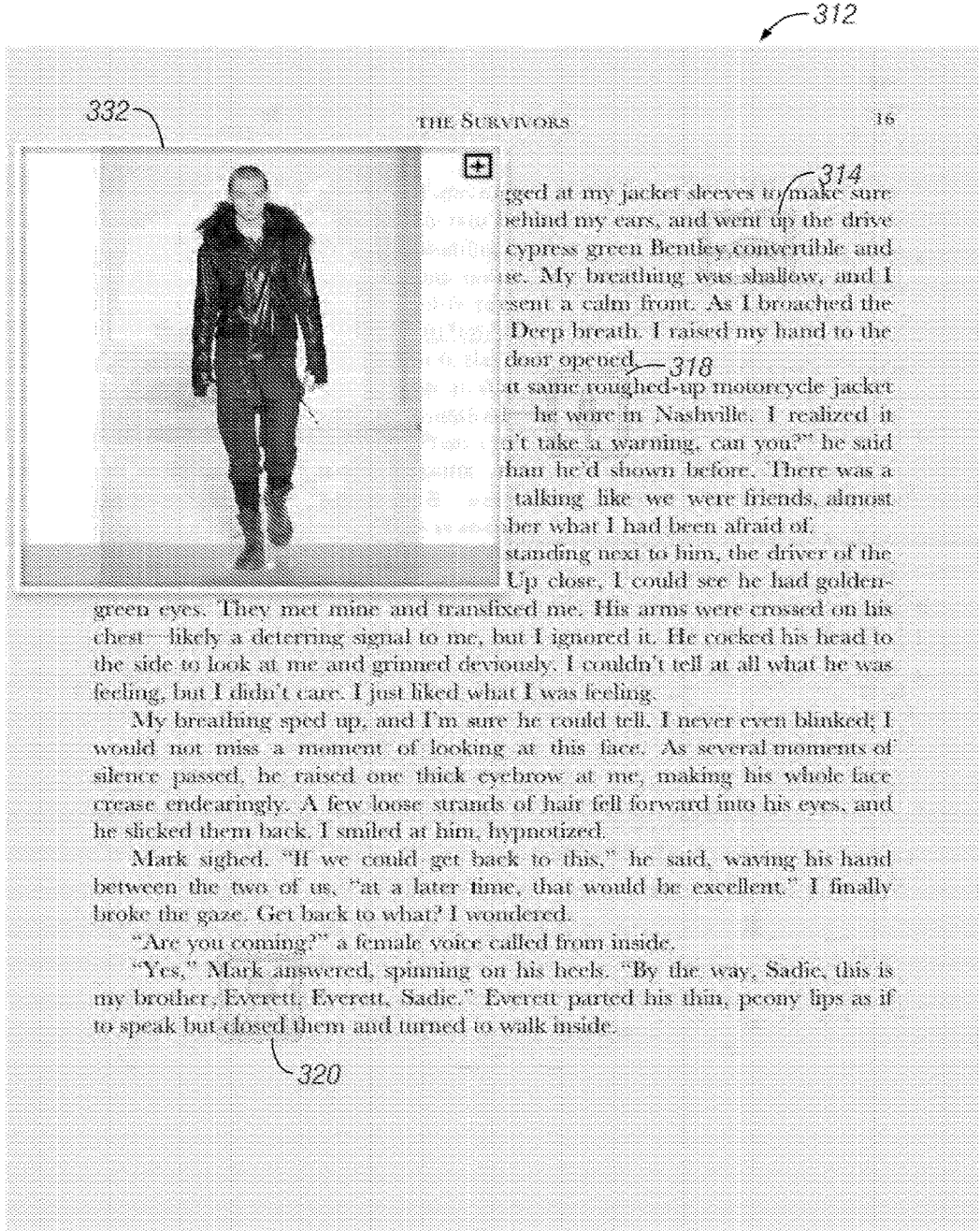
Figure 67:
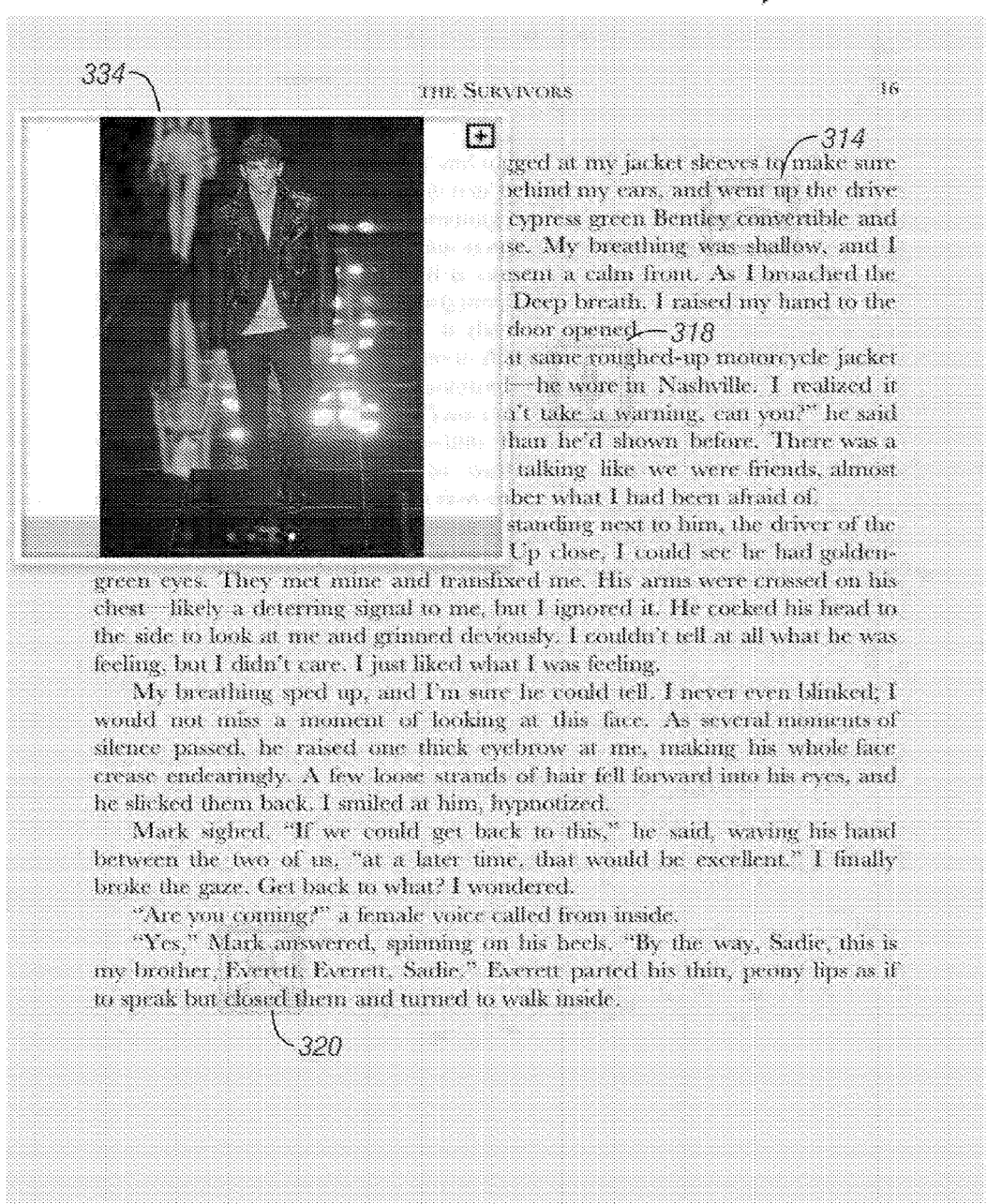

FIG. 65 illustrates page 312 with a floating window 330 associated with watermark icon 316 present. FIG. 66 illustrates page 312 with a floating window 332 associated with a watermark icon. FIG. 67 illustrates page 312 with a floating window 334 associated with a watermark icon.

Figure 68:
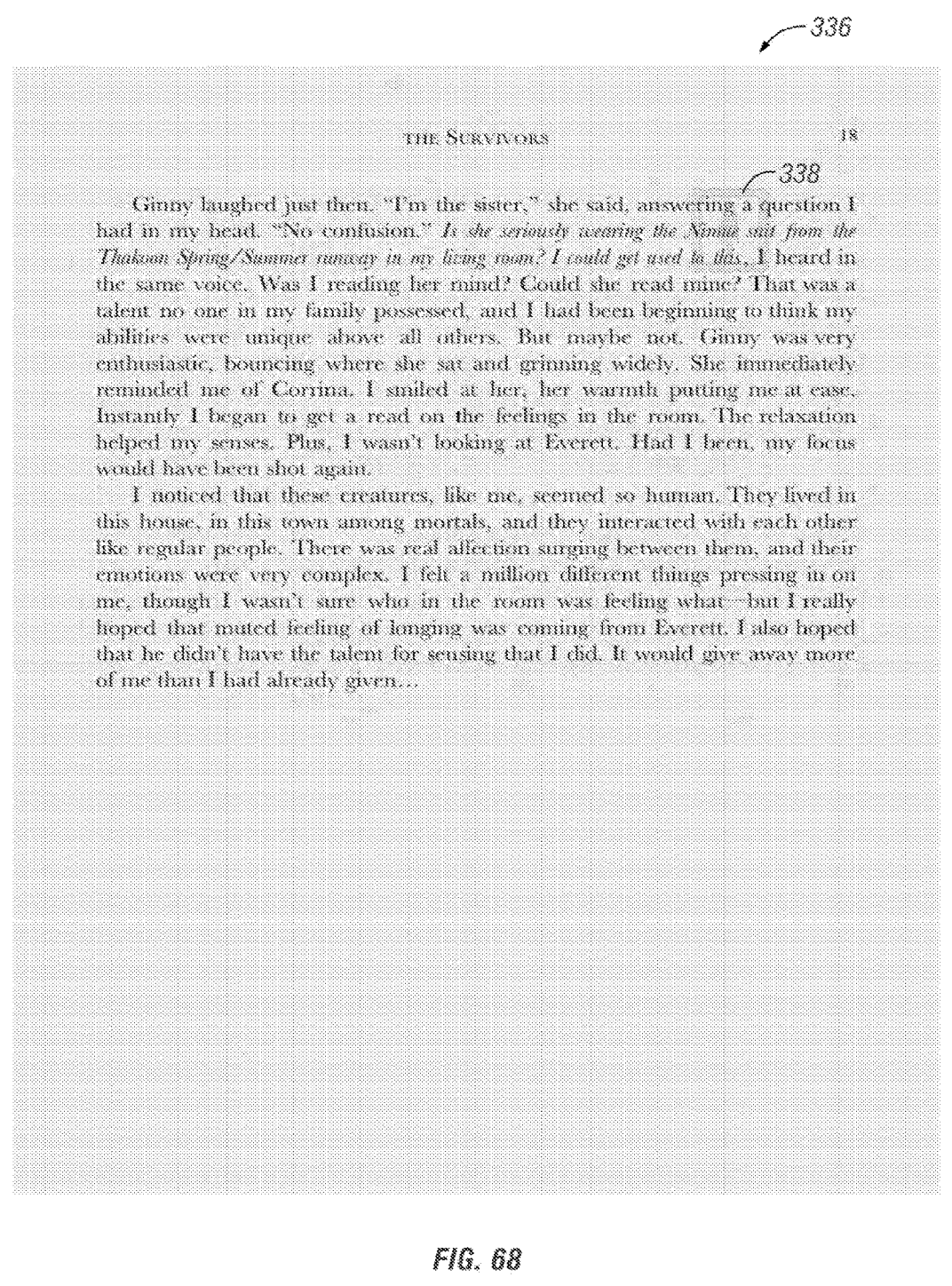
Figure 69:
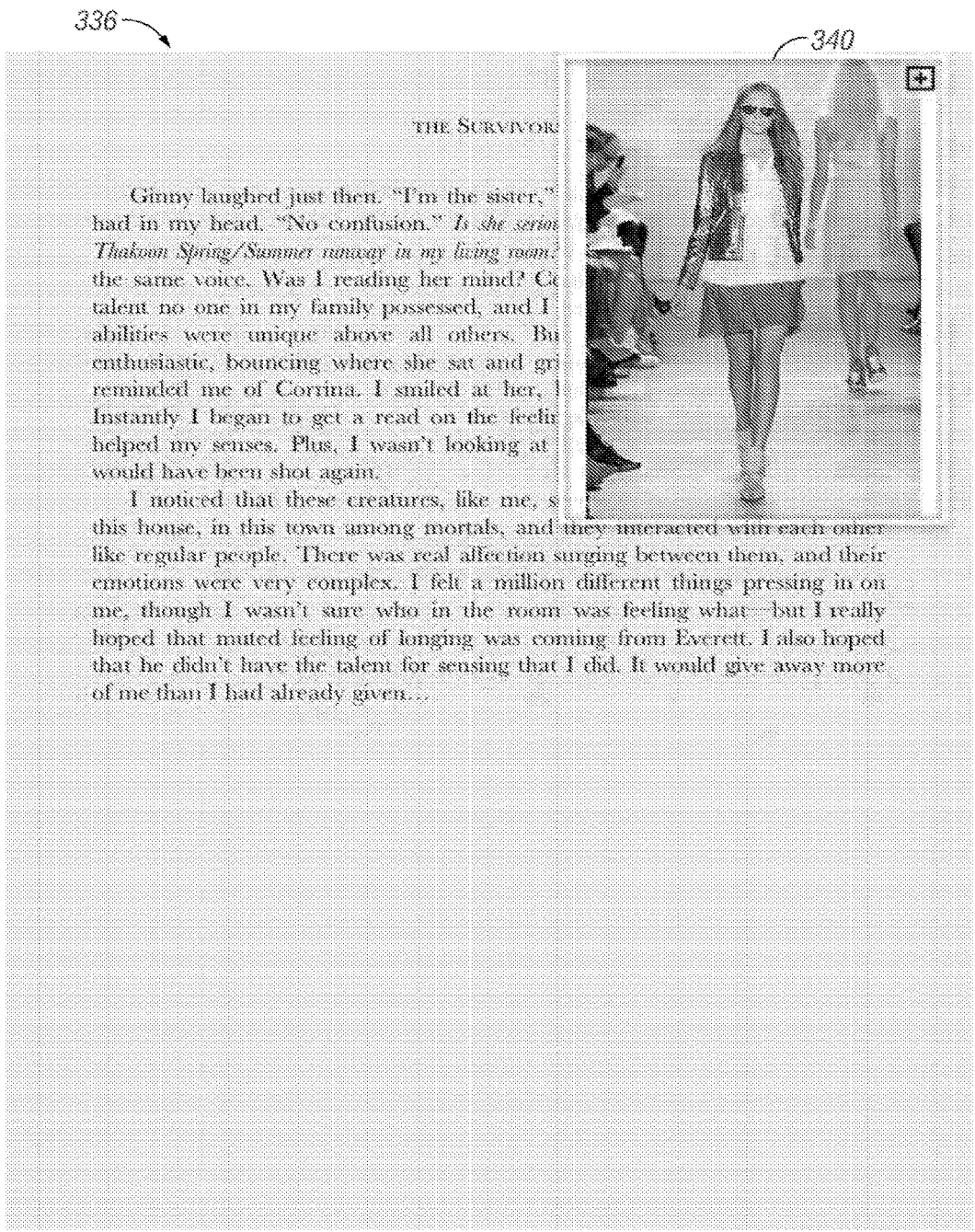

FIG. 68 illustrates another page 336 with watermark icon 338 present. FIG. 69 illustrates a floating window 340 associated with the watermark icon 338 (as shown in FIG. 68). Here the watermark icon 338 indicates women's fashion and is associated with text referring to a particular fashion item.

Figure 70:
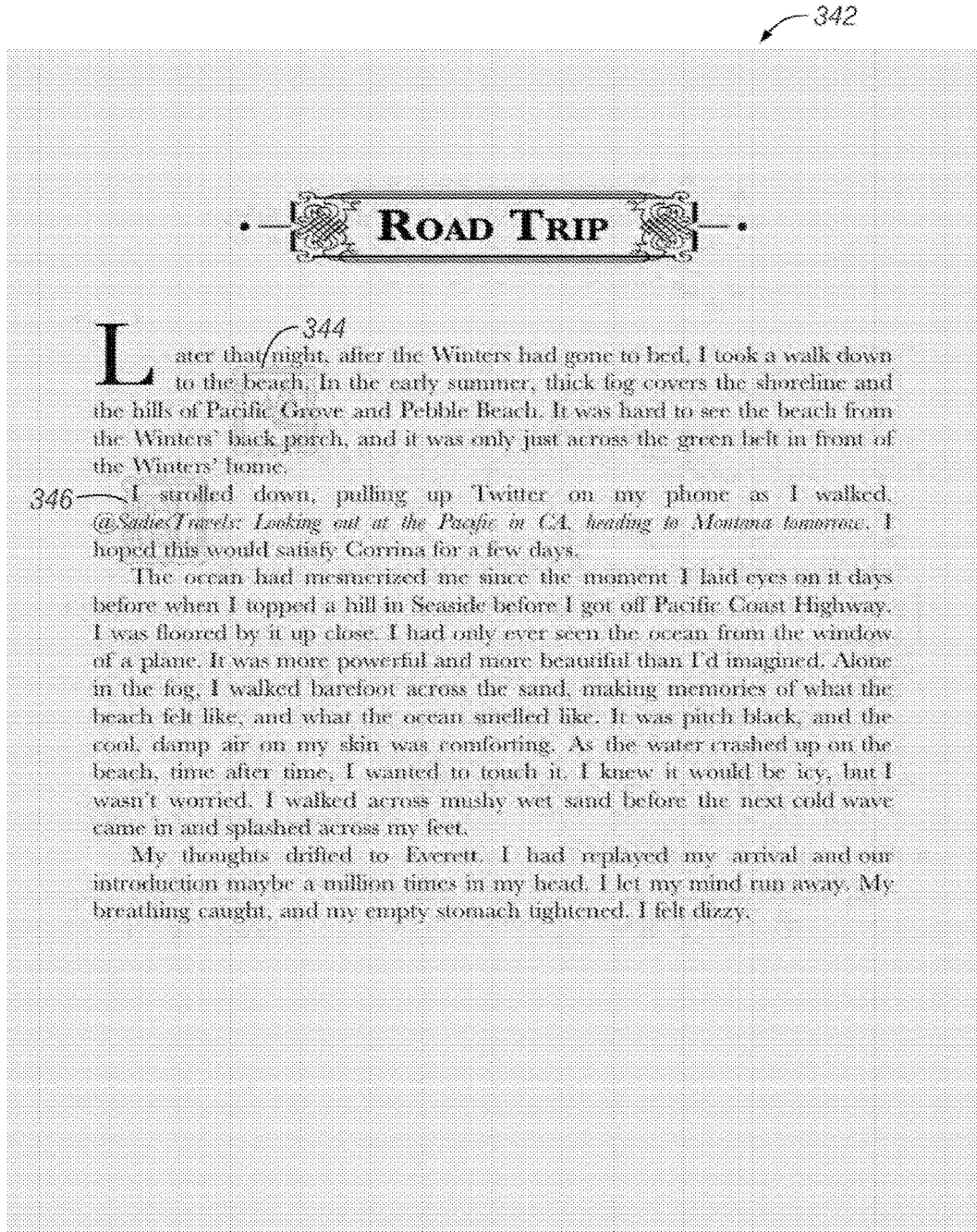
Figure 71:
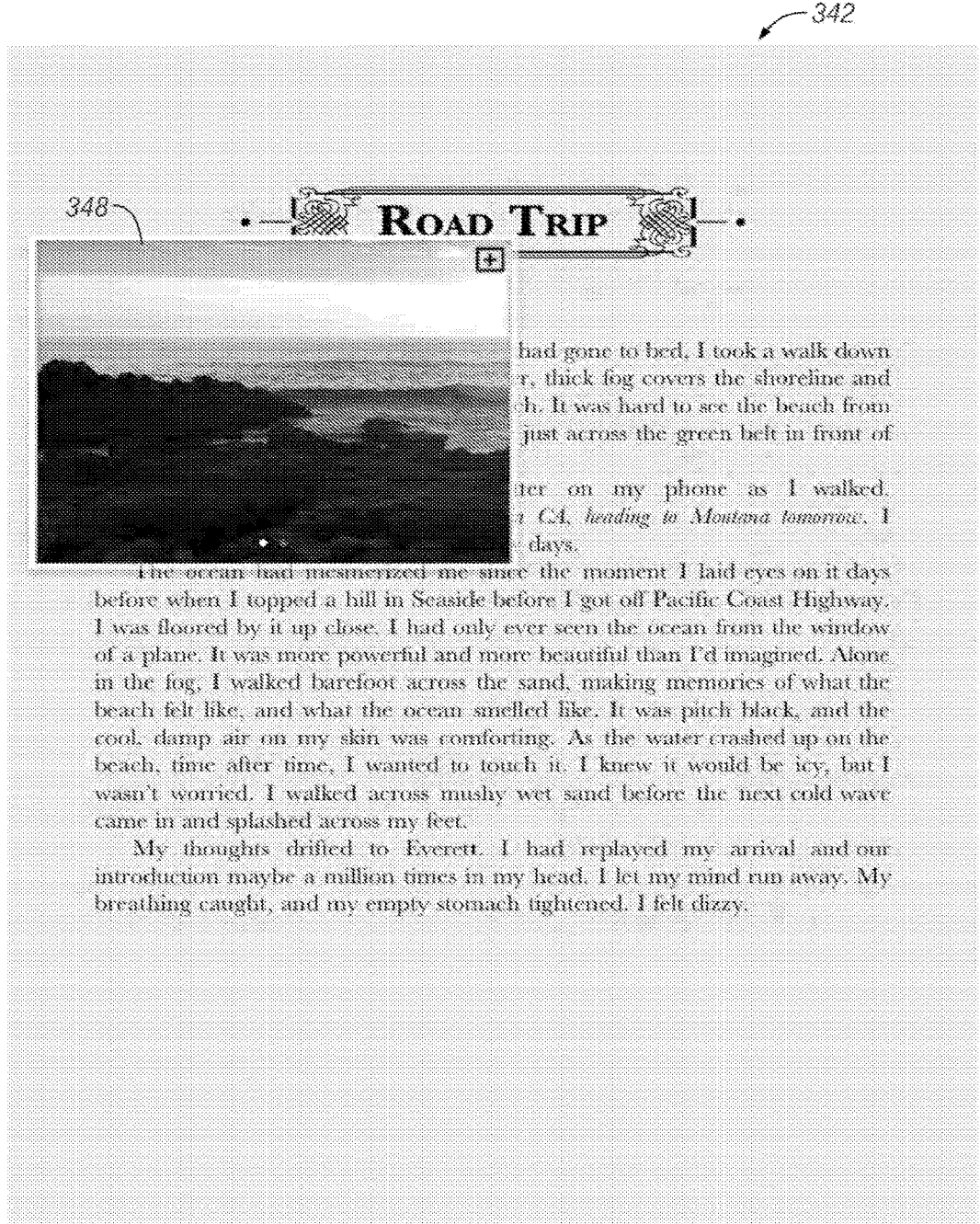
Figure 72:
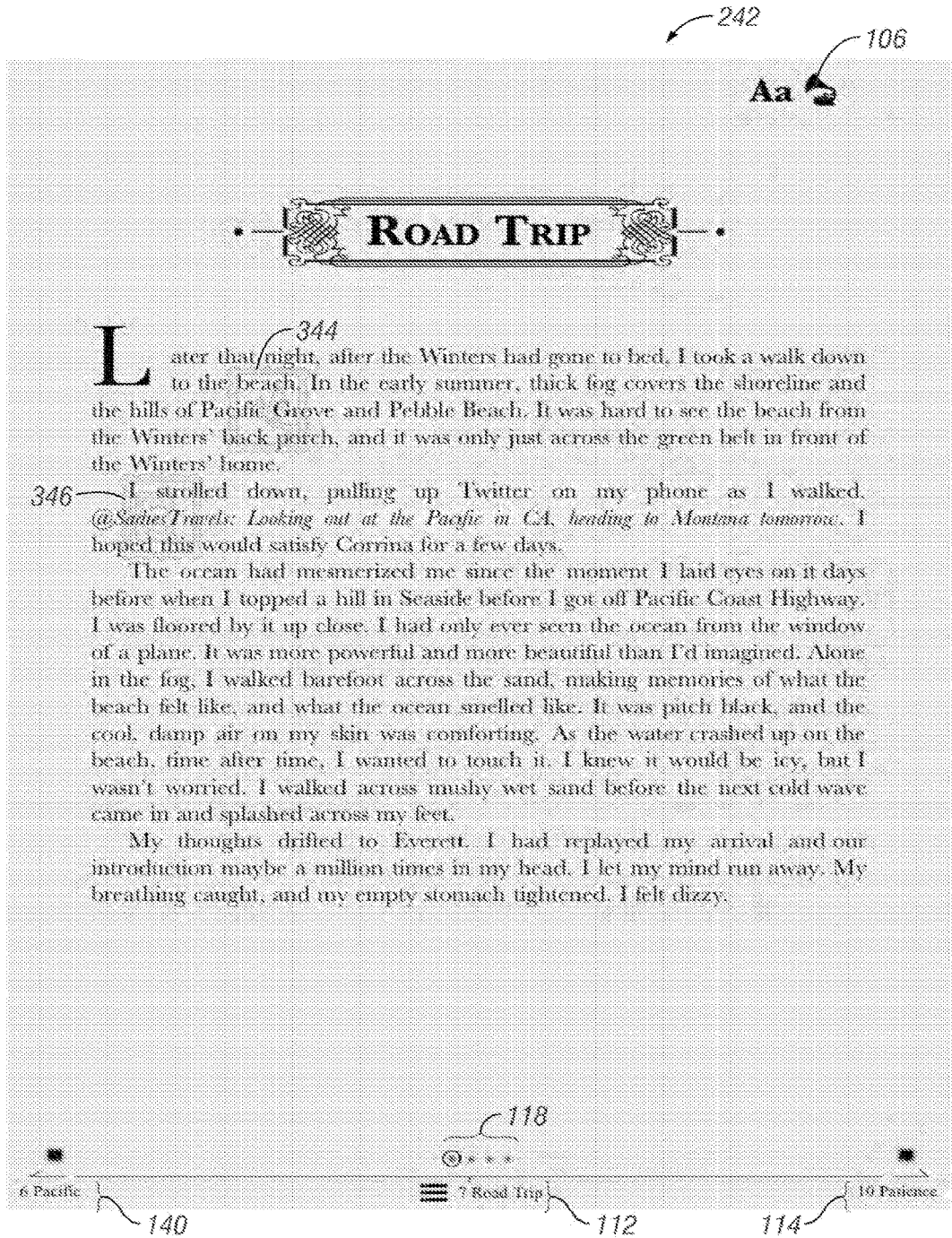
Figure 73:
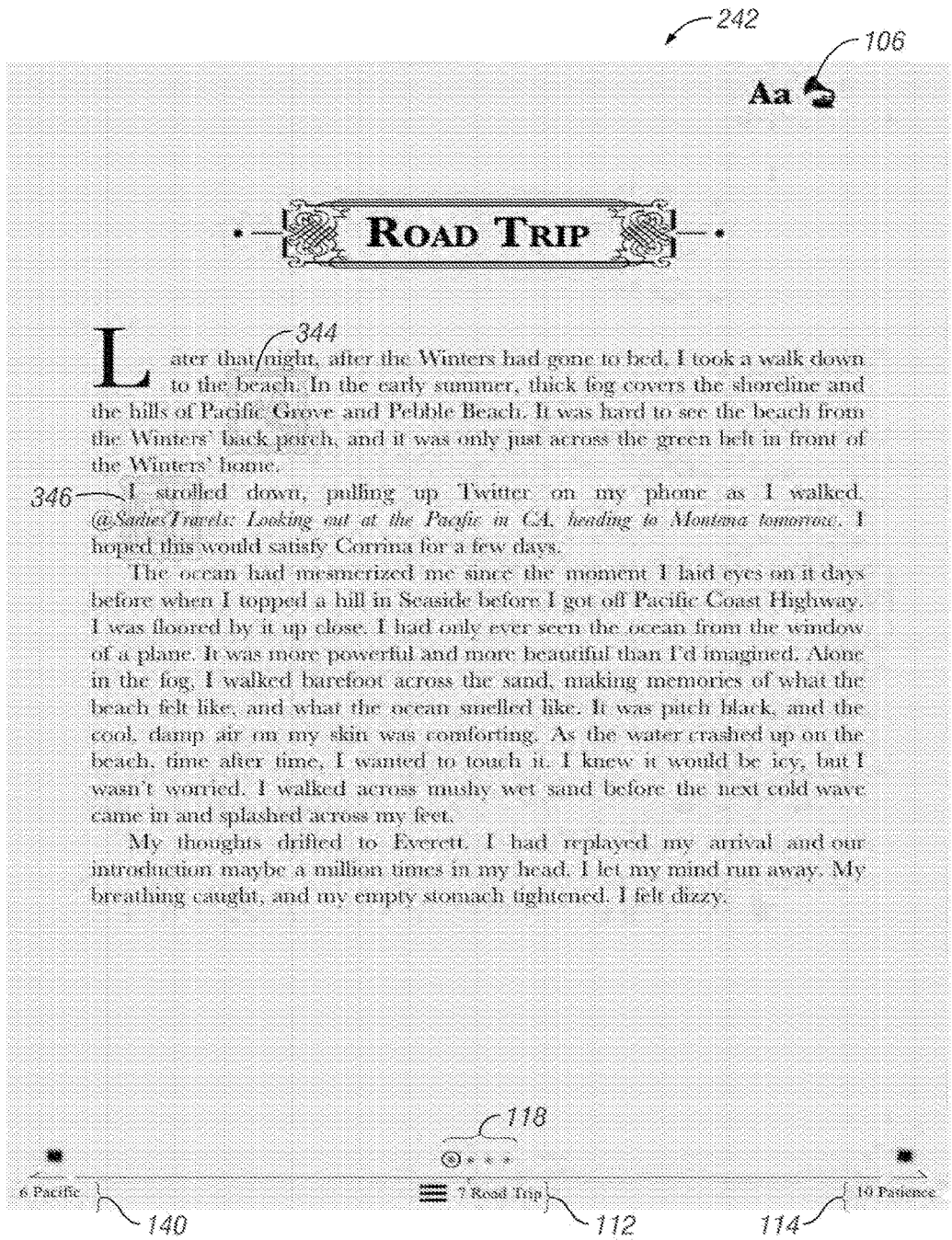

FIG. 70 illustrates another page 342. This page 342 is the first page in a chapter entitled "Road Trip." Watermark icon 344, 346 are present on page 342. FIG. 71 illustrates the page 342 with a floating window 348 associated with watermark icon 344 present. Within the floating window 348 is a photo of a landscape. The floating window may be maximized or other pages within the floating window may be shown. FIG. 72 and FIG. 73 illustrate the page 342 with phonograph symbol 106 present which provides audio control.

Figure 74:
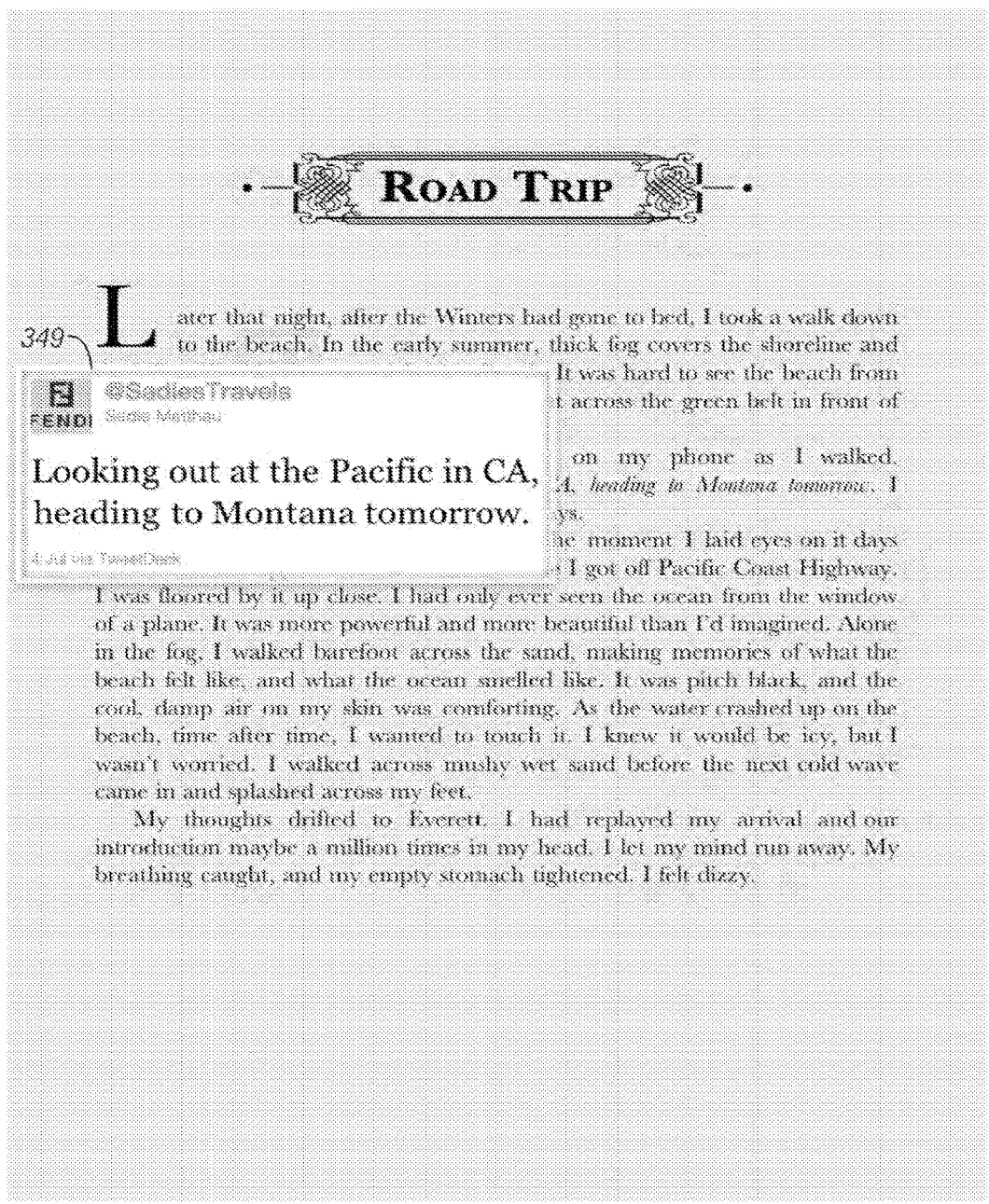
Figure 75:
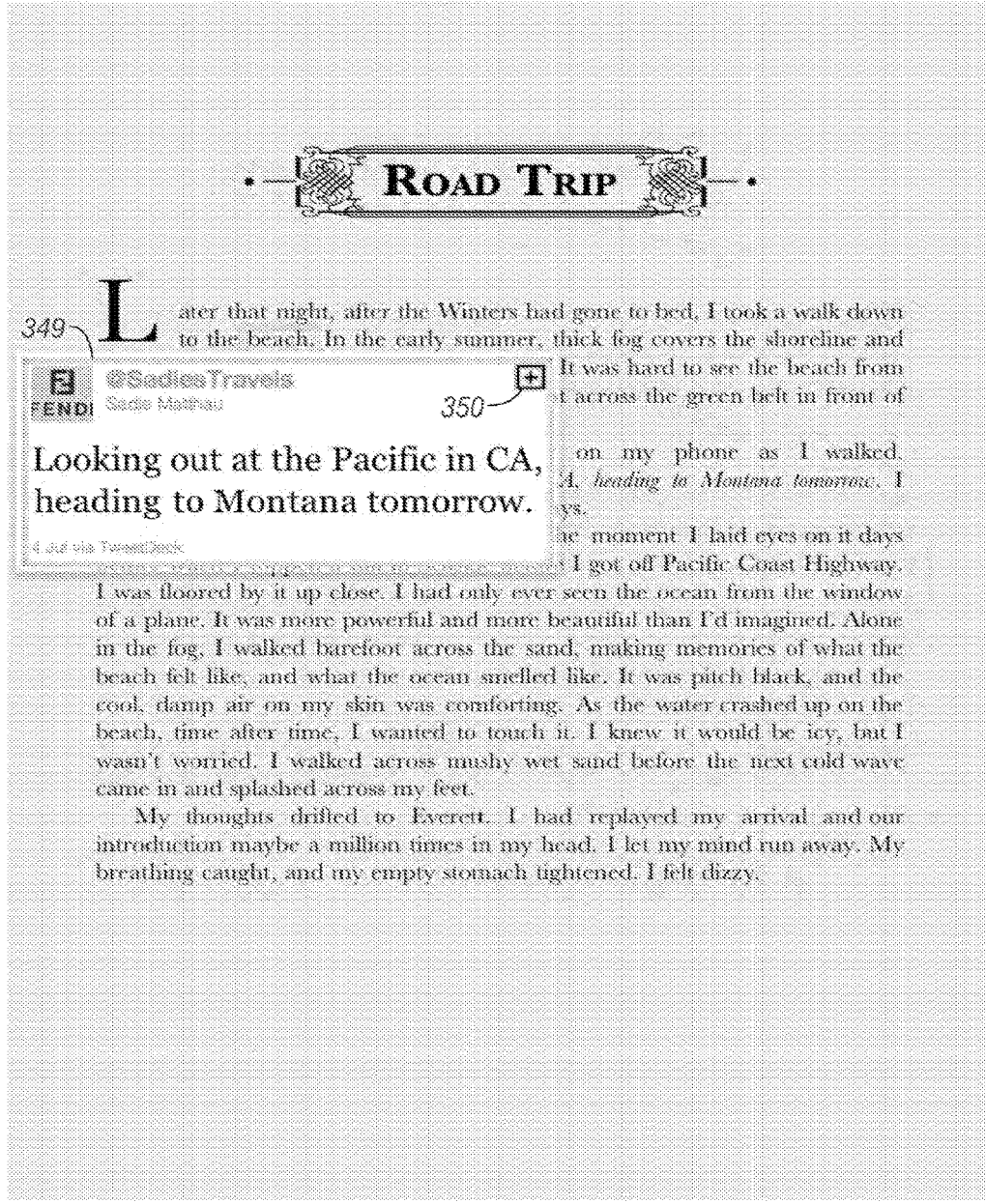
Figure 76:

FIG. 74 illustrates the page 342 with a floating window 349 for social media such as TWITTER. Thus, here the text of the book describes a character (Sadie) tweeting. There is a water mark indicia 346 associated with the tweeting. The floating window 349 then provides the additional content by showing the tweet. As shown in FIG. 75, the floating window may have a maximize control 350 for maximizing the window. As shown in FIG. 76, a maximized window 352 is provided to access not just the particular tweet but all the tweets made by that character.

Thus, it should be understood that according to one aspect of the present invention, social media features and functions may be incorporated into the interactive electronic book. For example, TWITTER functionality may be incorporated directly into the interactive electronic book. The interactive electronic book provides for TWITTER functionality without leaving the interactive electronic book. In addition, the interactive electronic book may allow a reader to enter their TWITTER login information once and then save that information so that a reader need not re-enter their complete login information.

In addition, the interactive electronic book provides for various types of TWITTER functionality. This may include, as shown in FIG. 74 to FIG. 76, embedding tweets within the text of the book and linking these tweets to actual TWITTER accounts. Thus, the present invention provides for use of TWITTER or other social media platforms in order to bring a fictional work more alive to a reader. For example, the present invention contemplates maintaining TWITTER accounts (or accounts on other social media platforms) for fictional characters within the interactive electronic book. This allows readers of the interactive electronic book a new way to interact with characters of the book. In addition, it may provide readers of the interactive book with additional material not found within the book itself which may provide additional insight into the characters or other elements of the book.

Thus, according this aspect of the present invention, the reader may use social media to allow the reader to communicate directly with the characters in the book in ways like actually asking a question of a fictional character and receiving answers from the fictional character from within the book and without leaving the book.

The present invention further contemplates that portions of the book may include tweets (or entries from other social media platforms) as a part of the book. Where the book itself includes such tweets or other entries there may be links to the social media platform so that readers can view additional related entries which may not be necessary to the story told in the book but may be of interest to readers.

In addition, social media platforms may be integrated into the interactive electronic book in other ways. For example, it allows for interaction between readers of the book. It allows for taking polls of readers of the book at various points within the book.

It should also be appreciated that embedded social media platforms within the book creates new ways for readers of the book to share the reading experience with others. It should also be appreciated that embedded social media or networking platforms also provides ways for readers to interact with the book even when they are not in the process of actually reading the book.

For example, readers can subscribe to tweeter feeds through the book and thus may later receive tweets from characters from the book, author(s) of the book, or others. In addition, due to the integration between the book and social media platforms, readers are more likely to receive messages about the book from other readers of the book as well.

It is to be understood that the integration of social media platforms into the content of the book is advantageous in a number of ways. First and foremost it assists in engaging readers in ways which they are accustomed to in other contexts and daily life. Thus, the use of social media provides opportunities for enriching the experience of the book. At the same time, social media provides opportunities for sharing that experience of the book with others which can serve to grow the audience of the book and the user's interest in the book.

Although TWITTER is the social media platform shown in FIG. 74 to FIG. 76 it is to be understood that the interactive electronic book may integrate any number of social networking platforms that exist now or may be later developed. These may include, without limitation, TWITTER, FACEBOOK, FOURSQUARE, GOOGLE+, or others.

Figure 77:
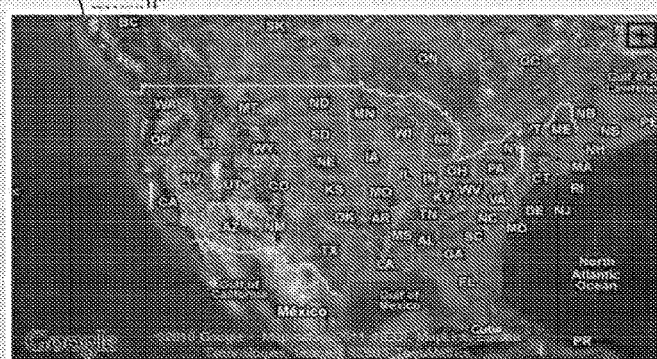

FIG. 77 illustrates another page 356 with a floating window 358. Within the floating window 358 is a map.

Figure 78:
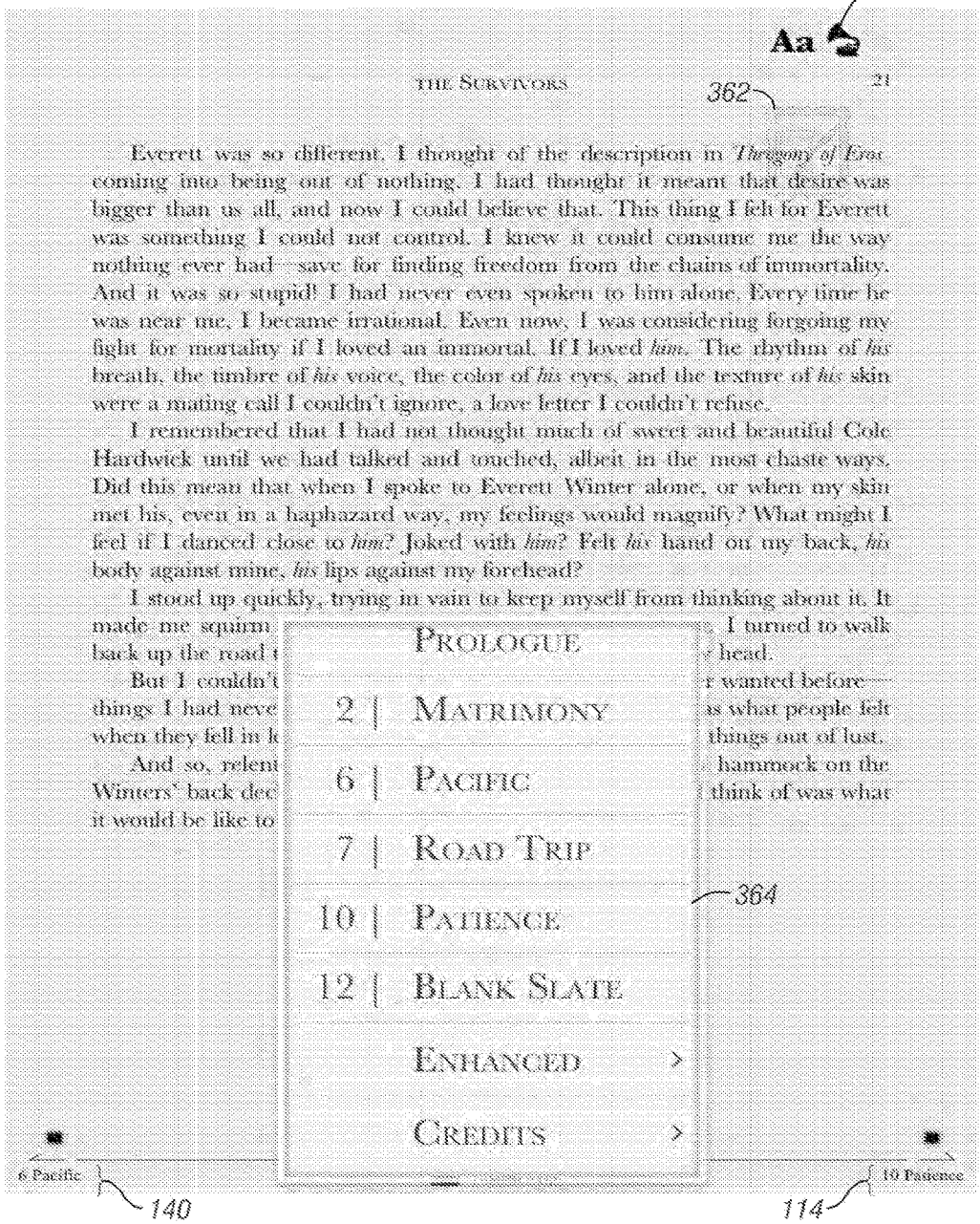
Figure 79:
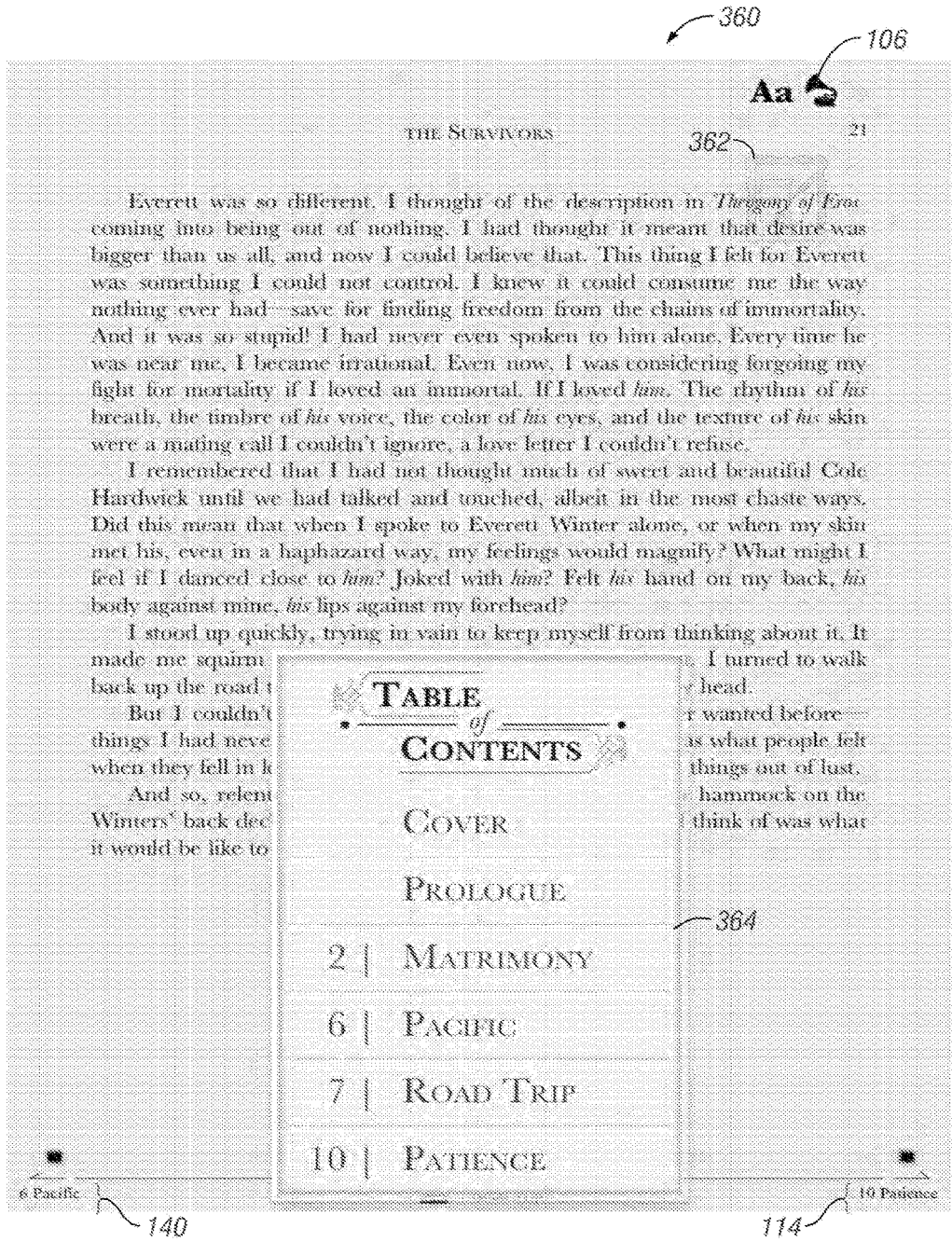
Figure 80:
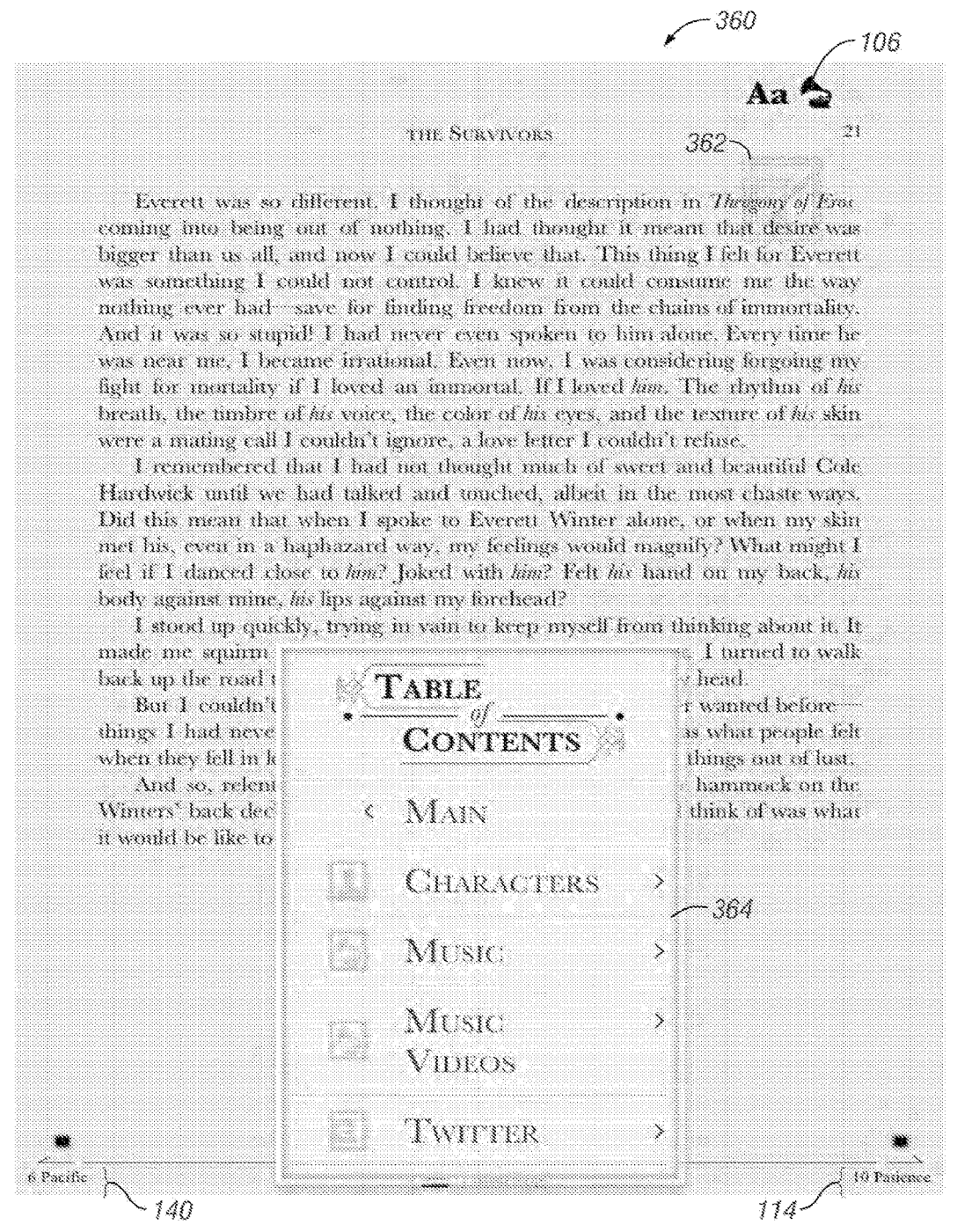
Figure 81:
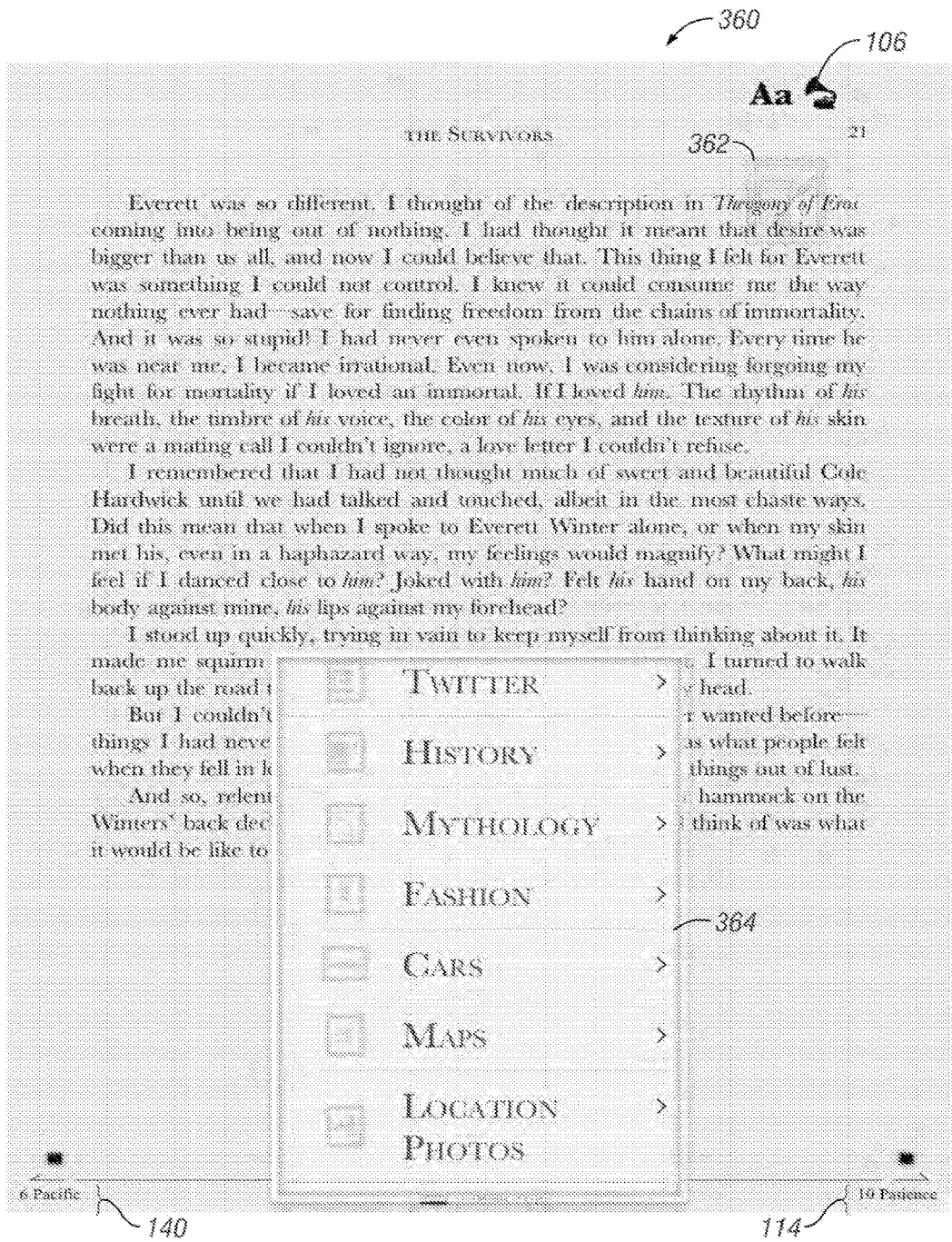
Figure 82:
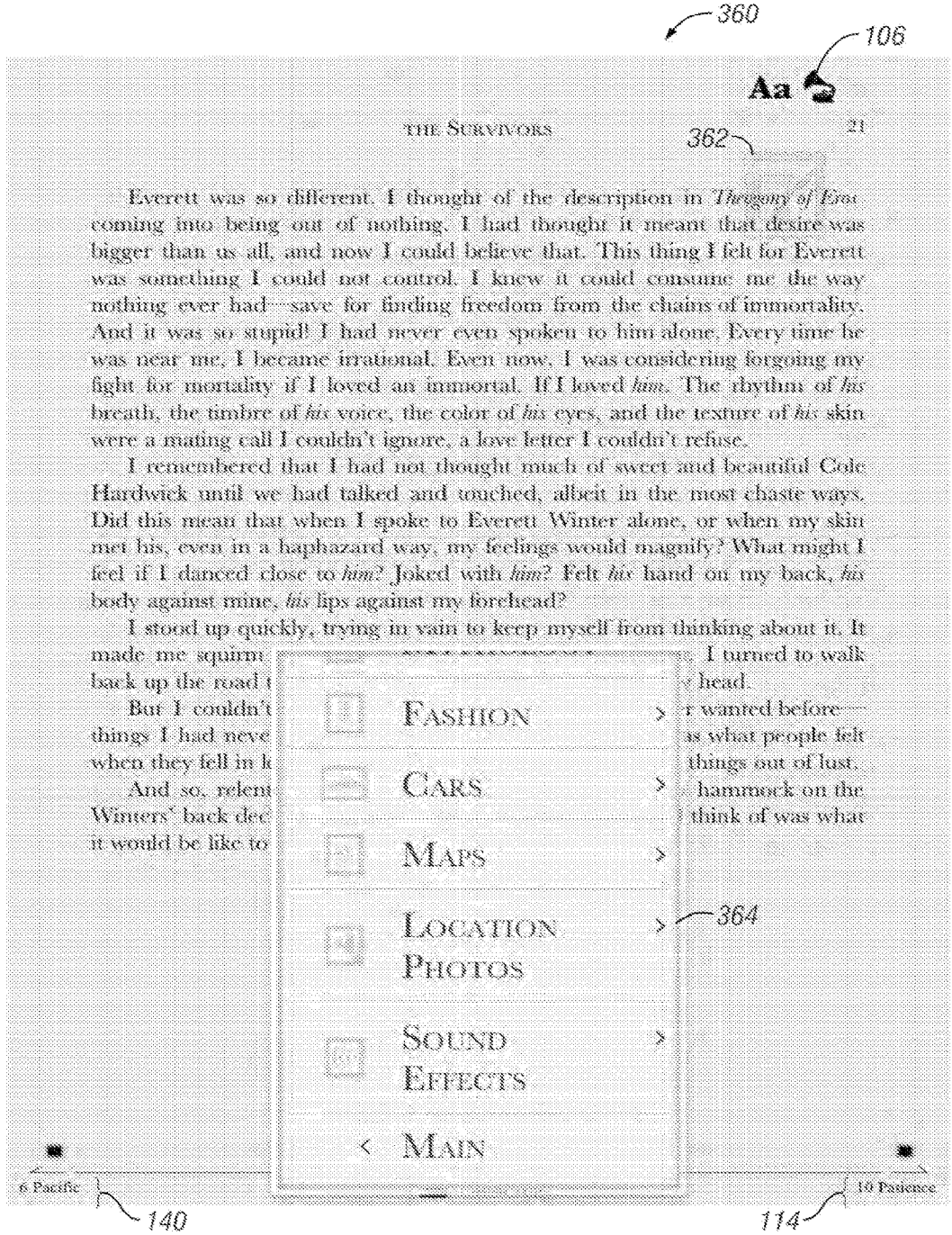

FIG. 78 illustrates another page 360. At the top right of the page 360 is a phonograph symbol 106 associated with audio controls. Also on the page 360 is a watermark icon 262. A floating window 364 displays a table of contents which can be accessed through the table of contents symbol at the bottom center of the page. FIG. 79 illustrates the same page 360 with the floating window 364 displaying a different portion of the table of contents. FIG. 80 illustrates the same page 360 with the floating window 364 displaying a different portion of the table of contents. Note that a reader can select to see traditional content such as would be in the main table of contents or other types of content, such as characters, music, music videos, or TWITTER. As shown in FIG. 81, other types of content may include history, mythology, fashion, cars, maps, and location photos. As shown in FIG. 82, other types of content may include sound effects.

Figure 83:
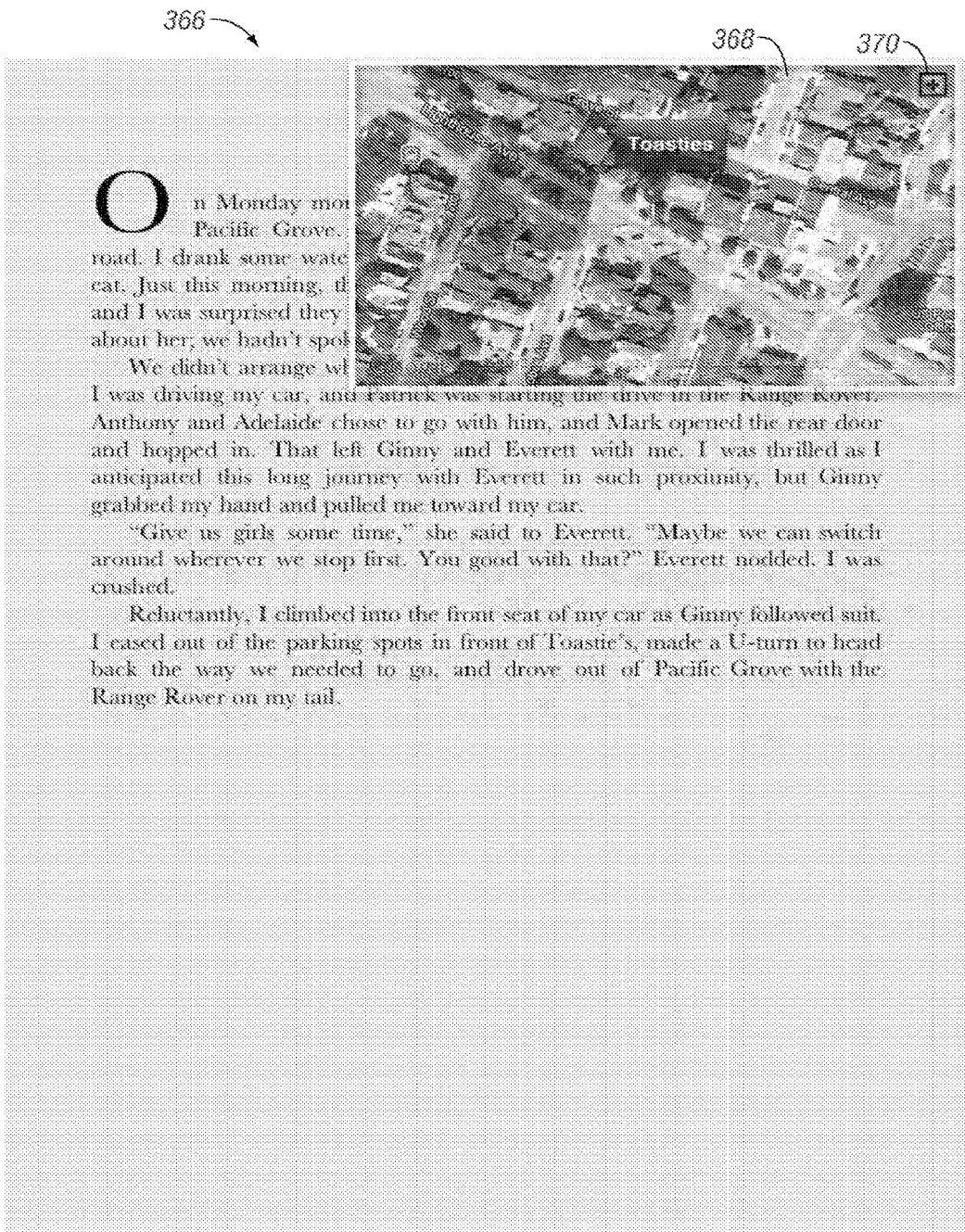
Figure 84:
Figure 85:

Another way in which the present invention may morph a fictional story with reality is illustrated in FIG. 83 through FIG. 85. The story in the book may reference a particular place, such as a restaurant (Toasties). A floating window 368 is shown in FIG. 83 with the particular place marked on the map. There is a maximize control 370 associated with the floating window 368. A reader may select the maximize control 370 to provide a maximized window 372 (as shown in FIG. 84) with control 370 (which may now be used to reduce the window size). A map 374 is displayed within the window 372. As shown in FIG. 85, a zoomed-out version of the map 376 may be displayed.

It should be recognized that the use of the maps provides another way for users to interact with the book not just when they are reading the book but otherwise. For examples, readers of the book may travel to the locations shown and described in the book. This allows the readers to connect with the characters in the book. A reader of the book could, for example, travel to the same restaurant and eat the same meal as a character ate, enjoying the same view that the character viewed or otherwise sharing actual experiences with the character.

The present invention further contemplates that the use of particular locations within the book may benefit those locations. For examples, including a particular restaurant and a particular meal within the interactive electronic book may lead to readers of the book going to the particular restaurant and perhaps having the same meal. The present invention contemplates that such locations may pay for the opportunity to be included in the book.

Figure 86:
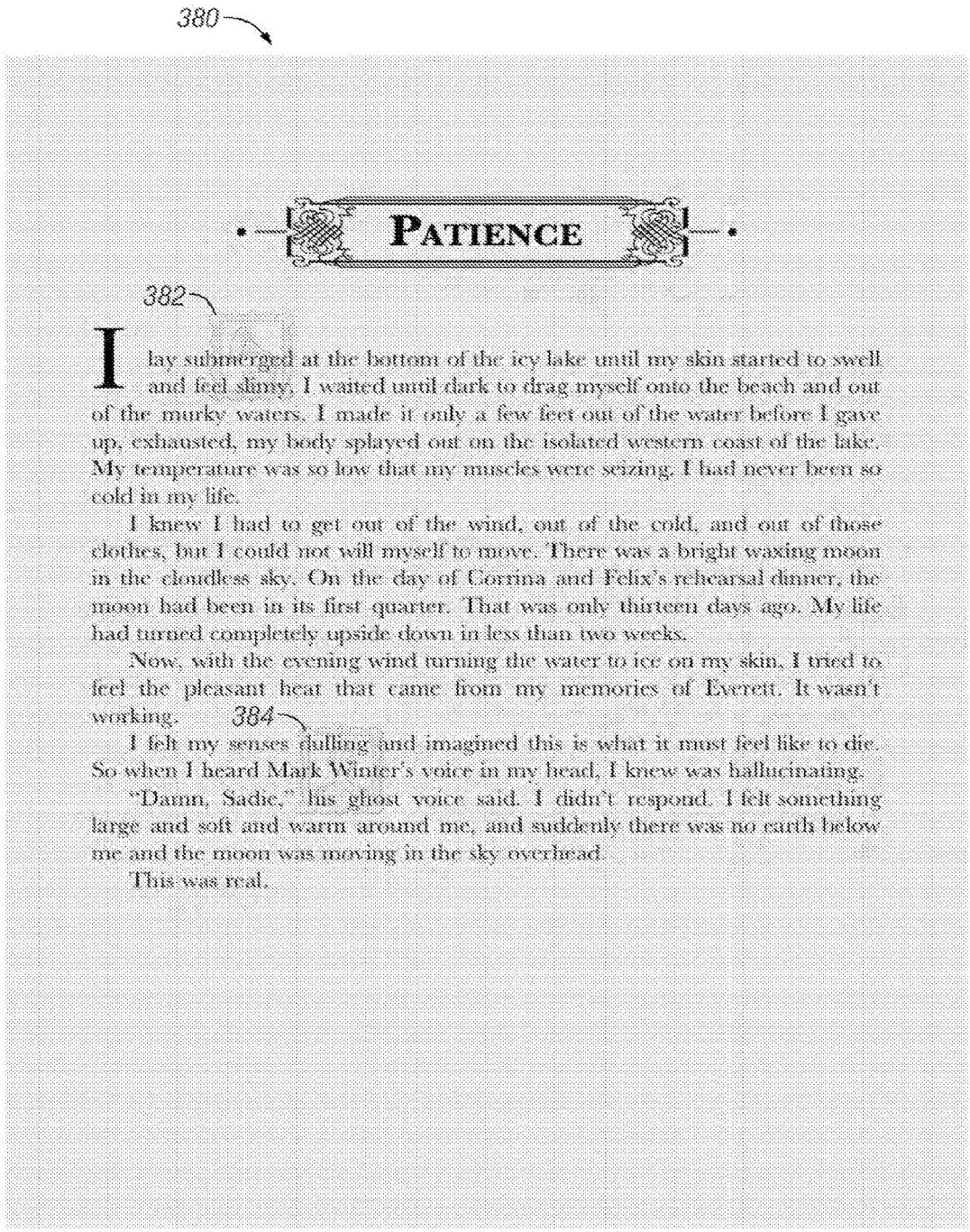
Figure 87:
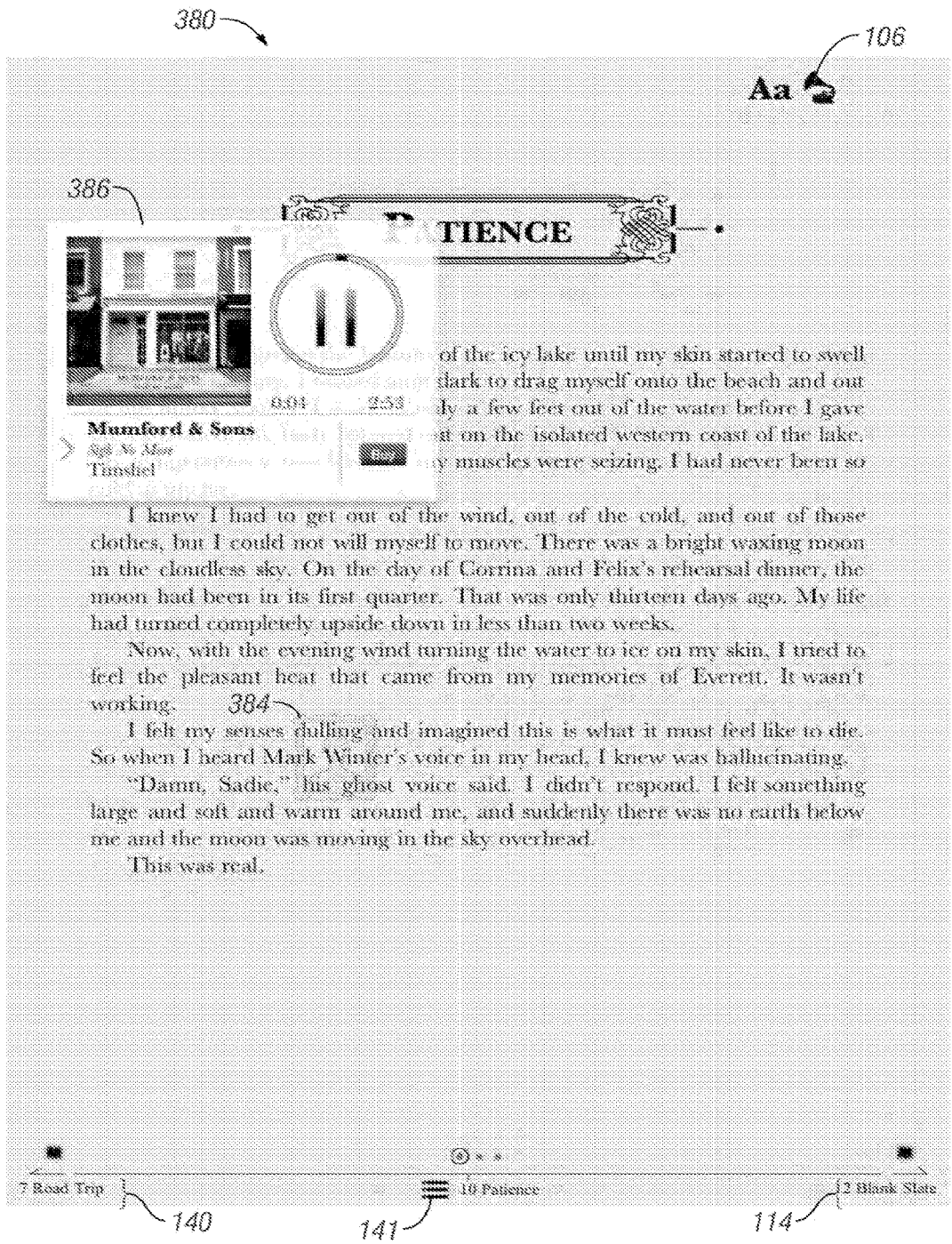

FIG. 86 illustrates another page 380 which includes water mark indicia 382, 384. FIG. 87 illustrates a floating window 386 in which a song is being played.

Figure 89:
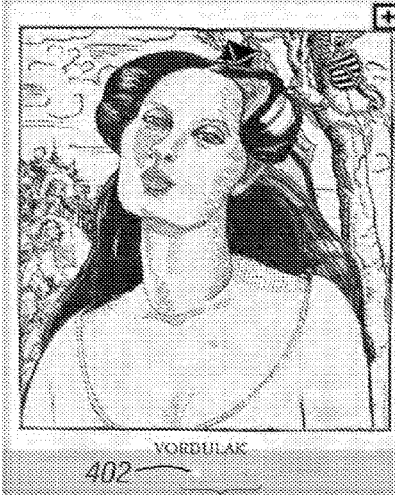
Figure 90:
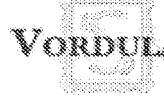
Figure 92:
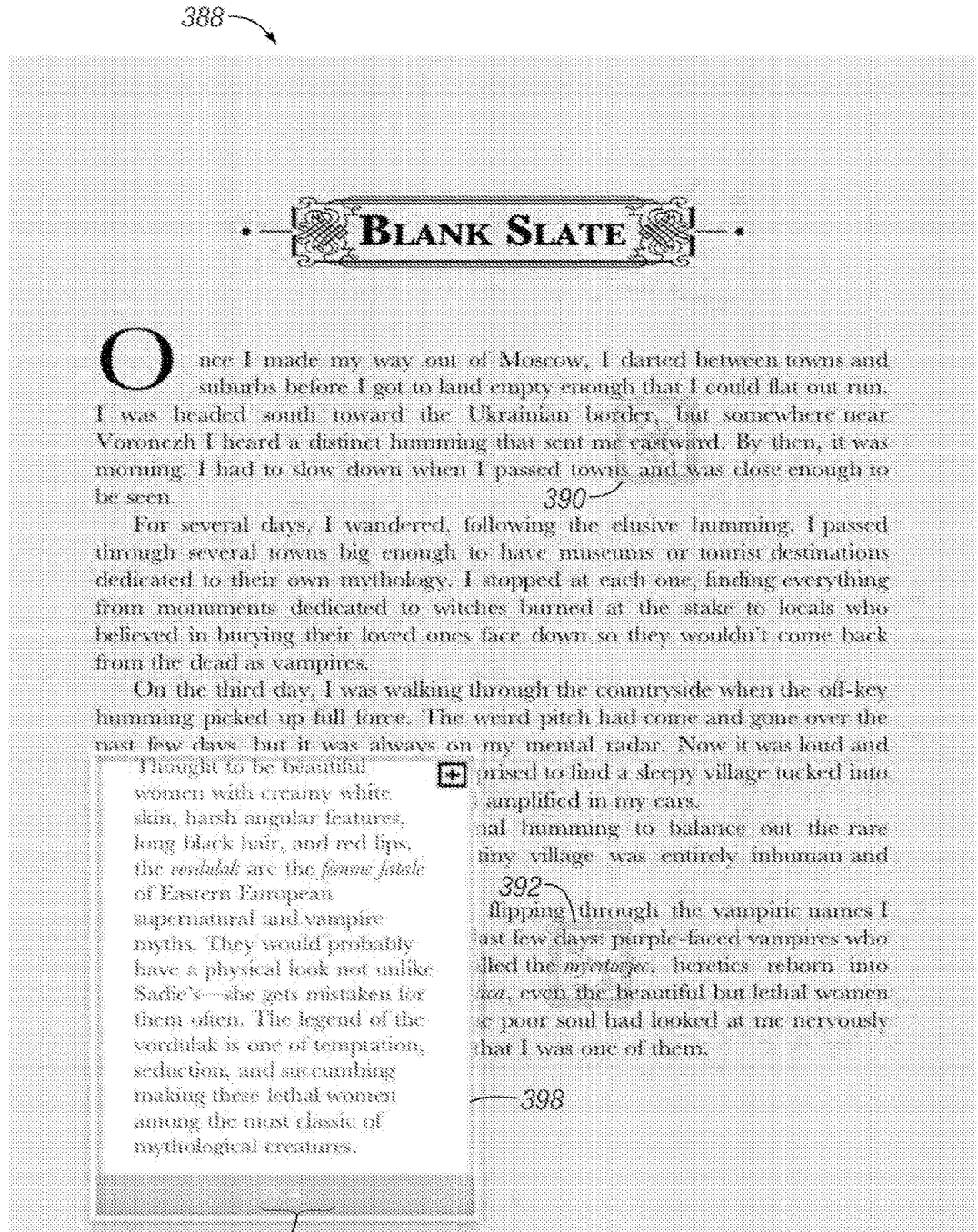
Figure 93:
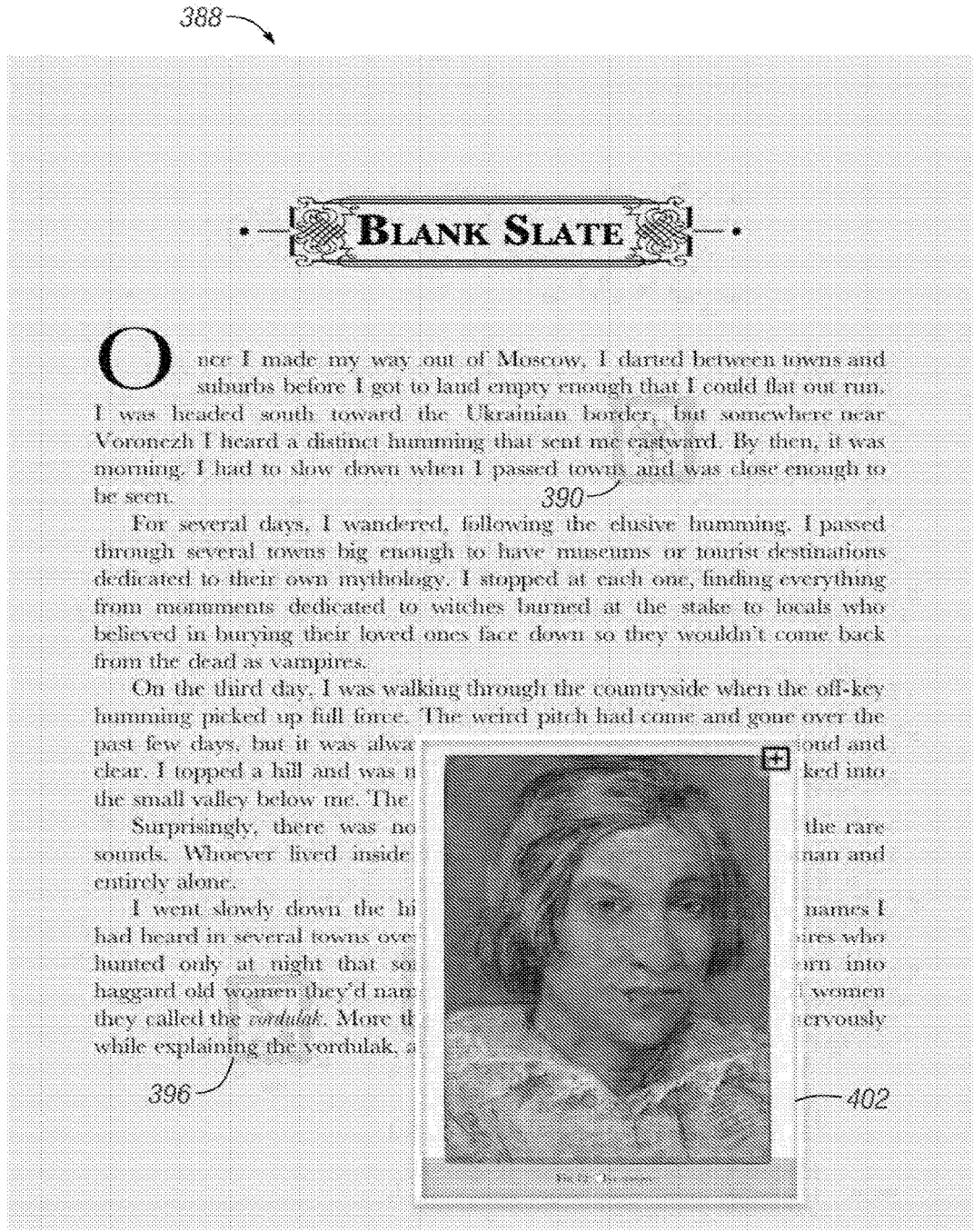

FIG. 88 illustrates another page 388 which is the first page of the chapter entitled "Blank Slate." The page 388 includes watermark icon 390, 392, 394, 396. Note that watermark icon 396 appears behind the text for the term "vordulak." As shown in FIG. 89, a floating window associated with the watermark icon 396 is shown. Also note that one can determine from the plurality of elements 400 that what is being shown is the first of two pages about the vordulak. As shown in FIG. 90, 91, 92 a portion of the second page about the vordulak may also be shown. Similarly, FIG. 93, 94, 95 illustrate a floating window 402 associated with the watermark icon 392 which appears behind the text for the term "myertovjec." Both the vordulak and the myertovjec are examples of mythical creatures.

Figure 96:
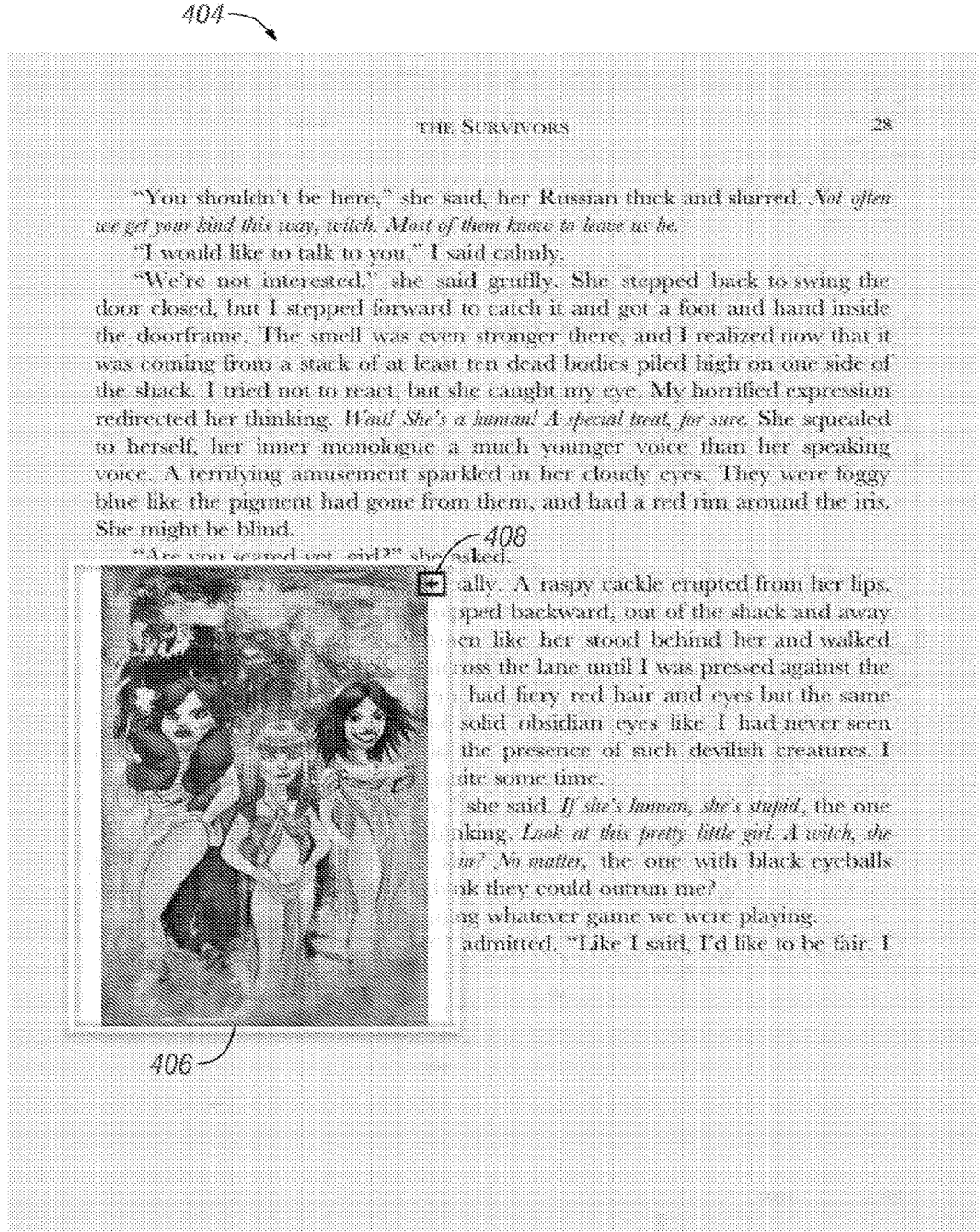
Figure 97:
Figure 98:
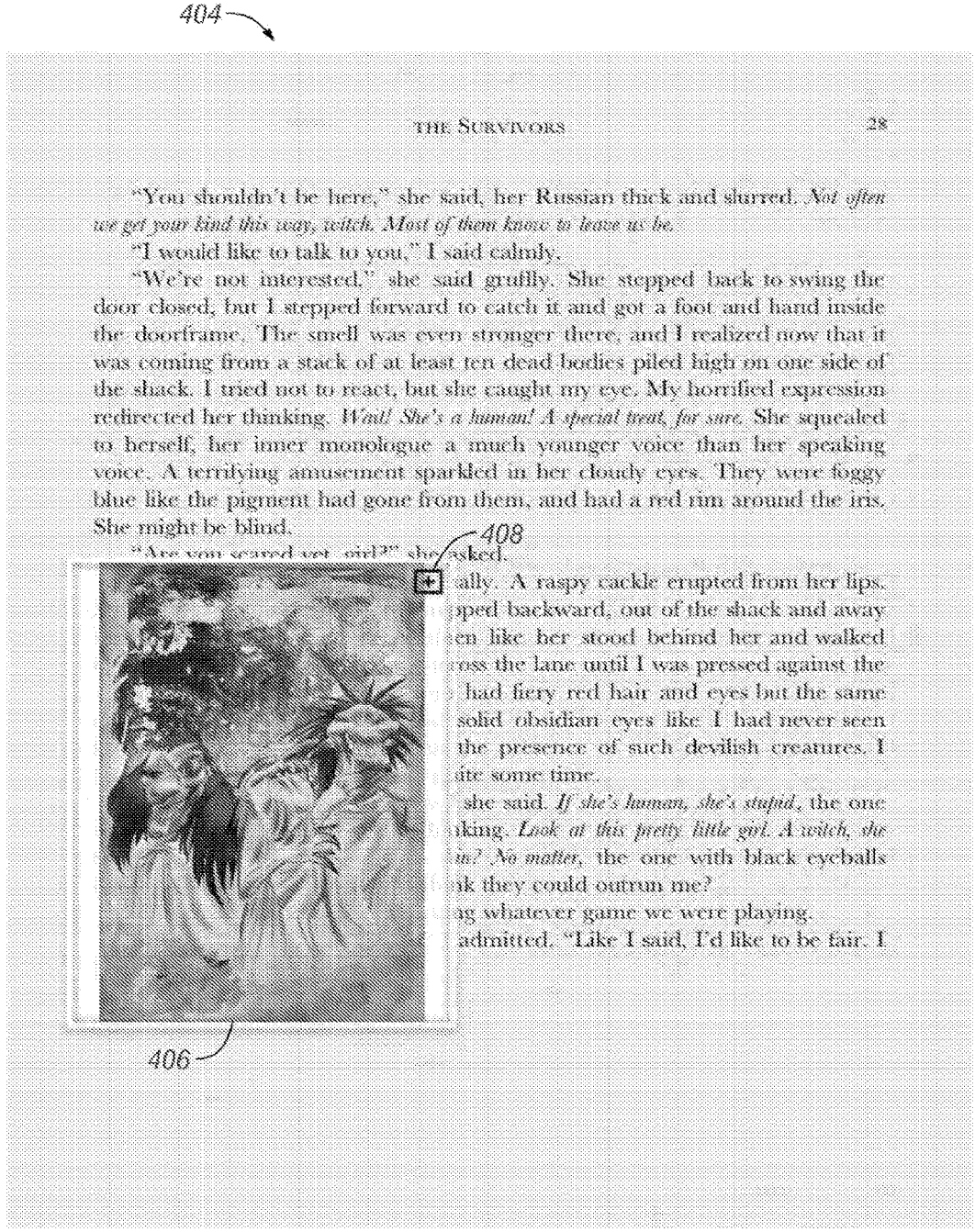
Figure 99:
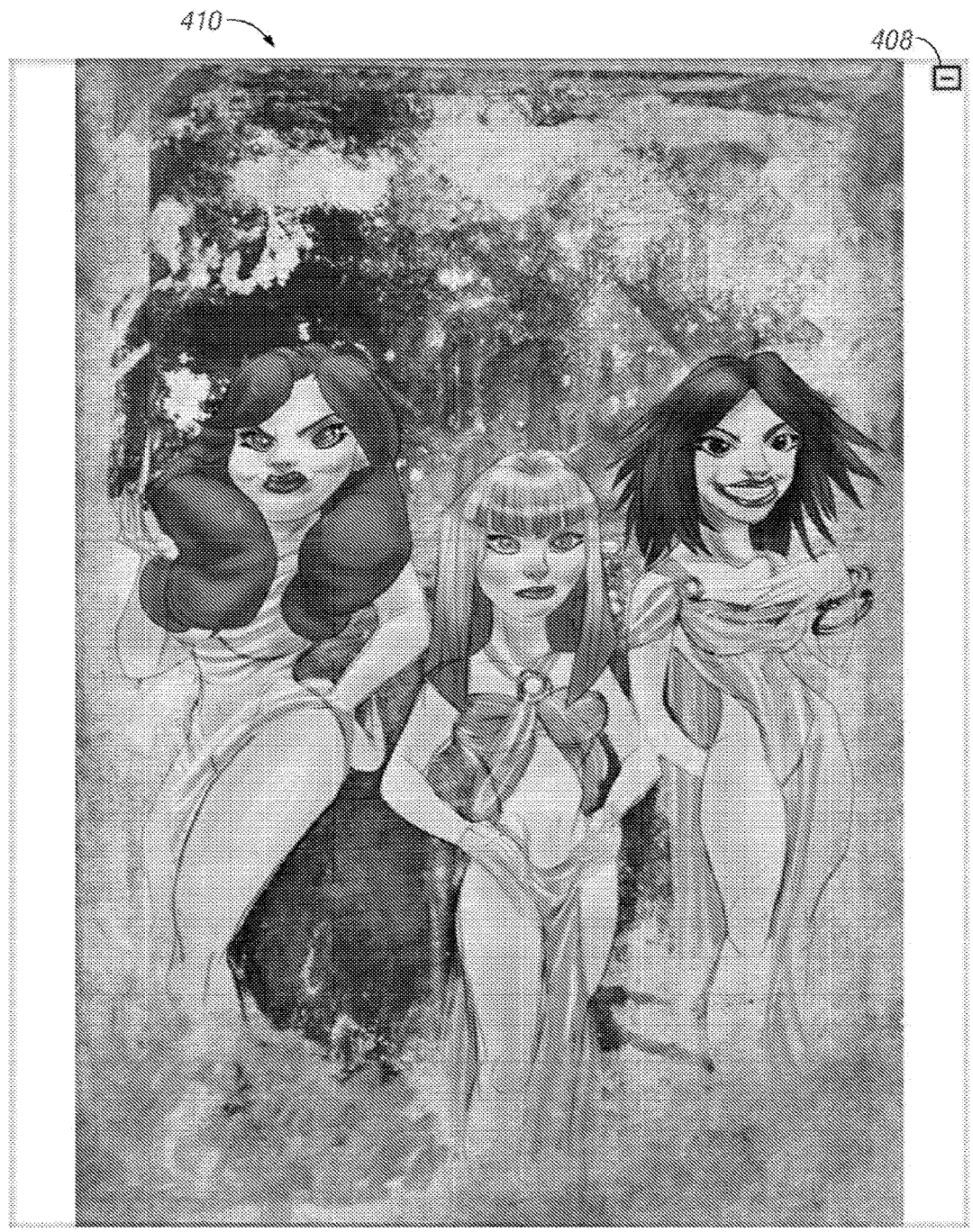
Figure 100:
Figure 101:
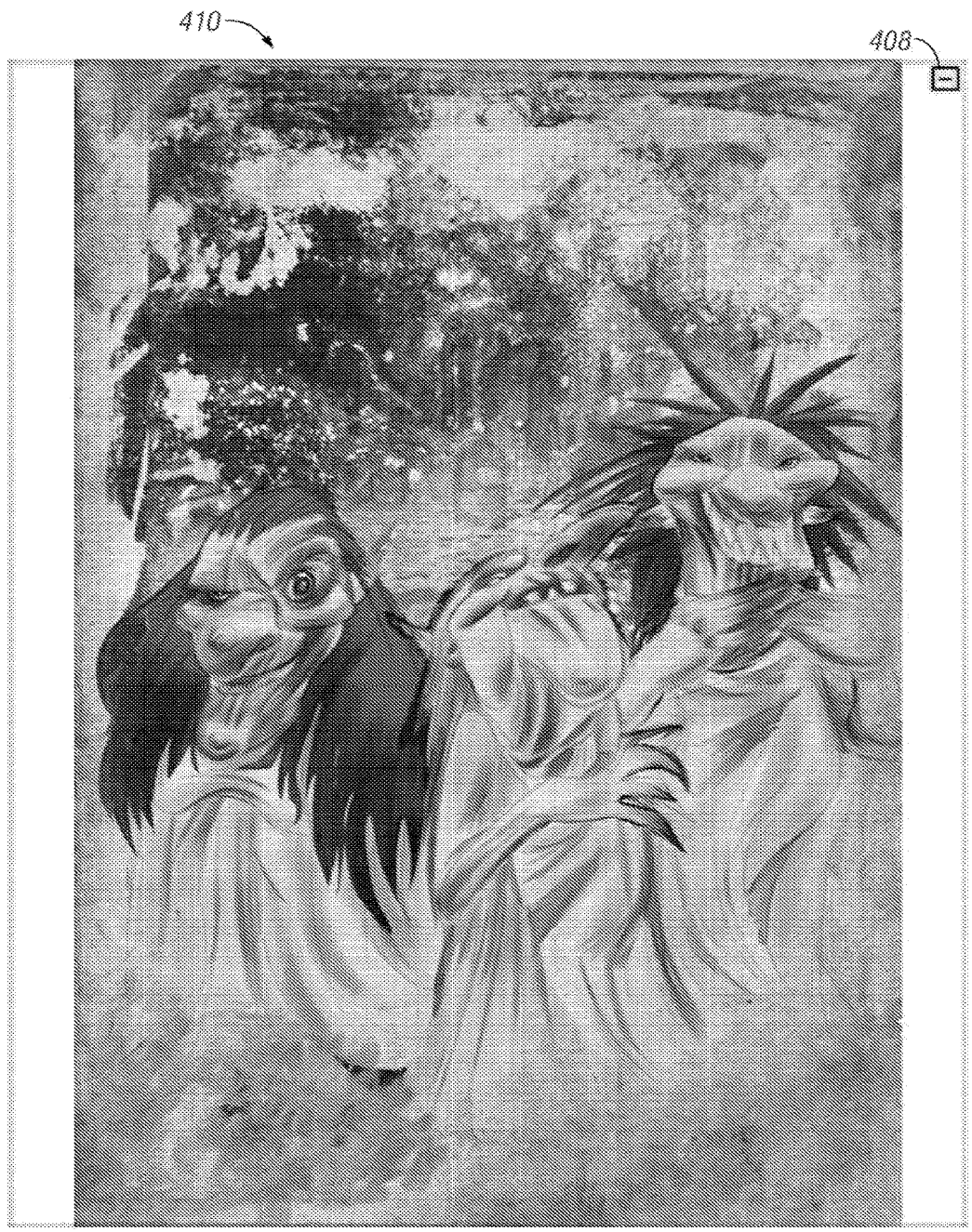

FIG. 96 illustrates another page 404 which includes a watermark icon (not shown) associated with a floating window 406 which has a control 408 which may be used to maximize the floating window. Within the floating window 406 may be a video or an animation. FIGS. 97 and 98 illustrate different frames within the floating window 406. FIG. 99 illustrates a maximized window 410 with a first frame and FIG. 100 and FIG. 101 illustrates different frames showing the transformation of pretty little girls into devilish creatures as described in the text on page 404. Although not shown, a slider element or other type of control may be used by a user to transform the characters back and forth between girls and creatures.

Although various examples of interactive elements have been described herein, it is to be understood that the present invention contemplates any number of interactive elements. These may include:

Depth/exploration element. This element may be associated with a watermark icon illustrating a time line. The content of this element may include book happenings, historical events, or a total chronological inventory. Secondary layers may include external links to history, other books, other books within a series of books, other books from the same publisher, other books written by the same author, other books read by the author.

Google Earth/Maps element. Although Google Earth and Google Maps are used it is to be understood that other mapping platforms may be used instead. This element may be associated with a watermark icon illustrating the earth, a map, or a compass. The content of this element may include a work map, pinpoints of locations within the book, a pinpoint to the "current" location within the book (where the story is taking place). The pinpoint to the current location may be of a different color or use a different symbol to distinguish it from other pinpoints within the book. Secondary layers may include information about the place and other map functions such as street view, satellite views, etc. The content of this element may also include video such as geolocating video, or video of traveling the routes between different locations within the book. Secondary layers may also include 360 degree views of specific locations within the book. Other secondary layers may include integration with geolocation applications or social media platforms which use geolocation. For example the ability to check-in with FourSquare may be provided. Further secondary layer may also include the ability to make a reservation at a particular location (such as when the location is a hotel or restaurant), plan a trip to the location, buy a ticket associated with the location (such as when a ticket is required to visit the location).

It is to be further understood that the content of the maps may be dependent upon the position of the text within the book. For example, a map with pushpins to mark locations or a map which illustrates routes may only reveal those locations or those routes which have already been referenced in the book.

Simple image+sharing/exploring floating windows. Various types of simple image and sharing/exploring floating windows may be used. Different icons for the watermark icon may be used depending upon context. For example, a history icon may be used to indicate historical maps, historical documents, or historical texts. Secondary layers may include providing external links with additional information, the ability to buy copies of historical works, and other features.

History or mythology images may also include maps. One example of a map would be a zoned supernatural map infographic which may be color coded by region and/or supernatural creature.

A mythology icon may be used to indicate the presence of further explanation of mythology and supernatural creatures. Secondary layers may include a translucent floating side menu/bar or scrolling capabilities within the window. Other secondary layers may include external links to buy a book or read/learn more.

Images of places may also be used as an icon. Content may include photos or 360 degree views of book locations such as hotels, bookstores, airports, restaurants, parks. Secondary links may include links to maps or other content.

Images of books may also be used as an icon. The content may include images, a cover image, description or reviews of books such as books which a character in the story is reading. Secondary layers may include a buy the book feature.

Images associated with TWITTER may also be used as an icon. The content may include tweets referenced in the book or tweets from characters or the author. Secondary features associated with the tweets may include the ability to retweet, follow, receive more from, or see all of the characters of the book on TWITTER.

Multi-layer interactive floating windows. This type of element may be used in various ways. For example a fashion icon may be used. Content associated with the fashion icon may include runway pictures, other images of individual fashion pieces displayed in web form with a spread of thumbnail images for each outfit. Secondary layers may include enlarging each individual piece from a thumbnail image, scrolling through the runway from a season or collection, similar looks, or related content. Secondary layers of content may provide for downloading an application, the ability to purchase the items, the ability to get the look for less, the ability to share the look (such as on a social media platform such as Facebook or Twitter), or to see the look.

A slider icon may be used to provide for photo transformation of shape-shifters and other supernaturals, to move back and forth between a historical map and a current day map, or for other purposes.

A community icon may be used to indicate content related to a community. This may include the ability to add typed comments to the community. Where comments or added, it is contemplated that there may be an ability to flag inappropriate comments by others. Secondary layers associated with typed comments may include showing a keyboard (where used on a touchscreen display), using alternate logins (such as logins for FACEBOOK or other social media platforms if the reader is not already logged in), a FACE- BOOK Like feature or within the interactive electronic book application a thumbs up or thumbs down to comments.

Community content may also include polls. Secondary layers may include taking the poll within the book at key moments and at the end of the book.

Community content may also include video and photo reactions and comments. Secondary layers may provide for posting to video websites such as YouTube, blogs, Facebook, TwitVid or others. Secondary layers may also include Facebook like or within the interactive electronic book application a thumbs up or thumbs down to these posts.

Multi-layer multimedia floating windows. This type of element may be used in various ways. For example, music icons may be used. Content associated with the music icons may include song play only. Secondary features may include placing the song content at the appropriate place in the book to add to the experience of the story. Content may also include a fuller music interactive pop-up window. Secondary layers may include artist information (along with the ability to follow on Twitter, link to an external web site, like the song or artist on Facebook, or other functionality). Secondary layers may further include photos or video associated with the player and the ability to play other songs; share or Tweet specifically on Ping. Other secondary layer may provide for downloading the song (such as through iTunes), buying a full album, buying a playlist associated with the book, or showing lyrics. The lyrics may be specifically stylized to emphasize certain lines or words.

Another use of the multi-layer multi-media floating window is to provide content related to cars. A car icon may be used to identify the content. The content can include information about cars present in the book. Secondary layers may include still photos and specifications for the cars, 360 degree photo experiences of the cars, driving experience videos, or downloading applications associated with the cars.

Text interaction. Another element allows for text interaction. This element may include any number of features such as define, highlight, bookmark such as may be known in the art. In addition, one can select a portion of the book in the convention manner but use a "QUOTABLE" feature which allows one to share on Facebook, Twitter, other social media platforms, or otherwise.

Other elements or features of an interactive electronic book include: The ability to share progress of where you are in the book with others through social media platforms or otherwise.

The ability to check-in to book locations. Thus once you are at a particular location in the book you can check into the physical location through a platform such as FourSquare.

The ability to check into an actual location on a platform such as FourSquare.

The ability to sign in at the beginning for Twitter, FourSquare, Facebook, an author web site, a book web site, a book series web site, a publisher web site. Alternatively, windows/pop-up sign-ins if this feature is not used.

The ability to turn off various features of the book or otherwise set user preferences for the book.

The inclusion of music videos which may be at designated spots within the book or at the end of them. They may also be accessed through the table of contents.

The table of contents may have visual elements allowing one to enter the interactive electronic book to hear music, go to the map or timeline, watch the music videos, find book information such as on a jacket copy (about the author, front, spine, and back cover).

The inclusion of introductory walk-throughs the first time the book is used, the walk-throughs being findable and replayable at a later time.

Thus, an interactive electronic book has been described and shown. The present invention is not to be limited to the specific examples and embodiments described herein. It is to be understood that the present invention contemplates that the interactive electronic book may be used on any number of different types of devices or computing platforms. The interactive electronic may include any number of different types of watermark icon (where used), any number of different types of interactive content, any number of different types of secondary layers of interactive content. Where social media forms a part of the content, the present invention contemplates that any number of types of social media platforms may be integrated into the electronic book. The present invention further contemplates that any number of different types of products may be featured in the book, including media products (such as songs, videos, music videos, other books, software applications, etc.), fashion products, vehicles, and any other product. These and other variations, options, and alternatives are contemplated.

The invention claimed is:

1. One or more non-transitory computer-storage media having computer executable instructions embodied thereon that, when executed on a computing device perform a method for providing an interactive electronic book, the method comprising:
   providing a user interface for the interactive electronic book, the user interface including representations of pages to display on a display associated with the computing device, wherein the representations of pages include a story about a fictional character using a real product;
   providing on one of the representations of the pages of the user interface a watermark icon of an interactive element to display on the display associated with the computing device;
   associating the watermark icon of interactive content with interactive content, the watermark icon being indicative of presence of the interactive content, wherein the interactive content is a picture of the real product used by the character in the story;
   wherein the user interface further provides for displaying the interactive content on the display in a floating window by selecting the watermark icon of the interactive content, wherein the interactive content is displayed without navigating away from the one of the representations of the pages on which the watermark icon is present.

2. The one or more non-transitory computer-storage media of claim 1 wherein the fictional character is not displayed along with the real product.

3. The one or more non-transitory computer-storage media of claim 1 wherein the interactive content further includes a link directing a reader to a webpage where the real product may be purchased.

4. The one or more non-transitory computer-storage media of claim 1 wherein the real product and the watermark icon of an interactive element are displayed on the same one of the representations of pages.

5. A method of providing an electronic book for use on a computing device, the method comprising:
   providing a user interface for the interactive electronic book, the user interface including representations of pages to display on a display associated with the computing device, wherein the representations of pages include a story about a fictional character using a real product;

providing on one of the representations of the pages of the user interface a watermark icon of an interactive element to display on the display associated with the computing device;

associating the watermark icon of interactive content with interactive content, the watermark icon being indicative of presence of the interactive content, wherein the interactive content is a picture of the real product used by the character in the story;

wherein the user interface further provides for displaying the interactive content on the display in a floating window by selecting the watermark icon of the interactive content, wherein the interactive content is displayed without navigating away from the one of the representations of the pages on which the watermark icon is present.

6. The method of claim 5 wherein the interactive content further includes a link directing a reader to a webpage where the real product may be purchased.

7. The method of claim 5 wherein the fictional character is not displayed along with the real product.

8. The method of claim 5 wherein the real product and the watermark icon of an interactive element are displayed on the same one of the representations of pages.

\* \* \* \* \*